United States Patent
Takahashi et al.

(10) Patent No.: US 10,714,004 B2
(45) Date of Patent: *Jul. 14, 2020

(54) SEMICONDUCTOR DEVICE, DRIVER IC, AND ELECTRONIC DEVICE

(71) Applicant: Semiconductor Energy Laboratory Co., Ltd., Atsugi-shi, Kanagawa-ken (JP)

(72) Inventors: Kei Takahashi, Kanagawa (JP); Roh Yamamoto, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,184

(22) Filed: Mar. 26, 2018

(65) Prior Publication Data

US 2018/0211595 A1    Jul. 26, 2018

Related U.S. Application Data

(63) Continuation of application No. 15/387,273, filed on Dec. 21, 2016, now Pat. No. 9,984,624.

(30) Foreign Application Priority Data

Dec. 28, 2015    (JP) .................................. 2015-256964

(51) Int. Cl.
*G09G 3/3233*   (2016.01)
*G06F 3/041*    (2006.01)
*G06F 3/044*    (2006.01)

(52) U.S. Cl.
CPC ........... *G09G 3/3233* (2013.01); *G06F 3/044* (2013.01); *G06F 3/0412* (2013.01);
(Continued)

(58) Field of Classification Search
CPC ...... G09G 3/3233; G06F 3/0416; G06F 3/044
(Continued)

(56) References Cited

U.S. PATENT DOCUMENTS 4,614,840 A * 9/1986 Bienstman ............ H04M 3/005
340/12.12
5,719,529 A * 2/1998 Kawahara ............. H03F 3/3067
330/253
(Continued)

FOREIGN PATENT DOCUMENTS

JP    2009-223070 A    10/2009
JP    2014-146235 A    8/2014

OTHER PUBLICATIONS

Kim.K et al., "A Capacitive Touch Controller Robust to Display Noise for Ultrathin Touch Screen Displays", ISSCC 2012 (Digest of Technical Papers. IEEE International Solid-State Circuits Conference), Feb. 20, 2012, pp. 116-117.

(Continued)

*Primary Examiner* — Fred Tzeng
(74) *Attorney, Agent, or Firm* — Fish & Richardson P.C.

(57) ABSTRACT

A semiconductor device includes first to fourth terminals, a switch circuit, and an integrating circuit. The integrating circuit includes an amplifier circuit having a (−) terminal, a first (+) terminal, and a second (+) terminal. The integrating circuit is configured to integrate an input signal of the (−) terminal using an average voltage of a voltage of the first (+) terminal and a voltage of the second (+) terminal as a reference voltage. The switch circuit is configured to electrically connect the (−) terminal to the second terminal, the first (+) terminal to the first terminal, the second (+) terminal to the third terminal the (−) terminal to the third terminal, the first (+) terminal to the second terminal, and the second (+) terminal to the fourth terminal. The present semiconductor (Continued)

device is used as a semiconductor device sensing a current flowing through a pixel in a display panel.

10 Claims, 46 Drawing Sheets

(52) U.S. Cl.
CPC .. *G06F 3/0416* (2013.01); *G06F 2203/04107* (2013.01); *G09G 2300/0426* (2013.01); *G09G 2300/0809* (2013.01); *G09G 2300/0842* (2013.01)

(58) Field of Classification Search
USPC .......................................................... 345/174
See application file for complete search history.

(56) References Cited

U.S. PATENT DOCUMENTS

| | | | |
|---|---|---|---|
| 5,760,647 A * | 6/1998 | Miller ................ | H03F 3/45089 330/252 |
| 6,111,473 A * | 8/2000 | Van Den Homberg ..................... | H03B 5/364 331/116 FE |
| 6,184,670 B1 | 2/2001 | Mulatti et al. | |
| 7,795,881 B2 | 9/2010 | Masuda et al. | |
| 8,149,190 B2 | 4/2012 | Mizukoshi et al. | |
| 8,441,462 B2 | 5/2013 | Kobayashi et al. | |
| 8,902,192 B2 | 12/2014 | Miyamoto et al. | |
| 8,942,937 B2 | 1/2015 | Miyamoto et al. | |
| 8,976,154 B2 | 3/2015 | Miyamoto et al. | |
| 9,013,448 B2 | 4/2015 | Miyamoto et al. | |
| 9,030,441 B2 | 5/2015 | Yumoto et al. | |
| 9,058,085 B2 | 6/2015 | Miyamoto et al. | |
| 9,146,632 B2 | 9/2015 | Miyamoto | |
| 9,152,286 B2 | 10/2015 | Yumoto et al. | |
| 9,354,757 B2 | 5/2016 | Miyamoto et al. | |
| 9,367,184 B2 | 6/2016 | Kobayashi et al. | |
| 9,454,271 B2 | 9/2016 | Miyamoto et al. | |
| 9,465,492 B2 | 10/2016 | Miyamoto et al. | |
| 9,984,624 B2 * | 5/2018 | Takahashi ............ | G06F 3/0416 |
| 2002/0030656 A1 | 3/2002 | Goto et al. | |
| 2005/0017809 A1 * | 1/2005 | Ueno ................... | H03F 3/4521 330/255 |
| 2006/0072047 A1 | 4/2006 | Sekiguchi | |
| 2007/0126668 A1 | 6/2007 | Kimura | |
| 2007/0146050 A1 * | 6/2007 | Chen ...................... | H02M 3/07 327/536 |
| 2008/0122454 A1 * | 5/2008 | Kato ...................... | G01D 3/032 324/661 |
| 2010/0002114 A1 * | 1/2010 | Ogura .................. | H04N 5/378 348/301 |
| 2010/0109620 A1 | 5/2010 | Colombo | |
| 2010/0307840 A1 | 12/2010 | Kobayashi et al. | |
| 2012/0025737 A1 * | 2/2012 | Kikuchi .................. | G05F 3/262 315/307 |
| 2012/0187927 A1 | 7/2012 | Yu et al. | |
| 2012/0286697 A1 * | 11/2012 | Kimura .................. | G05F 3/242 315/291 |
| 2013/0211757 A1 | 8/2013 | Miyamoto | |
| 2013/0234133 A1 | 9/2013 | Saito et al. | |
| 2013/0294481 A1 | 11/2013 | Koyama et al. | |
| 2013/0301331 A1 * | 11/2013 | Onuki ................. | G11C 14/0054 365/72 |
| 2013/0314032 A1 * | 11/2013 | Amemiya ............. | H02J 7/0077 320/107 |
| 2014/0132562 A1 | 5/2014 | Miyamoto et al. | |
| 2014/0145785 A1 * | 5/2014 | Bandyopadhyay ......................... | H03F 3/45475 330/69 |
| 2014/0146010 A1 | 5/2014 | Akai et al. | |
| 2014/0210751 A1 | 7/2014 | Okamura et al. | |
| 2014/0218645 A1 | 8/2014 | Miyamoto | |
| 2015/0061747 A1 * | 3/2015 | Krnic ....................... | G06G 7/14 327/361 |
| 2015/0116017 A1 * | 4/2015 | Fu ............................ | H03L 1/00 327/157 |
| 2015/0180338 A1 * | 6/2015 | Choi ...................... | H02M 3/1563 323/271 |
| 2015/0317028 A1 | 11/2015 | Takahashi et al. | |
| 2016/0070314 A1 | 3/2016 | Takahashi et al. | |
| 2016/0099644 A1 * | 4/2016 | Tsuzaki .................. | G05F 1/573 323/271 |
| 2016/0148985 A1 * | 5/2016 | Park ...................... | H01L 27/1222 257/40 |
| 2016/0240127 A1 * | 8/2016 | Duan .................... | G09G 3/3241 |
| 2016/0329881 A1 * | 11/2016 | Matsuno ................... | H03F 1/02 |
| 2016/0351552 A1 | 12/2016 | Takahashi et al. | |
| 2017/0023624 A1 * | 1/2017 | Gao ...................... | G01R 15/125 |
| 2017/0045407 A1 | 2/2017 | Nishikawa et al. | |
| 2017/0168648 A1 * | 6/2017 | Takahashi ............... | G06F 3/044 |
| 2017/0186355 A1 | 6/2017 | Takahashi et al. | |

OTHER PUBLICATIONS

Takahashi.K et al., "13.3-inch 8k4k 664-ppi Foldable OLED Display Using Crystalline Oxide Semiconductor FETs", SID Digest '15: SID International Symposium Digest of Technical Papers, Jun. 2, 2015, pp. 250-253.

Hamaguchi.M et al., "A 240Hz-Reporting-Rate 143×81 Mutual-Capacitance Touch-Sensing Analog Front-End IC With 37dB SNR for 1mm-Diameter Stylus", ISSCC 2014 (Digest of Technical Papers. IEEE International Solid-State Circuits Conference), Feb. 11, 2014, pp. 214-216.

* cited by examiner

FIG. 17A
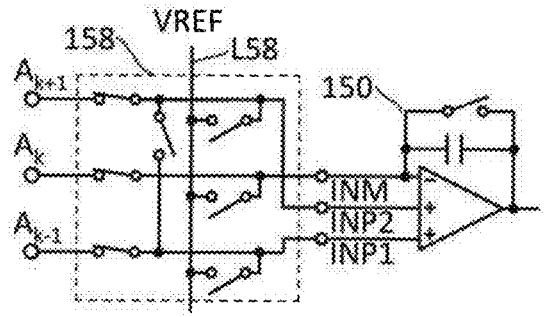
FIG. 17B1
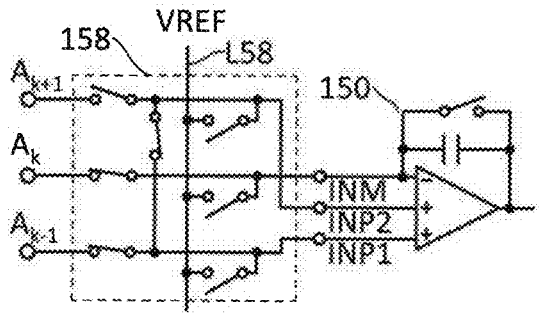
FIG. 17B2
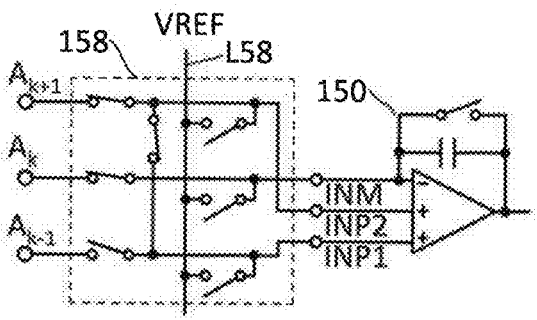
FIG. 17C1
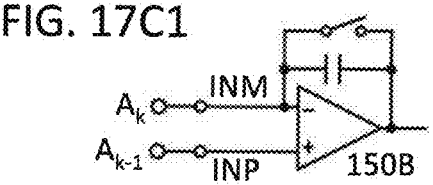
FIG. 17C2
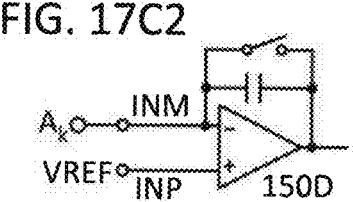
FIG. 17D
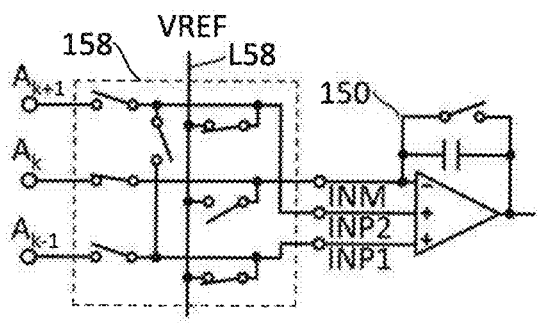

FIG. 22

| Function | | | | CMREV | Input | | | Output | | | | |
|---|---|---|---|---|---|---|---|---|---|---|---|---|
| Type | INM | INP1 | INP2 | | RITG[0] | RITG[1] | RITG[2] | DRITG[0] | DRITG[1] | DRITG[2] | DRITG[3] | DRITG[4] |
| 3-Differential | 2h-1 | 2h-2 | 2h | L | L | L | L | H | H | L | L | H |
| 3-Differential | 2h | 2h-1 | 2h+1 | H | H | L | L | L | H | H | L | H |
| Differential | 2h-1 | 2h | | L | L | H | L | H | L | H | L | H |
| Differential | 2h | 2h+1 | | H | L | L | H | L | L | H | L | H |
| Differential | 2h-1 | 2h-2 | | L | L | L | H | H | H | H | H | L |
| Differential | 2h | 2h-1 | | H | H | H | H | X | X | X | X | H |
| SE | 2h-1 | CMVRI | | L | | | | | | | | |
| SE | 2h | CMVRI | | H | | | | | | | | |
| HiZ | Z | X | X | X | | | | | | | | |

Z : High Impedance
X : Do Not Care Whether "H" or "L"
3-Differential : 3-Input Differential Sensing
Differential : Differential Sensing
SE : Single-Ended Sensing FIG. 35A
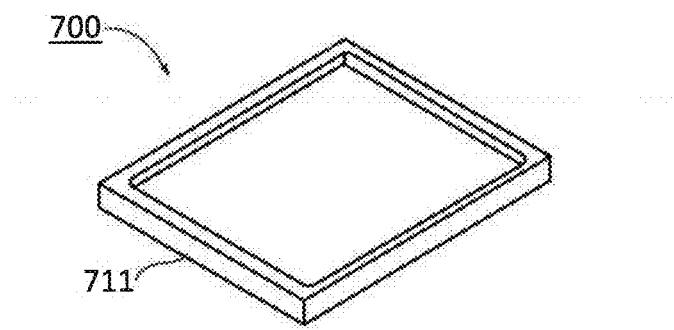
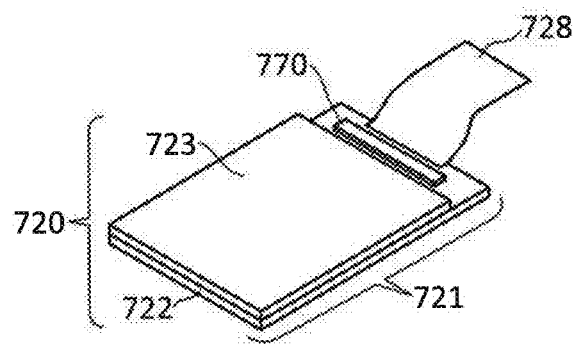
FIG. 35B
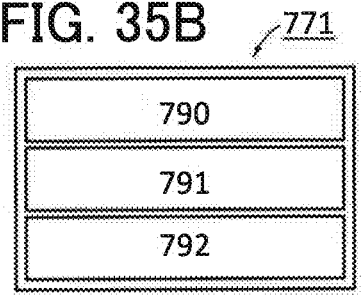
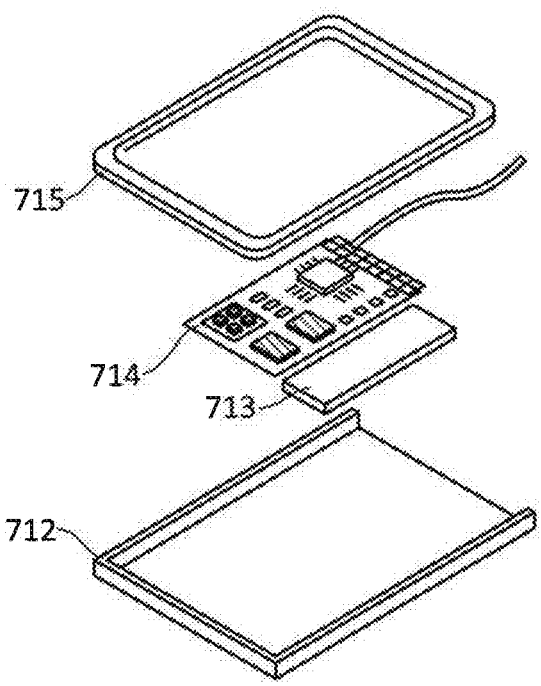

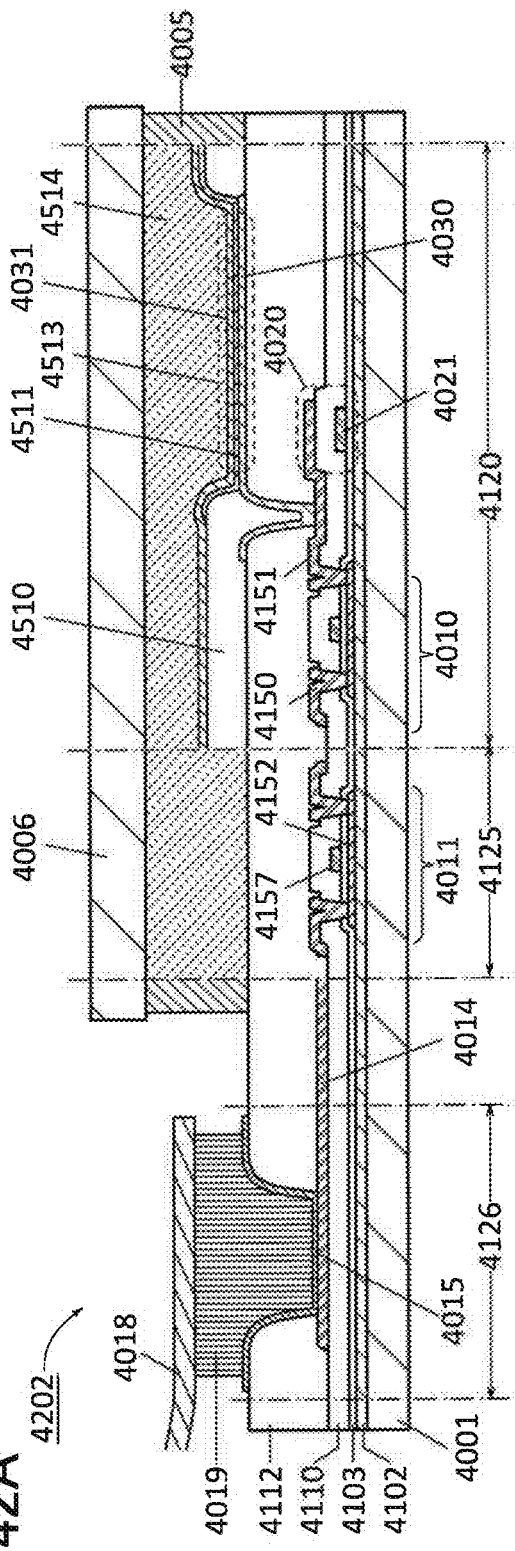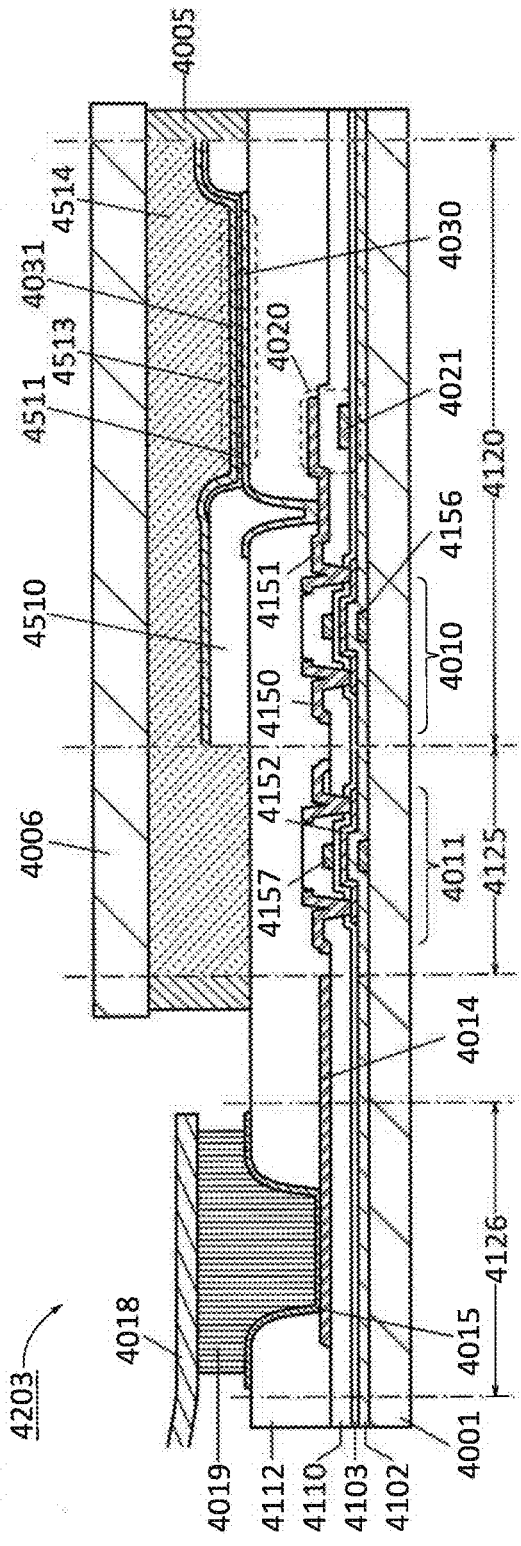

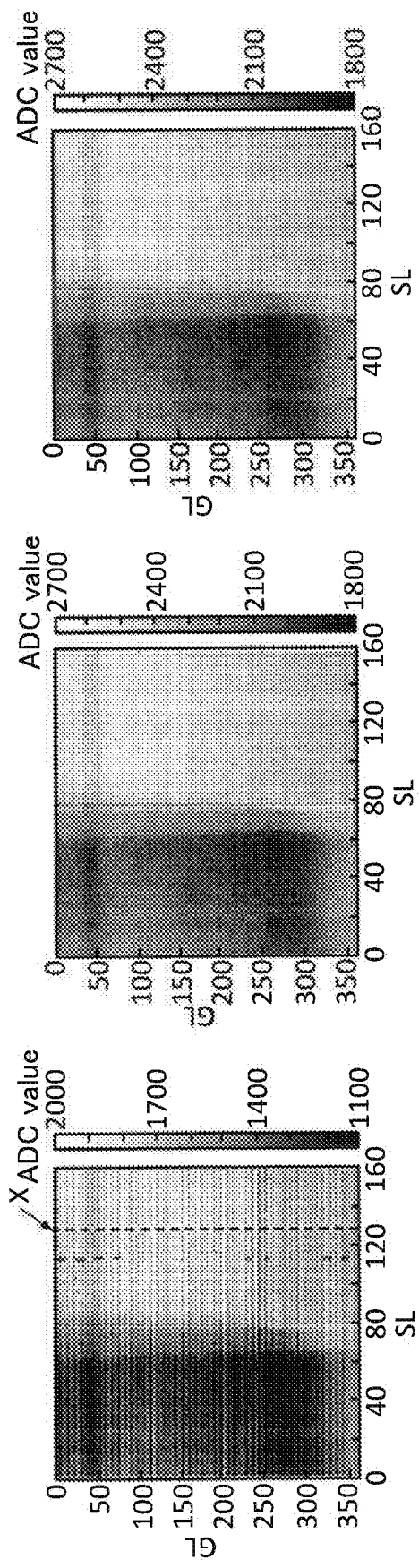
FIG. 46A
FIG. 46B
FIG. 46C
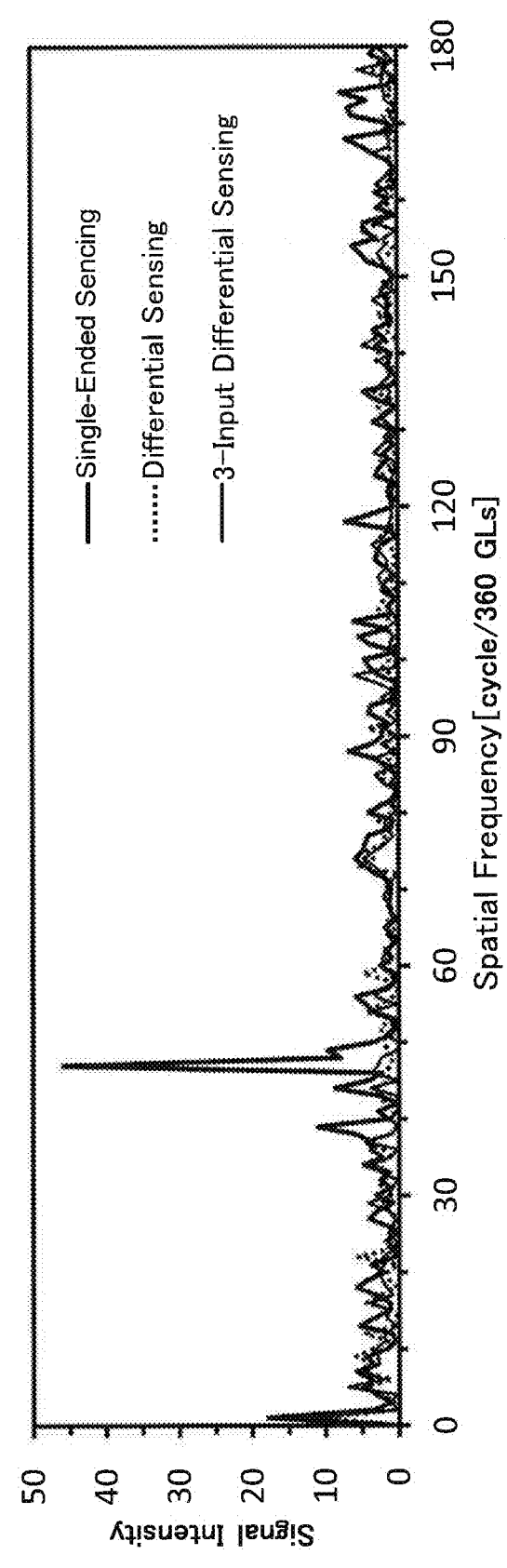
FIG. 46D

10,714,004 B2

SEMICONDUCTOR DEVICE, DRIVER IC, AND ELECTRONIC DEVICE

CROSS-REFERENCE TO RELATED APPLICATIONS

This application is a continuation of U.S. application Ser. No. 15/387,273, filed Dec. 21, 2016, now allowed, which claims the benefit of a foreign priority application filed in Japan as Serial No. 2015-256964 on Dec. 28, 2015, both of which are incorporated by reference.

BACKGROUND OF THE INVENTION

1. Field of the Invention

In the specification, drawings, and claims of this application (hereinafter referred to as "this specification and the like"), a semiconductor device, an electronic component, an electronic device, operating methods thereof, and manufacturing methods thereof are described, for example.

In this specification and the like, a semiconductor device means a device that utilizes semiconductor characteristics and refers to a circuit including a semiconductor element (e.g., a transistor, a diode, or a photodiode), a device including the circuit, and the like. The semiconductor device also means any device that can function by utilizing semiconductor characteristics. For example, an integrated circuit, a chip including an integrated circuit, and an electronic component including a chip in a package are examples of semiconductor devices. Moreover, a memory device, a display device, a light-emitting device, a lighting device, an electronic device, and the like themselves might be semiconductor devices, or might each include a semiconductor device.

2. Description of the Related Art

For pixels of an active matrix display device using light-emitting elements, a variety of circuit configurations have been proposed. In general, a pixel is provided with at least a light-emitting element, a selection transistor that controls input of a grayscale signal to the pixel, and a driving transistor that drives the light-emitting element. Supplying a drain current flowing through the driving transistor to the light-emitting element enables the light-emitting element to emit light with a luminance corresponding to the value of the drain current.

Therefore, in the case where electrical characteristics (e.g., threshold voltage, field-effect mobility) of the driving transistor vary among a plurality of pixels that constitute a screen of a display device, variations in luminance of the light-emitting element are generated even when grayscale signals with the same voltage are supplied. Variations in electrical characteristics of the driving transistor among a plurality of pixels are one of the causes of reduction in display quality of a display device.

For active matrix display devices, the number of pixels provided has been increased to achieve higher resolution, and hundreds of thousands to tens of millions of pixels are provided in one display device. In a general color display device, a pixel is composed of three subpixels corresponding to display colors of red, green, and blue (RGB). For example, in the case where the resolution of a display device is full-HD, the number of subpixels is 1366×768×3 (RGB)= 1,049,088; and in the case where the resolution is 8K4K (Super Hi-Vision), the number of subpixels is 7,680×4,320×3 (RGB)=33,177,600. It is very difficult for driving transistors of a large number of different subpixels to have perfectly the same electrical characteristics. Thus, measuring the electrical characteristics of a driving transistor and correcting the luminance of a light-emitting element is proposed (e.g., Non-Patent Document 1).

In order to meet demands for a larger number of gray levels and higher resolution of a display portion or the like, a dedicated IC (driver IC) is used in a driver circuit of a display device, particularly in a source driver circuit where a data signal is generated from a video signal (see Patent Document 1, for example).

REFERENCE

Patent Document

[Patent Document 1] Japanese Published Patent Application No. 2009-223070

Non-Patent Document

[Non-Patent Document 1] K. Takahashi et al., "13.3-inch 8k4k 664-ppi Foldable OLED Display Using Crystalline Oxide Semiconductor FETs", SID Symposium Digest of Technical Papers, Vol. 46, 2015, pp. 250-253.

SUMMARY OF THE INVENTION

An object of one embodiment of the present invention is to provide a novel semiconductor device, to provide a method for operating a novel semiconductor device, to improve a signal-noise ratio (SNR), and to improve display quality, for example.

Note that the descriptions of a plurality of objects do not preclude the existence of each object. One embodiment of the present invention does not necessarily achieve all the objects listed above. Objects other than those listed above are apparent from the description of this specification and the like, and such objects could be objects of one embodiment of the present invention.

(1) One embodiment of the present invention is a semiconductor device which includes a first terminal, a second terminal, a third terminal, a first circuit, and an amplifier circuit. In the semiconductor device, the amplifier circuit includes an output terminal, an inverting input terminal, a first non-inverting input terminal, and a second non-inverting input terminal. The amplifier circuit is configured to amplify a difference between a voltage of the inverting input terminal and an average voltage of a voltage of the first non-inverting input terminal and a voltage of the second non-inverting input terminal. The first circuit has a first function, a second function, and a third function. The first function is a function of electrically connecting the inverting input terminal and the second terminal to each other, electrically connecting the first non-inverting input terminal and the first terminal to each other, and electrically connecting the second non-inverting input terminal and the third terminal to each other. The second function is a function of electrically connecting the inverting input terminal and the second terminal to each other, electrically connecting the first non-inverting input terminal and the first terminal to each other, and electrically connecting the second non-inverting input terminal and the first terminal to each other. The third function is a function of electrically connecting the inverting input terminal and the second terminal to each other, electrically connecting the first non-inverting input terminal and the third terminal to each other, and electrically connecting the second non-inverting input terminal and the third terminal to each other.

(2) The semiconductor device according to the embodiment (1) further includes a wiring. A first voltage is input to the wiring. The first circuit has a fourth function which is a function of electrically connecting the inverting input terminal and the second terminal to each other, electrically connecting the first non-inverting input terminal and the wiring to each other, and electrically connecting the second non-inverting input terminal and the wiring to each other.

(3) The semiconductor device according to the embodiment (1) or (2) further includes a capacitor. A first terminal of the capacitor is electrically connected to the output terminal, and a second terminal of the capacitor is electrically connected to the inverting input terminal.

(4) One embodiment of the present invention is a semiconductor device which includes a first terminal, a second terminal, a third terminal, a fourth terminal, a fifth terminal, a first circuit, an amplifier circuit, and a capacitor. In the semiconductor device, the amplifier circuit includes an output terminal, an inverting input terminal, a first non-inverting input terminal, and a second non-inverting input terminal. The amplifier circuit is configured to amplify a difference between a voltage of the inverting input terminal and an average voltage of a voltage of the first non-inverting input terminal and a voltage of the second non-inverting input terminal. A first terminal of the capacitor is electrically connected to the output terminal, and a second terminal of the capacitor is electrically connected to the inverting input terminal. The first circuit has a first function, a second function, a third function, a fourth function, a fifth function, a sixth function, and a seventh function. The first function is a function of electrically connecting the inverting input terminal and the second terminal to each other, electrically connecting the first non-inverting input terminal and the first terminal to each other, and electrically connecting the second non-inverting input terminal and the third terminal to each other. The second function is a function of electrically connecting the inverting input terminal and the third terminal to each other, electrically connecting the first non-inverting input terminal and the second terminal to each other, and electrically connecting the second non-inverting input terminal and the fourth terminal to each other. The third function is a function of electrically connecting the inverting input terminal and the second terminal to each other, electrically connecting the first non-inverting input terminal and the first terminal to each other, and electrically connecting the second non-inverting input terminal and the first terminal to each other. The fourth function is a function of electrically connecting the inverting input terminal and the second terminal to each other, electrically connecting the first non-inverting input terminal and the third terminal to each other, and electrically connecting the second non-inverting input terminal and the third terminal to each other. The fifth function is a function of electrically connecting the inverting input terminal and the third terminal to each other, electrically connecting the first non-inverting input terminal and the second terminal to each other, and electrically connecting the second non-inverting input terminal and the second terminal to each other. The sixth function is a function of electrically connecting the inverting input terminal and the third terminal to each other, electrically connecting the first non-inverting input terminal and the fourth terminal to each other, and electrically connecting the second non-inverting input terminal and the fourth terminal to each other. The seventh function is a function of electrically connecting each of the first to fourth terminals to the fifth terminal.

(5) In the semiconductor device according to the embodiment (4), the first circuit has an eighth function and a ninth function. The eighth function is a function of electrically connecting the inverting input terminal and the second terminal to each other and electrically connecting each of the first non-inverting input terminal and the second non-inverting input terminal to the fifth terminal. The ninth function is a function of electrically connecting the inverting input terminal and the third terminal to each other and electrically connecting each of the first non-inverting input terminal and the second non-inverting input terminal to the fifth terminal.

(6) One embodiment of the present invention is a driver IC configured to drive a display unit including a subpixel and a first wiring and a second wiring that are configured to be electrically connected to the subpixel. The driver IC includes a first unit and a second unit. The first unit is configured to generate a grayscale signal input to the first wiring. The second unit is configured to sense a current flowing through the second wiring, and includes the semiconductor device according to the embodiment (4) or (5).

(7) One embodiment of the present invention is an electronic device including a display unit. The display unit includes the driver IC according to the embodiment (6).

In this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts. Furthermore, X and Y each denote an object (e.g., a device, an element, a circuit, a wiring, an electrode, a terminal, a conductive film, or a layer).

Note that a transistor includes three terminals: a gate, a source, and a drain. The gate functions as a control terminal that controls electrical continuity of the transistor. Two terminals other than the gate are input-output terminals functioning as a source or a drain. Depending on the type of a transistor or levels of potentials applied to the terminals, one of the two terminals functions as a source and the other functions as a drain. Therefore, the terms "source" and "drain" can be switched in this specification and the like. In this specification and the like, the two terminals other than the gate may be referred to as a first terminal and a second terminal.

A node can be referred to as a terminal, a wiring, an electrode, a conductive layer, a conductor, an impurity region, or the like depending on the circuit configuration, the device structure, or the like. Furthermore, a terminal, a wiring, or the like can be referred to as a node.

In many cases, a voltage refers to a potential difference between a certain potential and a reference potential (e.g., a ground potential (GND) or a source potential). Thus, a voltage can be referred to as a potential and vice versa. Note that the potential indicates a relative value. Accordingly, "ground potential" does not necessarily mean 0 V.

In this specification and the like, the terms "film" and "layer" can be interchanged depending on the case or circumstances. For example, the term "conductive layer" can be changed into the term "conductive film" in some cases. Moreover, the term "insulating film" can be changed into the term "insulating layer" in some cases In this specification and the like, ordinal numbers such as first, second, and third are used to avoid confusion among components, and the terms do not limit the components numerically or do not limit the order.

According to one embodiment of the present invention, a novel semiconductor device can be provided, a method for operating a novel semiconductor device can be provided, a signal-noise ratio (SNR) can be improved, and display quality can be improved, for example.

Note that the descriptions of a plurality of effects do not preclude the existence of other effects. One embodiment of the present invention does not necessarily have all the effects listed above. In one embodiment of the present invention, an object other than the above objects, an effect other than the above effects, and a novel feature will be apparent from the description of the specification and the drawings of this embodiment.

BRIEF DESCRIPTION OF THE DRAWINGS

In the accompanying drawings:

FIGS. 17A, 17B1, 17B2, and 17D are circuit diagrams each illustrating a sensing mode of a current sensing circuit and a structure example of a switch circuit, and FIGS. 17C1 and 17C2 are equivalent circuit diagrams of an integrating circuit;

FIG. 22 shows a truth table of a logic circuit in a CM unit and functions of a switch circuit;

FIG. 35A is a schematic exploded perspective view illustrating a structure example of a display device, and FIG. 35B is a block diagram illustrating a structure example of a driver IC;

FIGS. 42A and 42B are cross-sectional views each illustrating a structure example of a display panel;

FIGS. 46A to 46D show analysis results of current values sensed by a CM unit.

DETAILED DESCRIPTION OF THE INVENTION

Figure 1:
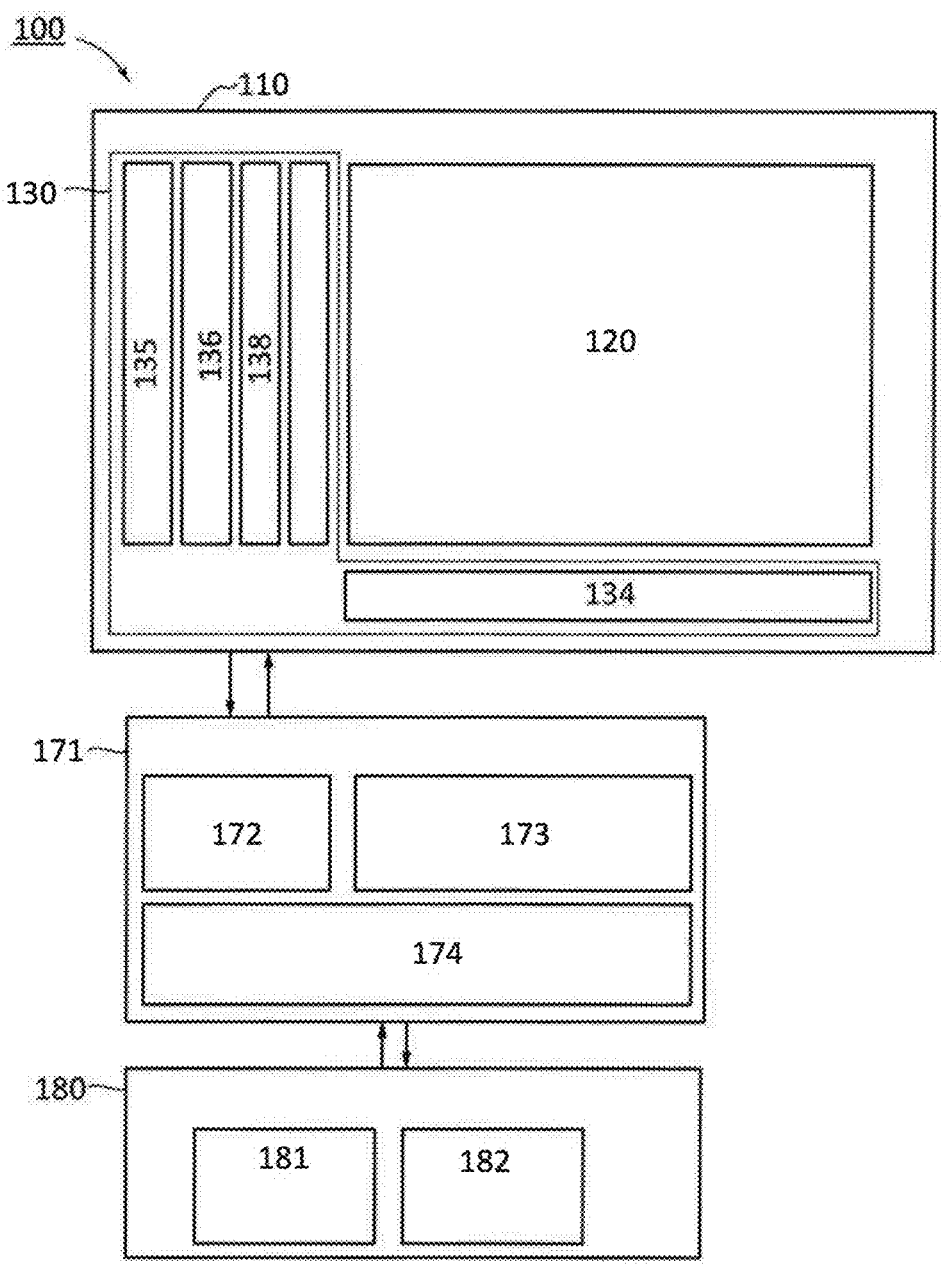
FIG. 1 is a block diagram illustrating a structure example of a display device.

Hereinafter, embodiments of the present invention will be described. Note that an embodiment of the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments and example.

Any of the embodiments and the example described below can be combined as appropriate. When a plurality of structure examples (including a manufacturing method example, an operation method example, a usage example, and the like) are shown in one embodiment, any of the structure examples can be combined with each other or can be combined with one or more structure examples shown in another embodiment or example as appropriate.

In the drawings, the same elements, elements having similar functions, elements formed of the same material, elements formed at the same time, and the like are sometimes denoted by the same reference numerals, and the description thereof is not repeated in some cases.

In the drawings, the size, the layer thickness, or the region is exaggerated for clarity in some cases. Therefore, the size, the layer thickness, or the region is not limited to the illustrated scale. Note that the drawings are schematic views showing ideal examples, and embodiments of the present invention are not limited to shapes or values shown in the drawings. For example, the following can be included: variation in signal, voltage, or current due to noise or difference in timing.

Furthermore, even when a block diagram shows one circuit block performing given processing, a plurality of circuit blocks may actually be provided to perform the processing; this case is also included in one embodiment of the present invention. Moreover, even when a block diagram shows a plurality of circuit blocks performing various functions, one circuit block may actually be provided to perform the functions; this case is also included in one embodiment of the present invention.

In this specification, terms for describing arrangement, such as "over", "above", "under", and "below", are used for convenience in describing a positional relationship between components with reference to drawings in some cases. Furthermore, the positional relationship between components is changed as appropriate in accordance with a direction in which the components are described. Thus, the positional relation can be described with terms other than the terms used in this specification as appropriate in accordance with the situation.

Embodiment 1

In this embodiment, a driver IC, a display device, a touch panel device, and the like are described as examples of a semiconductor device.

<<Structure Example of Display Device>>

FIG. 1 is a block diagram illustrating a structure example of a display device. A display device 100 includes a display unit 110, a display controller 171, and a processor 180. The display unit 110 includes a pixel array 120 and a peripheral circuit 130. The peripheral circuit 130 includes a gate driver circuit 134, a source driver circuit 135, a current sensing circuit 136, a switch circuit 137, and a switch circuit 138.

The display controller 171 is a controller for controlling the display unit 110, and includes a memory 172, a timing controller 173, and an image processing circuit 174. The timing controller 173 has functions of generating various signals for setting the timing of the operation of the peripheral circuit 130. For example, the timing controller 173 generates signals for controlling the gate driver circuit 134 (e.g., a start pulse signal, a clock signal), signals for controlling the source driver circuit 135 (e.g., a start pulse signal, a clock signal), and control signals for the switch circuits 137 and 138. The image processing circuit 174 has functions of processing an image signal input from the outside and generating a data signal written into the pixel array 120. The data signal generated by the image processing circuit 174 is output to the source driver circuit 135. The memory 172 stores data that is necessary to execute processing by the display controller 171. For example, the memory 172 stores data of an image signal processed by the image processing circuit 174.

The processor 180 executes various programs to control the entire display device 100. In the processor 180, an execution unit 181 and a memory 182 are provided. The execution unit 181 has a function of executing a program. For example, the execution unit 181 is an arithmetic logic unit (ALU), and the memory 182 is a cache memory. A variety of processing devices such as a central processing unit (CPU) or a microprocessor unit (MPU) can be used as the execution unit 181, in which case the memory 182 may be either a main memory of the processing device or a cache memory. In the case where the display device 100 is incorporated in an electronic device as an electronic component, the processor 180 may be a processor of the electronic device (host device).

<Display Unit>

Figure 2:
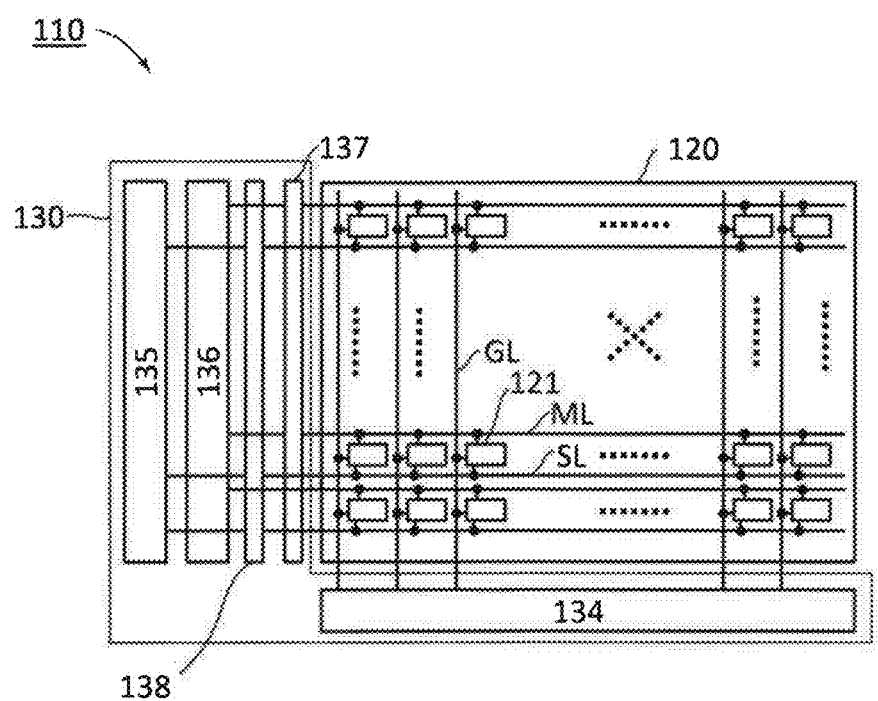
FIG. 2 is block diagram illustrating a structure example of a display unit.

FIG. 2 illustrates a structure example of the display unit 110. The pixel array 120 includes a plurality of subpixels 121 and a plurality of wirings GL, SL, and ML. The plurality of subpixels 121 include display elements and are arranged in an array. The plurality of wirings GL, SL, and ML are provided in accordance with the arrangement of the plurality of subpixels 121. The subpixels 121 are electrically connected to the wirings GL in corresponding rows and the wirings SL and ML in corresponding columns. The wirings GL can be referred to as gate lines, scan lines, selection signal lines, or the like. The wirings SL can be referred to as source lines, data lines, data signal lines, or the like.

The gate driver circuit 134 is a circuit for driving the wirings GL and has a function of generating a signal supplied to the wirings GL. The source driver circuit 135 is a circuit for driving the source lines SL. The source driver circuit 135 has a function of processing an image signal transmitted from the display controller 171 and generating a grayscale signal to be supplied to the wirings SL. The grayscale signal generated by the source driver circuit 135 is an analog signal having a voltage value (or a current value) corresponding to the grayscale value. The switch circuit 138 has a function of controlling electrical continuity between the wirings SL and the source driver circuit 135.

The current sensing circuit 136 is a circuit for sensing a current input from the pixel array 120. The wirings ML have a function of transmitting a current flowing through the subpixels 121 to the current sensing circuit 136. For example, the wirings ML can be referred to as monitor lines. The switch circuit 137 has a function of controlling electrical continuity between the current sensing circuit 136 and the wirings ML.

In this specification and the like, numbers such as column numbers or row numbers are used in some cases to distinguish a plurality of components denoted by the same reference numerals from each other. For example, the wiring GL in the first row is referred to as the wiring GL_1, and the subpixel 121 in the second row and the third column is referred to as the subpixel 121<2, 3>.

To distinguish components according to the color expressed by the subpixels, an identification sign such as "R" or "_R" is added to reference numerals. For example, the subpixel 121R refers to the subpixel 121 for red color, and the wiring SL_G refers to the wiring SL for inputting a grayscale signal to a subpixel for green color.

When the display unit 110 performs color display, one pixel is composed of a predetermined number of subpixels 121. For example, in the case where three kinds of subpixels 121 for displaying red (R), green (G), and blue (B) are provided, one subpixel 121R, one subpixel 121G, and one subpixel 121B can constitute one pixel. Alternatively, one subpixel 121R, two subpixels 121G, and one subpixel 121B can constitute one pixel. Further alternatively, four subpixels 121 each displaying a different display color can constitute one pixel. For example, the four display colors may be [R, G, B, W (white)], [R, G, B, Y (yellow)], [R, G, B, C (cyan)], and the like.

<<Structure Example of Subpixel>>

Structure examples of a subpixel are described with reference to FIGS. 3A to 3F. The subpixels described here can be used as the subpixels 121.

Figure 3A:
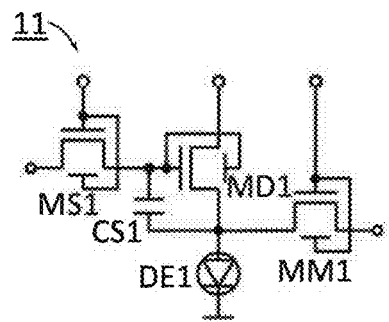
FIGS. 3A to 3F are circuit diagrams illustrating structure examples of a subpixel.

A subpixel 11 illustrated in FIG. 3A includes an electroluminescent (EL) element DE1, transistors MS1, MD1, and MM1, and a capacitor CS1.

The EL element DE1 includes a pair of electrodes (a pixel electrode and a common electrode) and an EL layer. The pixel electrode is electrically connected to a drain of the transistor MD1. One of a pair of electrodes serves as an anode, and the other serves as a cathode. In the example of FIG. 3A, the pixel electrode is the anode and the common electrode is the cathode. The EL layer includes a region sandwiched between a pair of electrodes. The EL layer includes at least a layer containing a light-emitting substance (light-emitting layer). Moreover, another functional layer such as a layer containing an electron-transport substance (electron-transport layer) or a layer containing a hole-transport substance (hole-transport layer) can be provided in the EL layer. The EL element is referred to as an organic EL element when containing an organic light-emitting material, and is referred to as an inorganic EL element when containing an inorganic light-emitting material.

The transistor MS1 is referred to as a selection transistor, and the transistor MD1 is referred to as a driving transistor. The transistor MD1 functions as a current source for the EL element DE1. The transistor MD1 supplies a drain current corresponding to a gate voltage to the EL element DE1. The capacitor CS1 functions as a storage capacitor that holds the gate voltage of the transistor MD1. The transistor MM1 has a function of controlling readout of a current from the subpixel 11. Here, a transistor having a function like the transistor MM1 is referred to as a monitor transistor.

Figure 3B:
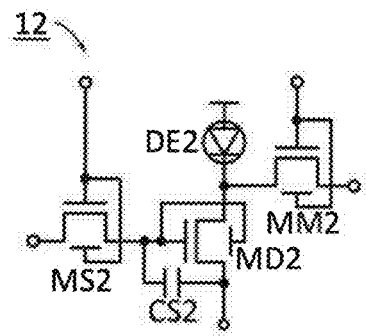

A subpixel 12 illustrated in FIG. 3B includes an EL element DE2, transistors MS2, MD2, and MM2, and a capacitor CS2. An anode of the EL element DE2 is a common electrode, and a cathode thereof is a pixel electrode.

Figure 3C:
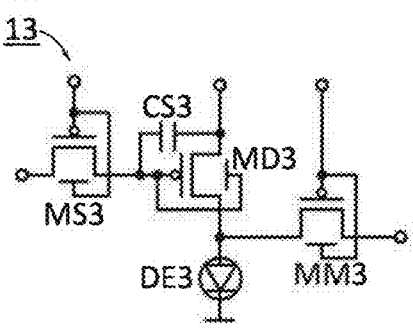

A subpixel 13 illustrated in FIG. 3C includes an EL element DE3, transistors MS3, MD3, and MM3, and a capacitor CS3. Instead of the three n-channel transistors of the subpixel 11, the subpixel 13 employs three p-channel transistors.

Figure 3D:
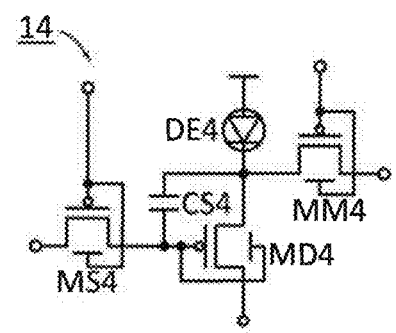

A subpixel 14 illustrated in FIG. 3D includes an EL element DE4, transistors MS4, MD4, and MM4, and a capacitor CS4. Instead of the three n-channel transistors of the subpixel 12, the subpixel 14 employs three p-channel transistors. Note that one or two n-channel transistors in the subpixel 12 can be changed to one or two p-channel transistors. For example, the transistor MS2 (selection transistor) can be changed to a p-channel transistor. The same can apply to the subpixel 11.

Figure 3E:
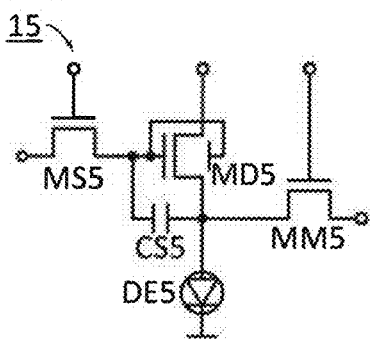

Some or all of the transistors in a subpixel can be changed to transistors which do not have a backgate. Such an example is illustrated in FIG. 3E. A subpixel 15 illustrated in FIG. 3E includes an EL element DE5, transistors MS5, MD5, and MM5, and a capacitor CS5. The subpixel 15 is an example of a subpixel in which a driving transistor has a backgate and a selection transistor and a monitor transistor do not have a backgate.

Figure 3F:
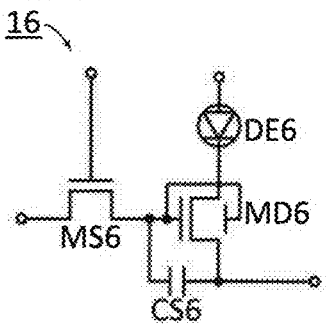

A subpixel includes at least two transistors which are a selection transistor and a driving transistor. Such an example is illustrated in FIG. 3F. The structure of a subpixel 16 illustrated in FIG. 3F corresponds to a structure excluding the monitor transistor from the subpixel 12. The subpixel 16 includes an EL element DE6, transistors MS6 and MD6, and a capacitor CS6. Here, the selection transistor (MS6) is a transistor not having a backgate, and the driving transistor (MD6) is a transistor having a backgate.

In the case where a transistor having a backgate is provided in a display unit, the transistor is not limited to the transistor in which a gate and a backgate are electrically connected to each other. For example, a transistor in which a backgate is electrically connected to a source or a drain can be used. Alternatively, a backgate can be electrically connected to a wiring (e.g., a signal line, a power supply line). Electrical characteristics (e.g., current drive capability, threshold voltage) of a transistor can be changed by the backgate voltage.

Although the examples in which the display element is an EL element are described here, the display element is not limited to an EL element. For example, a light-emitting element such as a light-emitting diode or a light-emitting transistor may be used as the display element.

<<Structure Example of Pixel Array>>

Structure examples of a pixel array are described with reference to FIGS. 4A and 4B, FIGS. 5A and 5B, FIGS. 6A and 6B, FIGS. 7A and 7B, and FIGS. 8A to 8C. The pixel array described here can be used as the pixel array 120. In the drawings, k and j are each an integer of 1 or more.

Figure 4A:
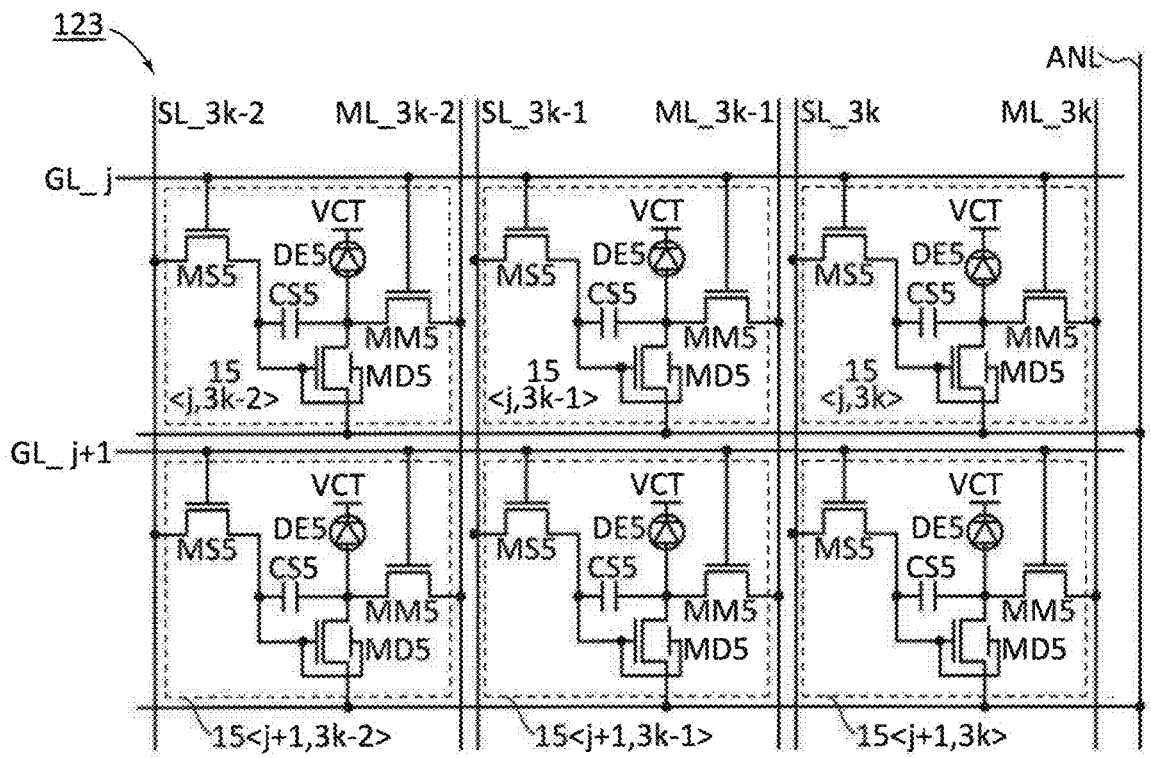
FIG. 4A is a circuit diagram illustrating a structure example of a pixel array.

A pixel array 123 illustrated in FIG. 4A includes a plurality of subpixels 15. FIG. 4A illustrates six subpixels 15 from the j-th row, (3k−2)-th column to the (j+1)-th row, the 3k column. Here, focusing on the subpixel 15<j, 3k>, the structure of the pixel array 123 is described.

The subpixel 15<j, 3k> is electrically connected to the wirings GL_j, SL_3k, ML_3k, and ANL. A gate, a first terminal, and a second terminal of the transistor MS5 are electrically connected to the wiring GL_j, the wiring SL_3k, and a gate of the transistor MD5, respectively. A gate, a first terminal, and a second terminal of the transistor MM5 are electrically connected to the wiring GL_j, a pixel electrode of the EL element DE5, and the wiring ML_3k. The transistor MM5 has a function of a switch that controls electrical continuity between the pixel electrode and the wiring ML_3k. A voltage VCT is supplied to a common electrode of the EL element DE5.

A first electrode of the capacitor CS5 is electrically connected to the pixel electrode, and a second electrode thereof is electrically connected to the gate of the transistor MD5. A first terminal of the transistor MD5 is electrically connected to the pixel electrode, and a second terminal thereof is electrically connected to the wiring ANL. The wiring ANL can function as a voltage supply line, for example. In this example, the voltage supplied through the wiring ANL is higher than the voltage VCT. The wiring ANL can be provided in each column (or each row). Alternatively, a voltage can be supplied to the subpixels 15 in a plurality of columns (or a plurality of rows) through one wiring ANL.

Figure 4B:
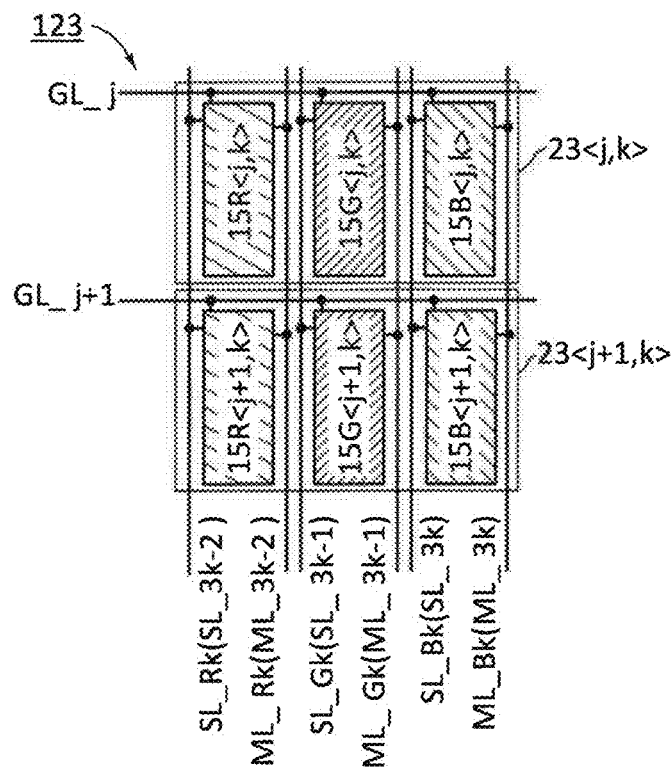
FIG. 4B illustrates a structure example of pixels.

A structure example of pixels in the pixel array 123 is described with reference to FIG. 4B. The pixel array 123 includes a plurality of pixels 23. The subpixels 15R<j, k>, 15G<j, k>, and 15B<j, k> constitute the pixel 23<j, k>. In other words, the pixel 23 is formed of three (RGB) subpixels 15, and the subpixels 15 provided in one column in the pixel array 123 express the same color. The subpixels 15R are provided in the $(3k-2)$-th column, the subpixels 15G are provided in the $(3k-1)$-th column, and the subpixels 15B are provided in the 3k-th column.

In the case of not distinguishing the subpixels 15 from each other by their display color, the subpixels 15R<j, k>, 15G<j, k>, and 15B<j, k> correspond to the subpixels 15<j, $3k-2$>, 15<j, $3k-1$>, and 15<j, $3k$>. The subpixel 15R<j, k> is electrically connected to the wiring GL_j, SL_Rk, and ML_Rk. The same applies to the subpixels 15G<j, k> and 15B<j, k>. In FIG. 4B, the wirings SL, GL, and ML are denoted by both signs that indicate the display color and signs that do not indicate the display color.

Figure 5A:
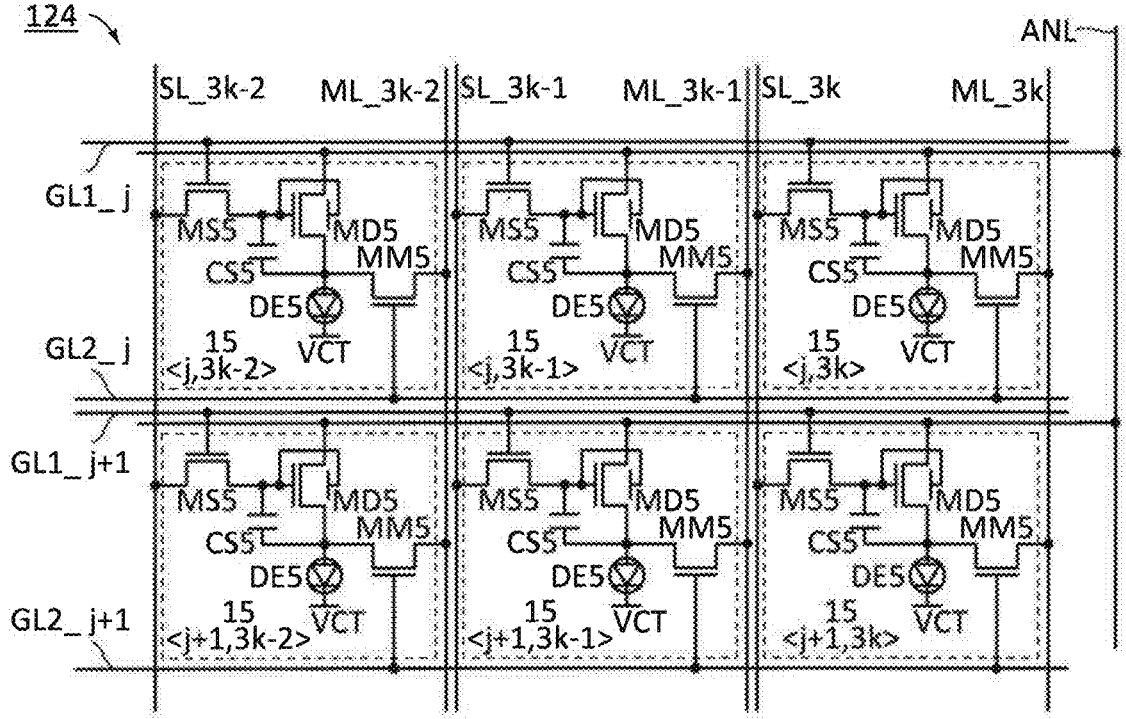
FIG. 5A is a circuit diagram illustrating a structure example of a pixel array.
Figure 5B:
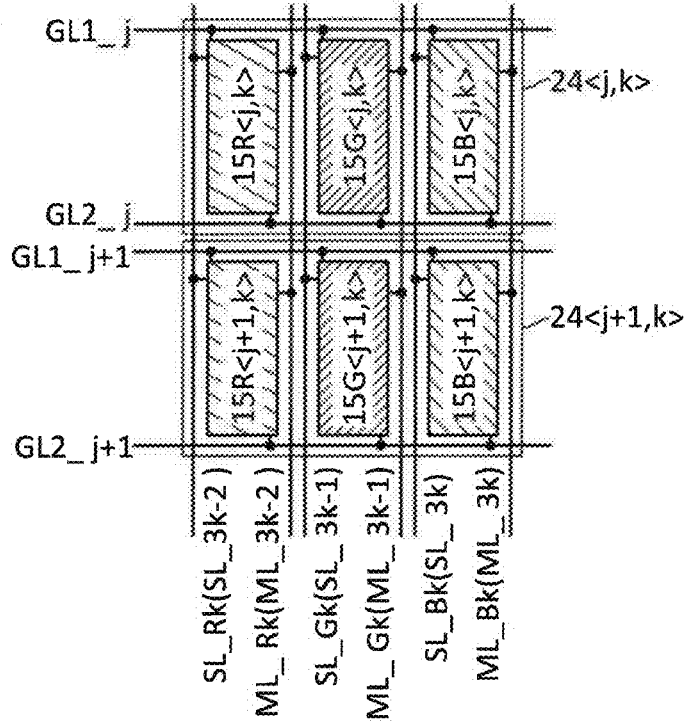
FIG. 5B illustrates a structure example of pixels.

A pixel array 124 illustrated in FIGS. 5A and 5B is a variation of the pixel array 123. The pixel array 124 is similar to the pixel array 123 in the arrangement of subpixels and pixels. The pixel array 124 includes a plurality of subpixels 15, and three subpixels 15R, 15G, and 15B constitute a pixel 24. The pixel array 124 is different from the pixel array 123 in that the transistor MS5 and the transistor MM5 are electrically connected to different gate wirings in each subpixel 15. For example, a gate of the transistor MS5<j, $3k$> is electrically connected to the wiring GL1_j, and a gate of the transistor MM5<j, $3k$> is electrically connected to the wiring GL2_j. The wiring GL1_j and the wiring GL2_j are driven by the gate driver circuit 134.

Figure 6A:
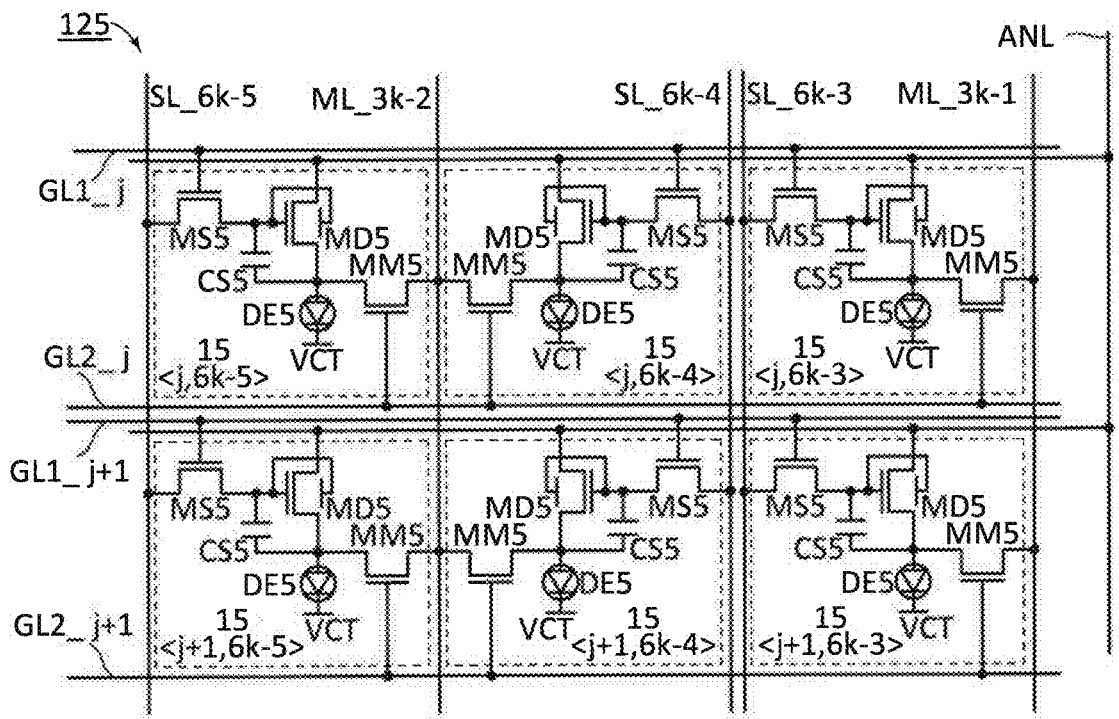
FIG. 6A is a circuit diagram illustrating a structure example of a pixel array.
Figure 6B:
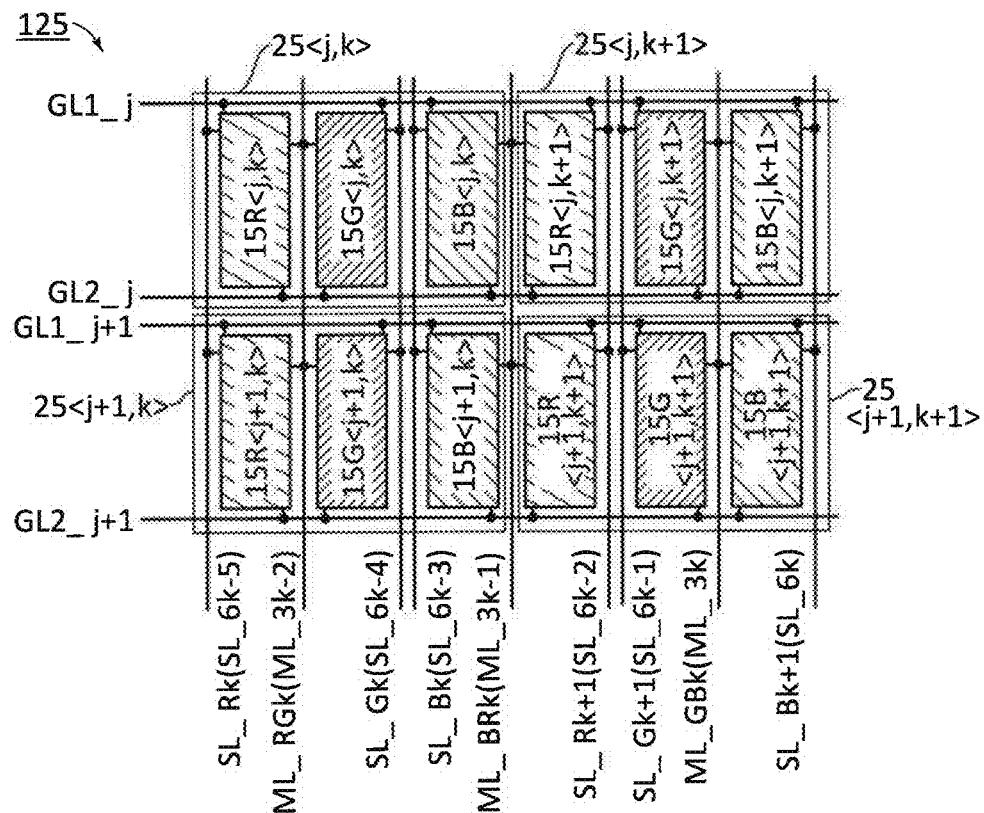
FIG. 6B illustrates a structure example of pixels.

A pixel array 125 illustrated in FIGS. 6A and 6B is a variation of the pixel array 124. The pixel array 125 includes a plurality of subpixels 15, and three subpixels 15R, 15G, and 15B constitute the pixel 25. The pixel array 125 is different from the pixel array 124 in the subpixels 15 in adjacent two columns are electrically connected to one wiring ML. Focusing on the subpixels 15<j, $6k-5$> and 15<j, $6k-4$>, the second terminals of the transistors MM5<j, $6k-5$> and MM5<j, $6k-4$> are each electrically connected to the wiring ML_$3k-2$.

FIG. 6B illustrates a structure example of pixels in the pixel array 125. The pixel 25 illustrated in FIG. 6B is constituted of three subpixels 15R, 15G, and 15B in a manner similar to that of the pixel array 124. A unit block of the pixel array 124 is one pixel (subpixels 15 in one row, three columns), while a unit block of the pixel array 125 is two pixels (subpixels 15 in one row, six columns) because the wirings ML are provided in every two columns. In this example, the subpixels 15R<j, k> and 15G<j, k> are electrically connected to the wiring ML_RGk. The subpixels 15B<j, k> and 15R<j, k+1> are electrically connected to the wiring ML_BRk. The subpixels 15G<j, k+1> and 15B<j, k+1> are electrically connected to the wiring ML_GBk.

Figure 7A:
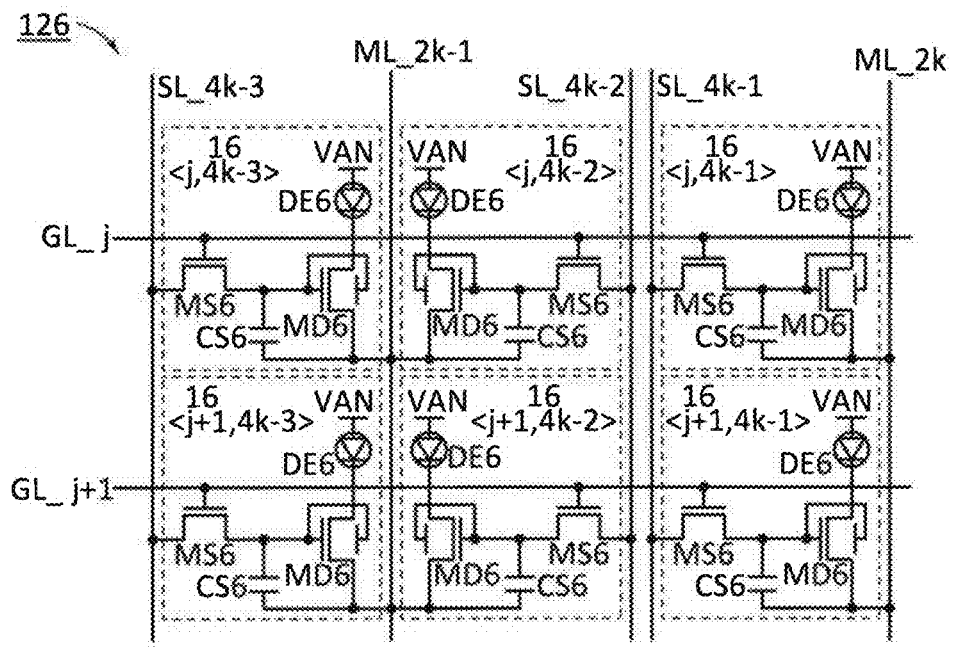
FIG. 7A is a circuit diagram illustrating a structure example of a pixel array.

A pixel array 126 illustrated in FIG. 7A includes a plurality of subpixels 16. The arrangement of the subpixels 16 in the pixel array 126 is similar to that of the subpixels 15 in the pixel array 125. Here, focusing on the subpixel 16<j, $4k-3$>, the structure of the pixel array 126 is described.

The subpixel 16<j, $4k-3$> is electrically connected to the wirings GL_j, SL_$4k-3$, and ML_$2k-1$. The subpixel 16<j, $4k-2$> is electrically connected to the wirings GL_j, SL_$4k-2$, and ML_$2k-1$.

A voltage VAN is supplied to a common electrode (anode) of the EL element DE6. A gate, a first terminal, and a second terminal of the transistor MS6 are electrically connected to the wiring GL_j, the wiring SL_$4k-3$, and a gate of the transistor MD6, respectively. A first terminal and a second terminal of the transistor MD6 are electrically connected to the wiring ML_$2k-1$ and a pixel electrode (cathode) of the EL element DE6, respectively. A first electrode and a second electrode of the capacitor CS6 are electrically connected to the gate of the transistor MD6 and the second terminal of the transistor MD6, respectively.

Figure 7B:
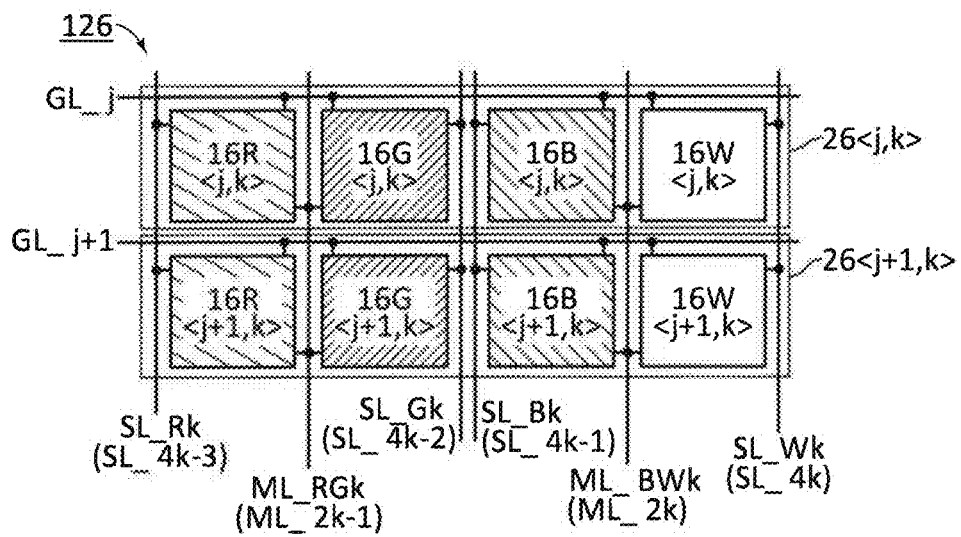
FIG. 7B illustrates a structure example of pixels.

FIG. 7B illustrates a structure example of pixels in the pixel array 126. The pixel array 126 includes a plurality of pixels 26. The pixel 26 is composed of four RGBW subpixels 16. As a matter of course, one pixel in the pixel arrays 124 and 125 can be composed of four RGBW subpixels 15. Furthermore, one pixel in the pixel array 126 can be composed of three RGB subpixels 16.

The arrangement of the pixels 26 in the pixel array 126 is similar to that of the pixels 25 in the pixel array 125, and the subpixels 16 provided in one column express the same color. The subpixels 16R are provided in the $(4k-3)$-th column, the subpixels 16G are provided in the $(4k-2)$-th column, the subpixels 16B are provided in the $(4k-1)$-th column, and the subpixels 16W are provided in the 4k-th column. Here, focusing on the pixel 26<j, k>, the structure of the pixel array 126 is described.

The pixel 26<j, k> is composed of the subpixels 16R<j, k>, 16G<j, k>, 16B<j, k>, and 16W<j, k> and is electrically connected to the wirings GL_j, SL_Gk, SL_Gk, SL_Bk, and SL_Wk. The subpixels 16R<j, k> and 16G<j, k> are electrically connected to the wiring ML_RGk, and the subpixels 16B<j, k> and 16W<j, k> are electrically connected to the wiring ML_BWk.

Figure 8A:
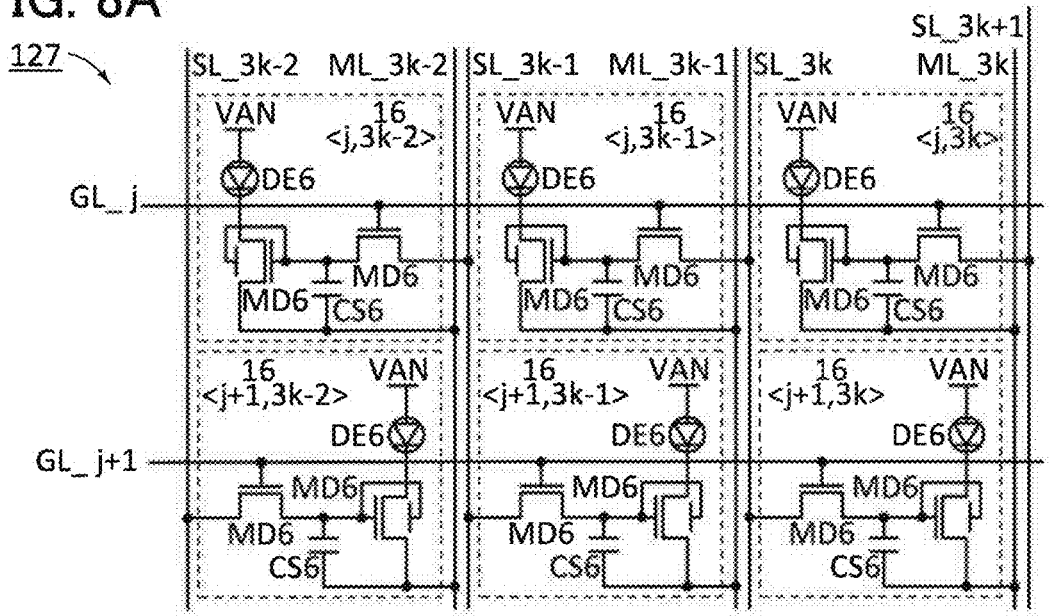
FIG. 8A is a circuit diagram illustrating a structure example of a pixel array, and FIGS. 8B and 8C each illustrate a structure example of pixels.

A pixel array 127 illustrated in FIG. 8A includes a plurality of subpixels 16 in a manner similar to that of the pixel array 126. Unlike the pixel array 126, the pixel array 127 includes a wiring ML in each column. Furthermore, the pixel array 127 is different from the pixel array 126 in the connection structure between the wirings SL and the subpixels 16. Focusing on the subpixels 16<j, $3k$> and 16<j+1, $3k$>, the structure of the pixel array 127 is described.

The subpixel 16<j, $3k$> is electrically connected to the wirings GL_j, SL_$3k$+1, and ML_$3k$, and the subpixel 16<j+1, $3k$> is electrically connected to the wirings GL_j+1, SL_$3k$, and ML_$3k$. That is, the subpixel 16 in the (j+1)-th row, the 3k-th column is electrically connected to the wiring SL_$3k$ having the same column number, and the subpixel 16 in the j-th row, the 3k-th column is electrically connected to the wiring SL_$3k$+1 in the next column.

Figure 8B:
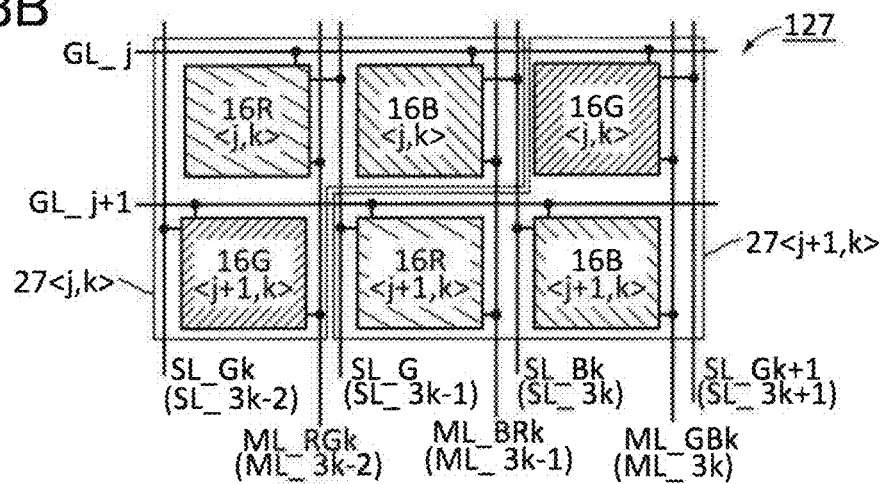
Figure 8C:
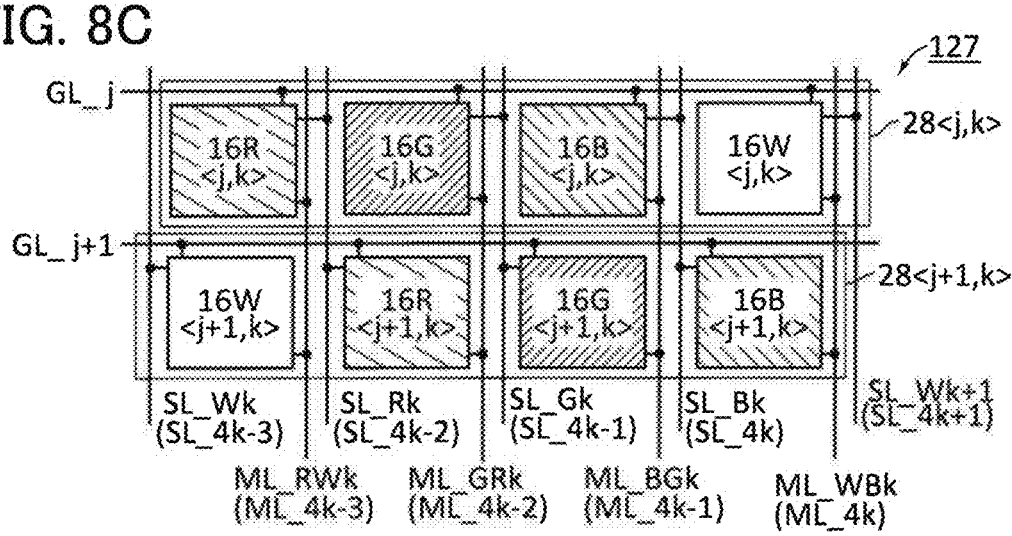

FIGS. 8B and 8C illustrate structure examples of pixels in the pixel array 127. FIG. 8B illustrates an example in which a pixel is composed of three RGB subpixels 16, and FIG. 8C illustrates an example in which a pixel is composed of four RGBW subpixels 16.

Unlike the pixel array 126, the pixel array 127 illustrated in FIG. 8B includes two subpixels 16 displaying two different colors in each column. The subpixels 16R and 16G are provided in the $(3k-2)$-th column, the subpixels 16B and 16R are provided in the $(3k-1)$-th column, and the subpixels 16G and 16B are provided in the 3k-th column. A unit block of the pixel array 127 is two pixels 27 (six subpixels 16 in two rows, three columns). The pixel 27<j, k> is composed of the subpixels 16R<j, k>, 16G<j+1, k>, and 16B<j, k>, and the pixel 27<j+1, k> is composed of the subpixels 16R<j+1, k>, 16G<j, k>, and 16B<j+1, k>.

In the pixel array 127 illustrated in FIG. 8C, subpixels 16R and 16W are provided in the (4k−3)-th column, the subpixels 16G and 16R are provided in the (4k−2)-th column, the subpixels 16B and 16G are provided in the (4k−1)-th column, and the subpixels 16W and 16B are provided in the 4k-th column. A unit block of the pixel array 127 is two pixels 28 (eight subpixels 16 in two rows, four columns). The pixel 28<j, k> is composed of the subpixels 16R<j, k>, 16G<j, k>, 16B<j, k>, and 16W<j, k>.

<<Switch Circuit 137>>

More specific structure examples of the switch circuit 137 are described with reference to FIGS. 9A and 9B and FIGS. 10A and 10B. A switch circuit 141 illustrated in FIG. 9A and a switch circuit 143 illustrated in FIG. 10A can each be used as the switch circuit 137. In the drawings, m is an integer of more than 0, and k is an integer of more than or equal to 1 and less than or equal to m.

The switch circuit 141 includes m circuits 142, m terminals MIN, m terminals MOUT, and wirings L10, L11, and L12.

The terminals MIN are input terminals and electrically connected to the wirings ML. The terminals MOUT are output terminals and electrically connected to input terminals of the current sensing circuit 136. A signal MPON is input to the wiring L11, and a signal MSEL[1] is input to the wiring L12. For example, the wiring L10 functions as a power supply line that supplies a voltage V0.

Figure 9A:
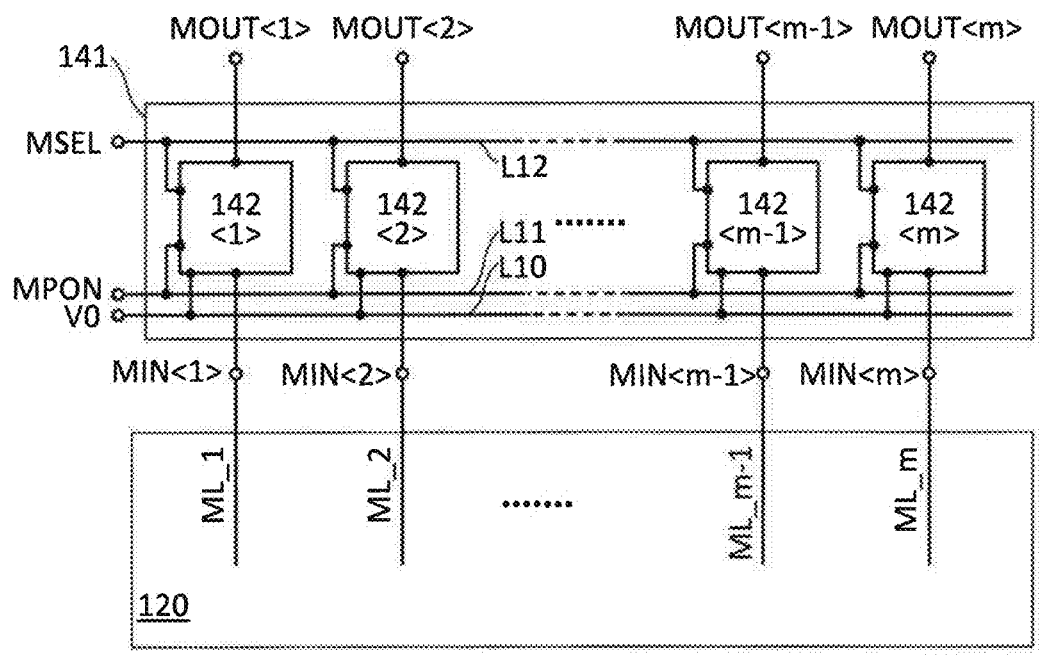
FIGS. 9A and 9B are circuit diagrams illustrating a structure example of a switch circuit.
Figure 9B:
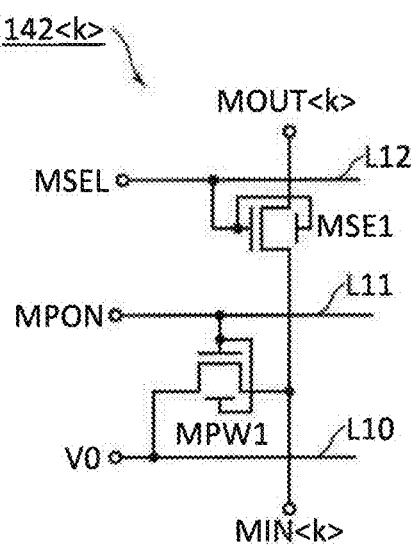

FIG. 9B illustrates a circuit structure example of the circuit 142<k>. The circuit 142<k> includes transistors MSE1 and MPW1 and terminals MIN<k> and MOUT<k>. The wiring ML<k> is electrically connected to the terminal MIN<k>.

A gate of the transistor MSE1 is electrically connected to the wiring L12, and a gate of the transistor MPW1 is electrically connected to the wiring L11. The transistor MSE1 functions as a switch that controls electrical continuity between the terminal MIN<k> and the terminal MOUT<k>. The transistor MPW1 functions as a switch that controls electrical continuity between the wiring L10 and the terminal MIN<k>. For example, in a period when the transistor MSE1 is off and thus the pixel array 120 is not electrically connected to the current sensing circuit 136, by turning on the transistor MPW1, the voltage of the wiring ML can be maintained at the voltage V0 by the switch circuit 141.

Figure 10A:
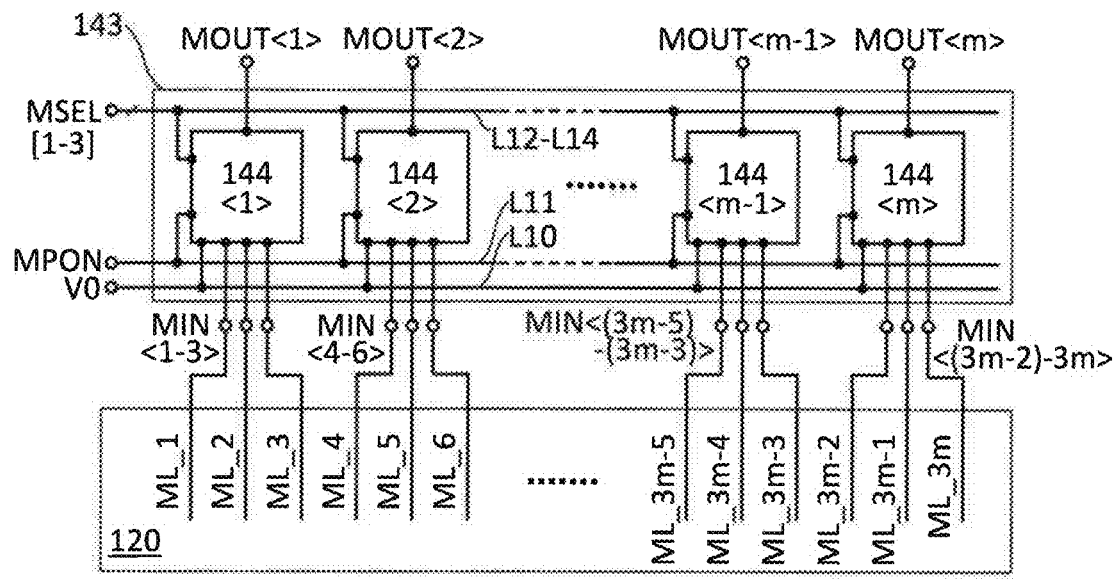
FIGS. 10A and 10B are circuit diagrams illustrating a structure example of a switch circuit.

The switch circuit 143 illustrated in FIG. 10A is a variation of the switch circuit 141. The switch circuit 143 includes m circuits 144, 3m terminals MIN, m terminals MOUT, and wirings L10, L11, L12, L13, and L14. Signals MSEL[1], MSEL[2], and MSEL[3] are input to the wiring L12, L13, and L14, respectively.

Figure 10B:
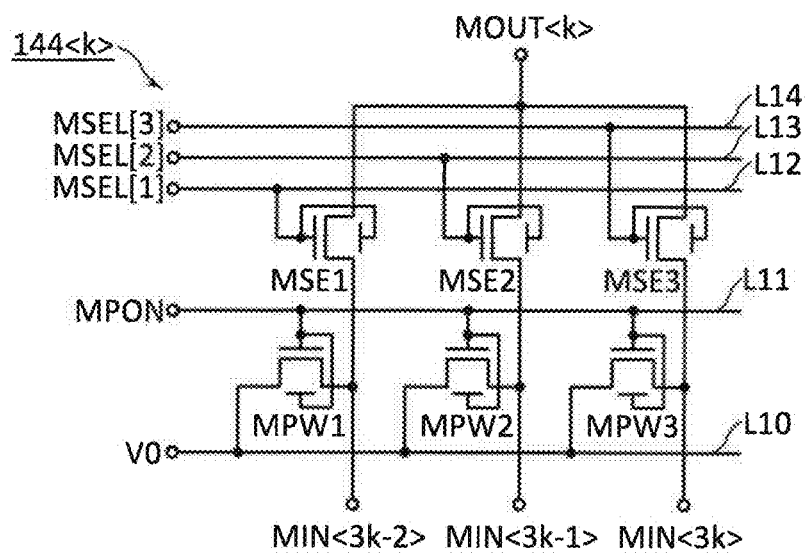

FIG. 10B illustrates a circuit structure example of the circuit 144<k>. The circuit 144<k> includes transistors MSE1, MSE2, MSE3, MPW1, MPW2, and MPW3, the terminals MIN<3k−2>, MIN<3k−1>, MIN<3k>, and MOUT<k>. The wirings ML<3k−2>, ML<3k−1>, and ML<3k> are electrically connected to the terminals MIN<3k−2>, MIN<3k−1>, and MIN<3k>, respectively.

A gate of the transistor MSE1, a gate of the transistor MSE2, and a gate of the transistor MSE3 are electrically connected to the wiring L12, the wiring L13, and the wiring L14, respectively. By the transistors MSE1 to MSE3, electrical continuity between the terminal MOUT<k> and the terminal MIN<3k−2>, MIN<3k−1>, and MIN<3k> is controlled. The transistor MSE1 has a function of a switch that controls electrical continuity between the terminal MOUT and the terminal MIN<3k−2>. The transistors MSE2 and MSE3 function as switches in a similar manner.

Gates of the transistors MPW1 to MPW3 are electrically connected to the wiring L11. By the transistors MPW1 to MPW3, electrical continuity between the wiring L10 and the terminal MIN<3k−2> to MIN<3k> is controlled. The transistor MPW1 has a function of a switch that controls electrical continuity between the wiring L10 and the terminal MIN<3k−2>. The transistors MPW2 and MPW3 function as switches in a similar manner.

The circuit 144<k> has not only a function of electrically connecting the wirings ML to the current sensing circuit 136 but also a function of adding currents of a plurality of wirings ML and supplying the added currents to the current sensing circuit 136. For example, by setting the signals MSEL[1] to MSEL[3] at high levels, a current flowing through the terminal MOUT<k> of the switch circuit 141 becomes the sum of currents flowing through the wirings ML<3k−2>, ML<3k−1>, and ML<3k>.

By providing the switch circuit 143, the number of output terminals of the current sensing circuit 136 can be reduced to one-third of the number of wirings ML. Thus, elements and wirings in the current sensing circuit 136 can be reduced. Moreover, current sensing on a subpixel basis or a pixel basis becomes possible in the current sensing circuit 136.

<<Switch Circuit 138>>

The switch circuit 138 is provided to drive the source lines by time division. By providing the switch circuit 138, the number of output terminals of the source driver circuit 135 can be reduced. The switch circuit 138 is provided as appropriate in accordance with the number of output terminals of the source driver circuit 135 and the number of wirings SL. More specific structure examples of the switch circuit 138 are described below with reference to FIGS. 11A and 11B and FIGS. 12A and 12B.

Figure 11A:
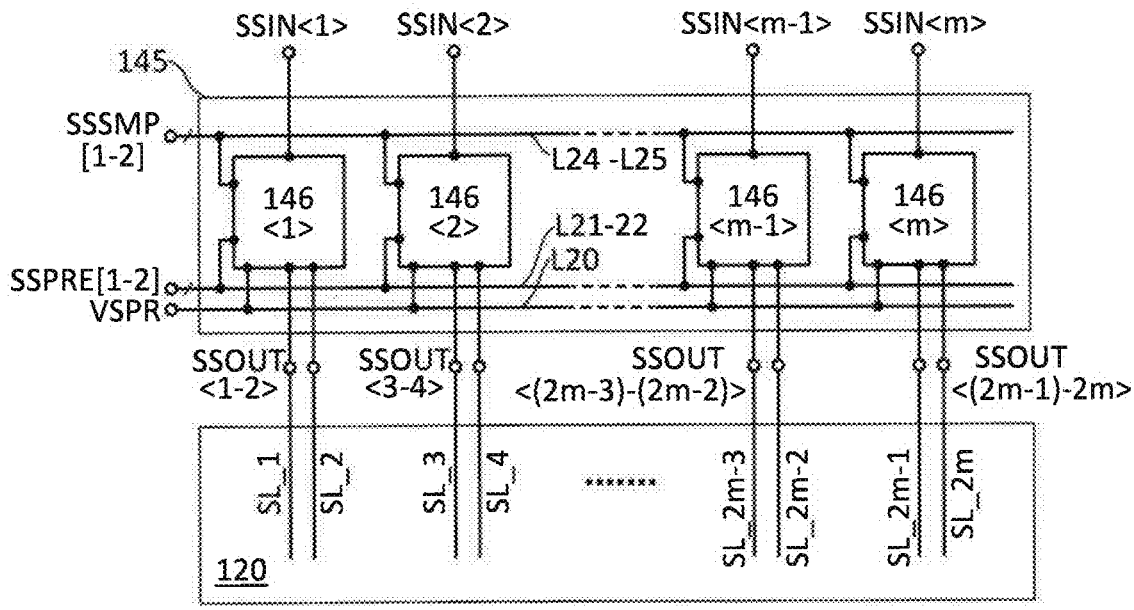
FIGS. 11A and 11B are circuit diagrams illustrating a structure example of a switch circuit.
Figure 11B:
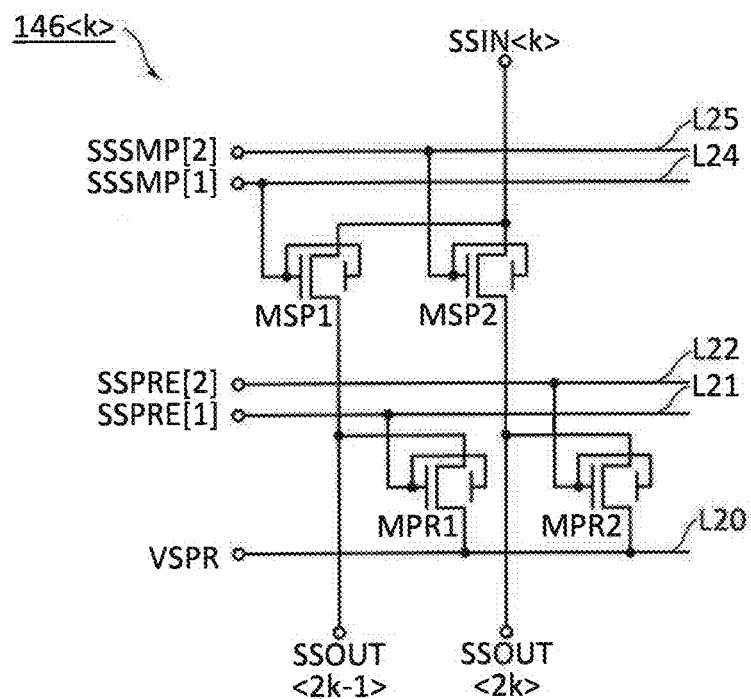
Figure 12A:
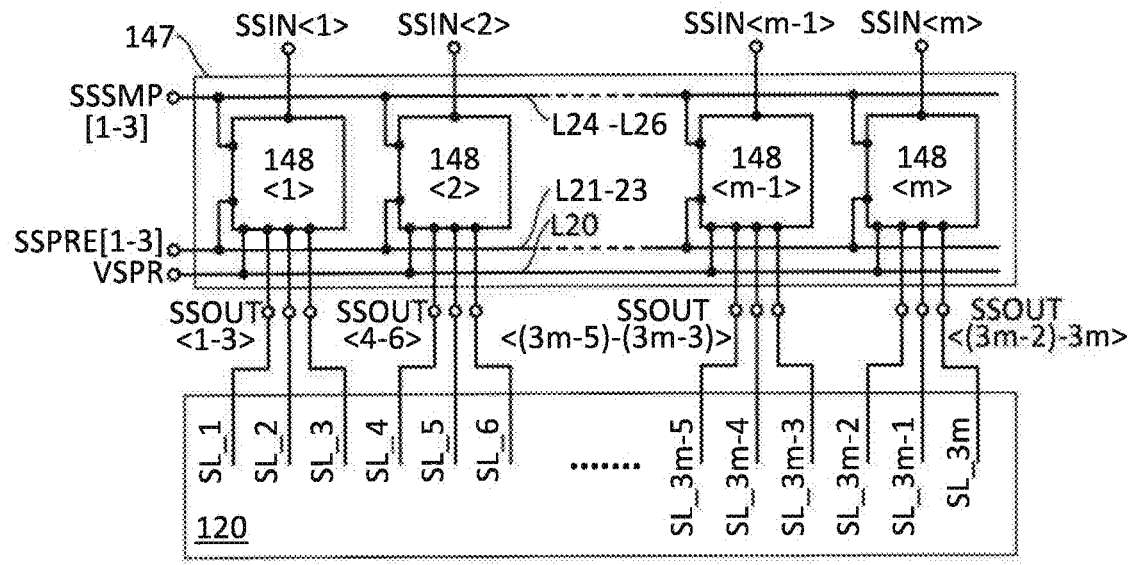
FIGS. 12A and 12B are circuit diagrams illustrating a structure example of a switch circuit.
Figure 12B:
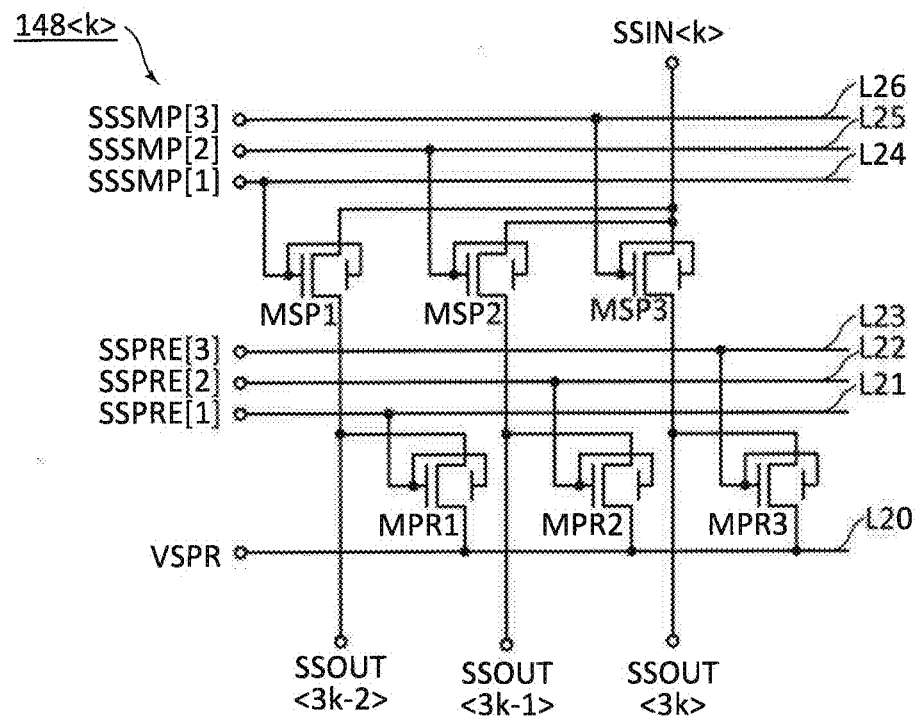

FIGS. 11A and 11B illustrate an example of a switch circuit of the case where two source lines are assigned to one output terminal of the source driver circuit 135. FIGS. 12A and 12B illustrate an example of a switch circuit of the case where three source lines are assigned to one output terminal of the source driver circuit 135. In the drawings, m is an integer of more than 0, and k is an integer of more than or equal to 1 and less than or equal to m.

A switch circuit 145 illustrated in FIG. 11A includes m circuits 146, m terminals SSIN, 2m terminals SSOUT, and wirings L20, L21, L22, L24, and L25.

The terminals SSIN are input terminals and electrically connected to the output terminals of the source driver circuit 135. The terminals SSOUT are output terminals and electrically connected to the wirings SL. Signals SSPRE[1] and SSPRE[2] are input to the wirings L21 and L22. Signals SSSMP[1] and SSSMP[2] are input to the wirings L24 and L25, respectively. For example, the wiring L20 can function as a power supply line that supplies a voltage VSPR.

FIG. 11B illustrates a circuit structure example of the circuit 146<k>. The circuit 146<k> includes transistors MSP1, MSP2, MPR1, and MPR2 and the terminals SSIN<k>, SSOUT<2k−1>, and SSOUT<2k>. The wirings SL<2k−1> and SL<2k> are electrically connected to the terminals SSOUT<2k−1> and SSOUT<2k>, respectively.

A gate of the transistor MSP1 and a gate of the transistor MSP2 are electrically connected to the wiring L24 and the wiring L25, respectively. The transistor MSP1 functions as a switch that controls electrical continuity between the terminal SSOUT<2*k*−1> and the terminal SSIN<k>, and the transistor MSP2 functions as a switch that controls electrical continuity between the terminal SSOUT<2*k*> and the terminal SSIN<k>. The transistors MSP1 and MSP2 constitute a one-input two-output demultiplexer. When one of the transistors MSP1 and MSP2 is on, one of the terminal SSOUT<2*k*−1> and the terminal SSOUT<2*k*> is electrically connected to the terminal SSIN<k>.

A gate of the transistor MPR1 and a gate of the transistor MPR2 are electrically connected to the wiring L21 and the wiring L22, respectively. The transistor MPR1 functions as a switch that controls electrical continuity between the terminal SSOUT<2*k*−1> and the wiring L20, and the transistor MPR2 functions as a switch that controls electrical continuity between the terminal SSOUT<2*k*> and the wiring L20. The transistors MPR1 and MPR2 can function as a precharge circuit for the wirings SL.

The precharge circuit provided in the switch circuit 145 enables the supply of a constant voltage to each wiring SL. Accordingly, without an electrical connection between the source driver circuit 135 and the pixel array 120, a simple display test of the pixel array 120 can be performed using the switch circuit 145.

A switch circuit 147 illustrated in FIG. 12A includes m circuits 148, m terminals SSIN, 3m terminals SSOUT, and wirings L20, L21, L22, L23, L24, L25, and L26. Signals SSPRE[1], SSPRE[2], and SSPRE[3] are input to the wirings L21, L22, and L23. Signals SSSMP[1], SSSMP[2], and SSSMP[3] are input to the wirings L24, L25, and L26.

The circuit 148 illustrated in FIG. 12B is a variation of the circuit 146. The circuit 148 includes three output terminals (SSOUT<3*k*−2>, SSOUT<3*k*−1>, and SSOUT<3*k*>), and further includes transistors MSP3 and MPR3.

A gate of the transistor MSP3 is electrically connected to the wiring L26. The transistors MSP1, MSP2, and MSP3 constitute a one-input three-output demultiplexer. When one of the transistors MSP1 to MSP3 is on, one of the terminals SSOUT<3*k*−2> to SSOUT<3*k*> is electrically connected to the terminal SSIN<k>.

A gate of the transistor MPR3 is electrically connected to the wiring L23. The transistor MPR3 controls electrical continuity between the terminal SSOUT<3*k*> and the wiring L20. The transistor MPR1, MPR2, and MPR3 constitute a precharge circuit.

<<Current Sensing Circuit 136>>

Figure 13:
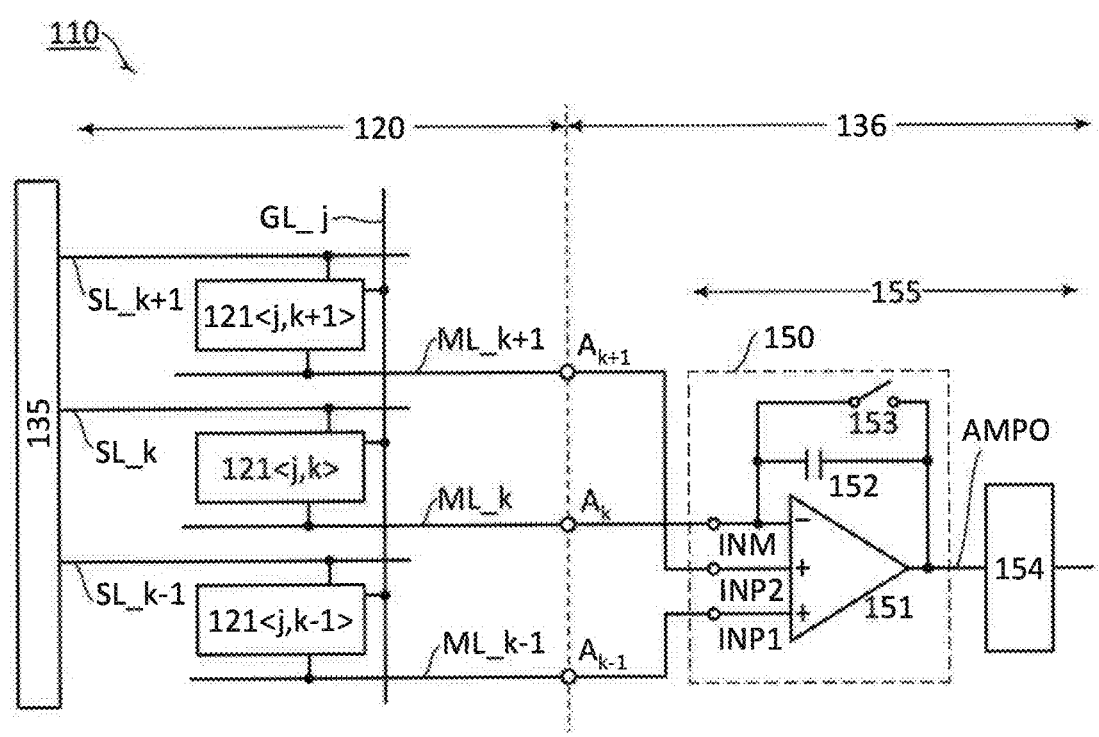
FIG. 13 is a circuit diagram illustrating a structure example of a current sensing circuit.

FIG. 13 is a drawing for explaining the current sensing circuit 136. FIG. 13 illustrates part of the components of the display unit 110 and does not illustrate the switch circuit 137, and the switch circuit 138. As typical components in the pixel array, the subpixel 121 in the j-th row, the (k−1)-th column to the subpixel 121 in the j-th row, the (k+1)-th column, and the wirings GL, SL, and ML for those subpixels are illustrated.

The current sensing circuit 136 includes terminals $A_{k-1}$ to $A_{k+1}$ and a circuit 155. The circuit 155 includes an integrating circuit 150 and a signal processing circuit 154. The terminals $A_{k-1}$ to $A_{k+1}$ are input terminals and electrically connected to wirings ML_k−1 to ML_k+1. The circuit 155 has a function of sensing a current flowing through the terminal $A_k$. In the current sensing circuit 136, a plurality of circuits 155 are provided in accordance with the number of input channels.

<Integrating Circuit 150>

The integrating circuit 150 includes an amplifier circuit 151, a capacitor 152, and a switch 153. The integrating circuit 150 integrates the current flowing through the terminal $A_k$ and generates a signal AMPO. The signal processing circuit 154 has a function of processing the signal AMPO. Since the signal AMPO is an analog signal, the signal processing circuit 154 has a function of performing analog-digital (A/D) conversion, for example.

The amplifier circuit 151 includes one inverting input terminal (terminal (−)) and two non-inverting input terminals (terminals (+)). In the following description, the terminal (−) of the amplifier circuit 151 is referred to as a terminal INM, one of the two terminals (+) is referred to as INP1, and the other is referred to as INP2. The same applies to the other amplifier circuits represented with the same circuit symbols as those of the amplifier circuit 151. The terminal $A_k$ is electrically connected to the terminal INM, the terminal $A_{k-1}$ is electrically connected to the terminal the terminal INP1, and the terminal $A_{k+1}$ is electrically connected to the terminal INP2.

(Amplifier Circuit 151)

Figure 14A:
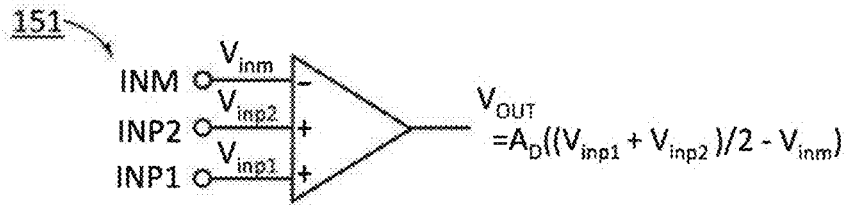
FIG. 14A is a circuit diagram illustrating an example of a function of an amplifier circuit of a current sensing circuit.

The amplifier circuit 151 has a function of amplifying a difference between a voltage of the inverting input terminal (−) and an average voltage of a voltage of the terminal INP1 and a voltage of the terminal INP2. For example, in the case where voltages input to the terminals INP1, INP2, and INM are $V_{inp1}$, $V_{inp2}$, and $V_{inm}$, the amplifier circuit 151 has a function of amplifying a difference voltage (($V_{inp1}$ $V_{inp2}$)/2−$V_{inm}$) of these input terminals. Given that the amplification factor (differential gain) of the amplifier circuit 151 is $A_D$ and the common mode gain thereof is 0 dB, the relation between a voltage $V_{OUT}$ of the signal AMPO and $V_{inp1}$, $V_{inp2}$, and $V_{inm}$ is represented by the following formula: $V_{OUT}=A_D((V_{inp1}+V_{inp2})/2-V_{inm})$ (see FIG. 14A).

Figure 14B:
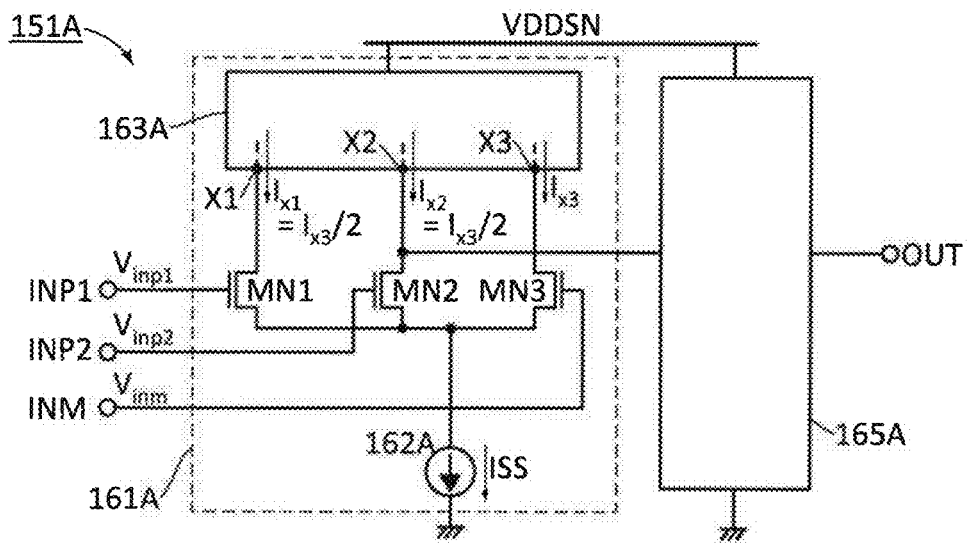
FIGS. 14B and 14C are circuit diagrams each illustrating a structure example of the amplifier circuit.
Figure 14C:
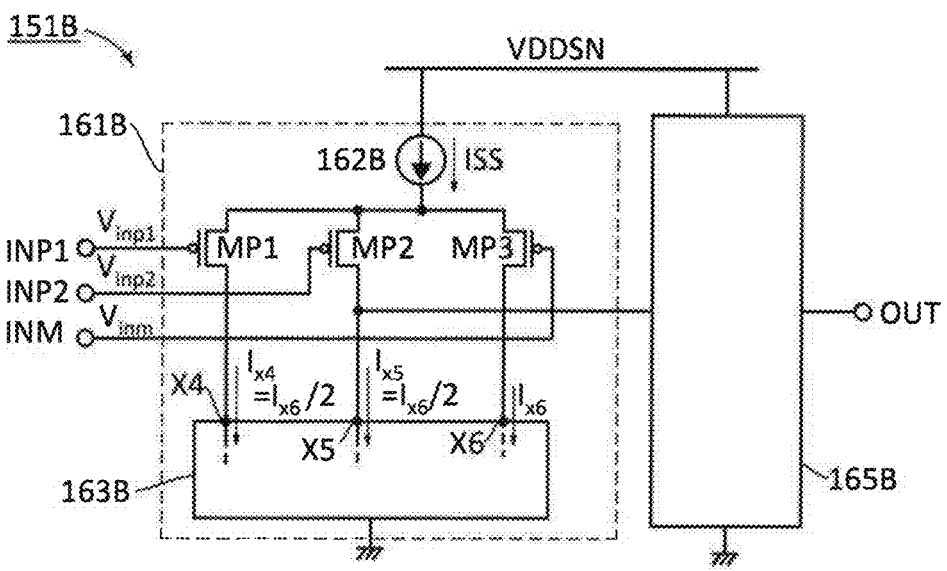

FIGS. 14B and 14C illustrate structure examples of an amplifier circuit used as the amplifier circuit 151. In an amplifier circuit 151A illustrated in FIG. 14B, a differential amplifier circuit 161A is provided in an input stage, and an output buffer circuit 165A is provided in an output stage. VDDSN is a power supply voltage of the amplifier circuit 151A. The output buffer circuit 165A is provided as necessary. The output buffer circuit 165A can be an output buffer circuit used in a known operational amplifier. The output buffer circuit can be composed of a common-source amplifier circuit or a source follower circuit, for example.

The differential amplifier circuit 161A includes a current source 162A, transistors MN1 to MN3, and a load circuit 163A. The current source 162A consists of an n-channel transistor, for example. The transistors MN1 to MN3 are input transistors of the differential amplifier circuit 161A. A gate of the transistor MN3 is electrically connected to the terminal INM. Gates of the transistors MN1 and MN2 are electrically connected to the terminals INP1 and INP2, respectively.

The differential amplifier circuit 161A has symmetry similar to that of a basic differential input pair. The transistors MN1 to MN3 are designed such that the transconductances of the transistors MN1 and MN2 are equal to each other and are half the transconductance of the transistor MN3. For design specifications, the channel lengths of the transistors MN1 to MN3 are the same and the channel width of each of the transistors MN1 and MN2 is half that of the transistor MN3. Note that in the differential amplifier circuit 161A that is actually manufactured, the transconductance, channel length, and channel width of these transistors cannot strictly satisfy the above relations because of influences of process variation or the like; thus, they may vary within a range that does not interfere with the operation of the differential amplifier circuit 161A. This applies also to the following description.

Note that the transistor MN1 may be a plurality of transistors that are electrically connected in series and/or in parallel. The same applies to the transistors MN2 and MN3 and transistors in other drawings.

The load circuit 163A has a function of applying load to nodes X1, X2, and X3 so that $I_{X1}$, $I_{X2}$, and $I_{X3}/2$ are equal to each other, where $I_{X1}$, $I_{X2}$, and $I_{X3}$ are currents that flow through the nodes X1, X2, and X3. The load circuit 163A can consist of an appropriate combination of a linear resistor, a current mirror circuit composed of p-channel transistors, a diode-connected p-channel transistor, and a current source circuit formed of a p-channel transistor, for example.

FIG. 14C illustrates a structure example in which input transistors are p-channel transistors. An amplifier circuit 151B includes a differential amplifier circuit 161B and an output buffer circuit 165B. The differential amplifier circuit 161B includes transistors MP1 to MP3, a current source 162B, and a load circuit 163B. The differential amplifier circuit 161B has a function of amplifying a voltage ($V_{inp1}/2+V_{inp2}/2-V_{inm}$).

The channel lengths of the transistors MP1 to MP3 are the same, and the channel width of each of the transistors MP1 and MP2 is half that of the transistor MP3. The load circuit 163B has a function of supplying nodes X4 to X6 with load that satisfies $I_{X4}=I_{X5}=I_{X6}/2$, where $I_{X4}$ to $I_{X6}$ are currents that flow through the nodes X4 to X6. The load circuit 163B can consist of an appropriate combination of a linear resistor, a current mirror circuit composed of n-channel transistors, a diode-connected p-channel transistor, and a current source circuit formed of an n-channel transistor, for example.

Figure 15A:
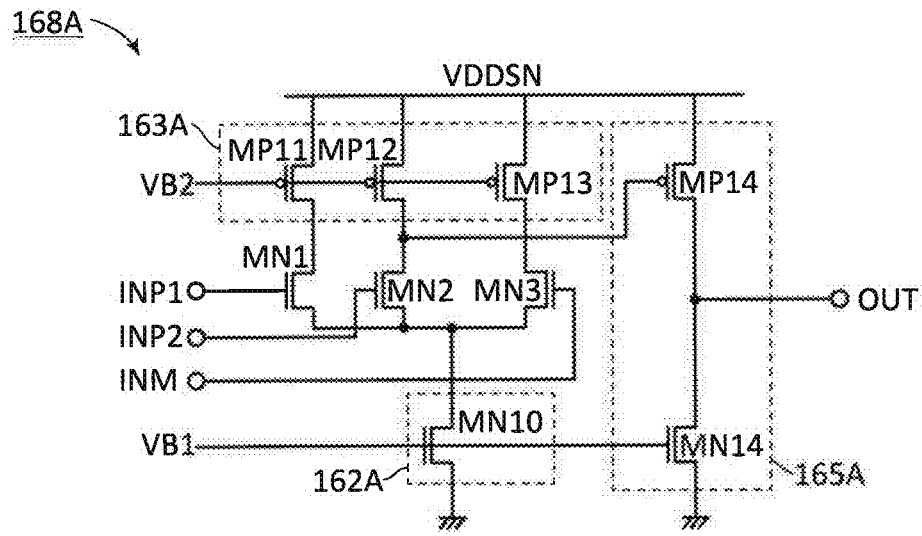
FIGS. 15A and 15B are circuit diagrams each illustrating a structure example of an amplifier circuit.
Figure 15B:
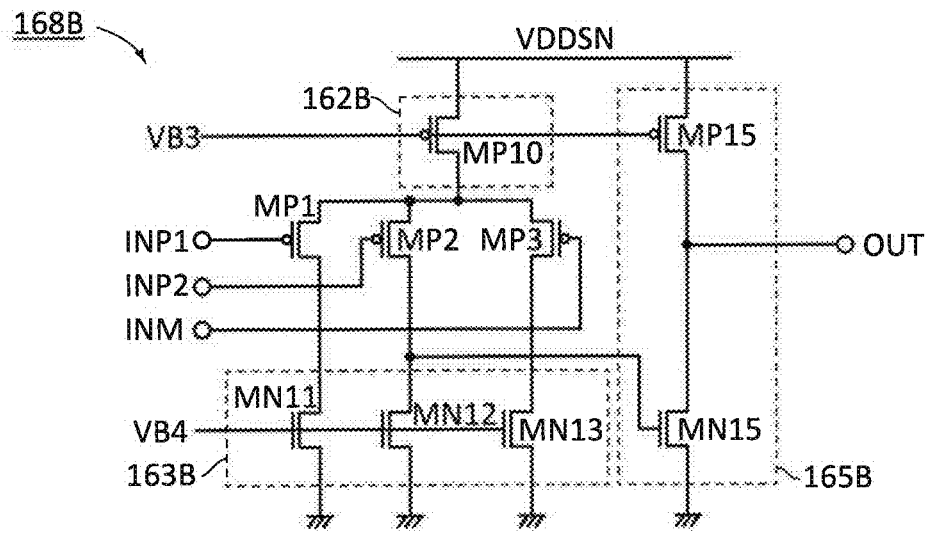

FIGS. 15A and 15B illustrate more specific circuit structure examples of the respective amplifier circuits 151A and 151B. An amplifier circuit 168A illustrated in FIG. 15A includes the transistors MN1 to MN3 and transistors MN10, MN14, and MP11 to MP14. VB1 and VB2 are each a bias voltage. The channel lengths of the transistors MP11 to MP13 are the same, and the channel width of each of the transistors MP11 and MP12 is half that of the transistor MP13.

An amplifier circuit 168B illustrated in FIG. 15B includes the transistors MP1 to MP3 and transistors MP10, MP15, MN11 to MN13, and MN15. VB3 and VB4 are each a bias voltage. The channel lengths of the transistors MN11 to MN13 are the same, and the channel width of each of the transistors MN11 and MN12 is half that of the transistor MN13.

<Circuit 155>

Figure 16:
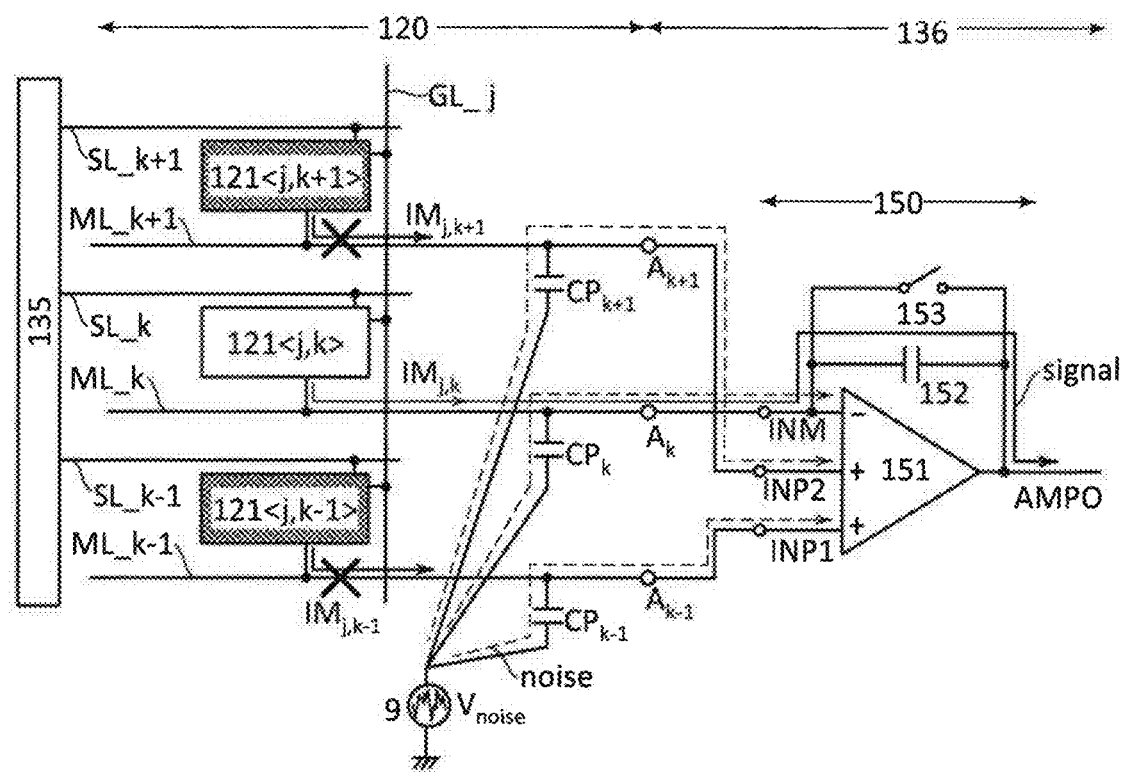
FIG. 16 is a circuit diagram illustrating an operation example of a current sensing circuit.

The high-SNR sensing of the circuit 155 is described with reference to FIG. 16. FIG. 16 is a schematic circuit diagram illustrating an operation example of the integrating circuit 150 in sensing a current $IM_{j,k}$ flowing through the wiring ML_k. The current $IM_{j,k}$ is a current that is input to the wiring ML_k from the subpixel 121<j, k>. Here, 9 denotes a noise source, and $V_{noise}$ is a voltage of the noise source 9. $CP_k$ is a capacitance between the noise source 9 and the wiring ML_k. An arrow indicated by a broken line represents noise. An arrow indicated by a solid line represents a signal.

The wiring ML_k is a sensing target. The integrating circuit 150 utilizes two wirings ML_k−1 and ML_k+1, which are adjacent to the wiring ML_k, as power supply lines that supply reference voltages, in order to integrate a signal of the wiring ML_k. Therefore, the current $IM_{j,k}$ is made to flow through the wiring ML_k, which is the sensing target, while the current $IM_{j,k-1}$ and $IM_{j,k+1}$ are made not to flow through the wirings ML_k−1 and ML_k+1. Before the sensing of the current $IM_{j,k}$, a grayscale signal at the potential level at which the current $IM_{j,k-1}$ is not generated is written to the subpixel 121<j, k−1>. The same applies to the subpixel 121<j, k+1>. In addition, a grayscale signal at the potential level at which the current $IM_{j,k}$ is generated is written to the subpixel 121<j, k>. For example, when an image signal is a 12-bit signal, a grayscale signal (a grayscale signal for black display) with a grayscale value of 0 is written to each of the subpixels 121<j, k−1> and 121<j, k+1>, and a grayscale signal (a grayscale signal for white display) with a grayscale value of 4095 is written to the subpixel 121<j, k>.

An average voltage of a voltage of the wiring ML_k−1 and a voltage of the wiring ML_k+1 is used as a reference voltage of the integrating circuit 150. Because the wirings ML_k−1 to ML_k+1 are provided adjacently, noise of these wirings have a high correlation. Thus, in the integrating circuit 150, noise of the wiring ML_k can be removed effectively by noise of the wiring ML_k−1 and ML_k+1; accordingly, the signal AMPO with a high SNR can be obtained. Because a voltage of the signal AMPO corresponds to the value of the current $IM_{j,k}$, removing a noise component from the signal AMPO allows the value of the current $IM_{j,k}$ to be obtained more accurately. Moreover, since the noise component of the signal AMPO is reduced, signal processing performed in the signal processing circuit 154 which is in a next stage of the integrating circuit 150 is facilitated. Furthermore, higher performance of the signal processing circuit 154 is facilitated.

Note that a switch circuit that controls electrical continuity between the circuit 155 and the input terminals of the current sensing circuit 136 can be provided in the current sensing circuit 136. By using a programmable switch circuit, the current sensing circuit 136 can have a plurality of current sensing modes. With reference to FIGS. 17A, 17B1, 17B2, 17C1, 17C2, and 17D, the current sensing modes and their corresponding circuit structures of the switch circuit are described. In the drawings, 158 denotes a switch circuit.

The switch circuit 158 includes a plurality of switches. A more specific structure example of the switch circuit 158 is described later. The switch circuit 158 has a function of controlling electrical continuity between the terminals $A_{k-1}$ to $A_{k+1}$ and the integrating circuit 150 and electrical continuity between the terminals $A_{k-1}$ to $A_{k+1}$ and the wiring L58. The wiring L58 is a power supply line that supplies VREF. VREF is used as a reference voltage of the integrating circuit 150.

Depending on the circuit structure of the switch circuit 158, the circuit structure of the amplifier circuit 151 can be set to any one structure of a single-ended input type amplifier circuit, a conventional differential amplifier circuit, and a differential amplifier circuit of this embodiment illustrated in FIG. 16. The same applies to the integrating circuit 150. To make a distinction from the conventional differential amplifier circuit, a differential amplifier circuit and a differential integrating circuit of this embodiment can be referred to as a "3-input differential amplifier circuit" and a "3-input differential integrating circuit", respectively, in some cases.

(3-Input Differential Sensing)

3-input differential sensing is a method of sensing a signal illustrated in FIG. 16. In the 3-input differential sensing, the integrating circuit 150 functions as a 3-input differential integrating circuit. Accordingly, the terminals $A_{k-1}, A_k, A_{k+1}$ are electrically connected to the terminals INP1, INM, and INP2, respectively, of the integrating circuit 150 by the switch circuit 158 (FIG. 17A).

(Differential Sensing)

In differential sensing, the integrating circuit 150 functions as a conventional differential input type integrating circuit. By the switch circuit 158, the terminal INM is electrically connected to the terminal $A_k$, and the terminals INP1 and INP2 are electrically connected to one of the terminal pair $A_{k-1}$ and $A_{k+1}$ (FIGS. 17B1 and 17B2). For example, the circuit structure in FIG. 17B1 is equivalent to that of a conventional differential integrating circuit 150B illustrated in FIG. 17C1.

When the current $IM_{j,k}$ flowing through the wiring ML_k is sensed, as a reference voltage of the integrating circuit 150, voltages of the two wirings ML_k−1 and ML_k+1 are used in the 3-input differential sensing and a voltage of one wiring ML_k−1 (or the wiring ML_k+1) is used in the differential sensing. The voltage $V_{noise}$ caused by the noise source 9 varies among these wirings ML_k to ML_k+1. Since the voltages of the two wirings ML_k−1 and ML_k+1 are used as a reference voltage in the 3-input differential sensing, the voltage component from the noise source 9 can be leveled off. Accordingly, noise reduction from the signal AMPO can be more effectively achieved in the 3-input differential sensing than in the differential sensing.

(Single-Ended Sensing)

In single-ended sensing, an input signal of the amplifier circuit 151 is a single-ended signal, and the voltage VREF is input to the terminal pair INP1 and INP2. By the switch circuit 158, the terminal INM is electrically connected to the terminal $A_k$, and the terminals INP1 and INP2 are electrically connected to the wiring L58 (FIG. 17D). The circuit structure of FIG. 17D is equivalent to that of an integrating circuit 150D illustrated in FIG. 17C2.

Note that the functions of the switch circuit 158 are not limited to the above-described functions. For example, the switch circuit 158 has a function of precharging the terminals $A_k$ to $A_{k+1}$ with VREF by electrically connecting the terminals $A_k$ to $A_{k+1}$ to the wiring L58. The switch circuit 158 can have a function of precharging the terminals INM, INP1, and INP2 with VREF by electrically connecting the terminals INM, INP1, and INP2 to the wiring L58. Furthermore, the switch circuit 158 can have a function of making the terminal INM in a high impedance state.

Although the example of using the circuit 155 as a circuit which senses a current of a pixel array has been described here, the application range of the circuit 155 is not limited to this example. The circuit 155 can be used in a variety of semiconductor devices as a circuit which senses an analog signal. The function of the signal processing circuit 154 can be determined in accordance with the semiconductor device in which the circuit 155 is used.

<<Source Driver IC>>

The peripheral circuit 130 of the display unit 110 can be composed of a dedicated IC. The dedicated IC may be a gate driver IC, a source driver IC, or a driver IC including both a gate driver IC and a source driver IC, for example. A structure example of a source driver IC having both functions of the source driver circuit 135 and the current sensing circuit 136 is described below with reference to FIG. 18 and the like.

Figure 18:
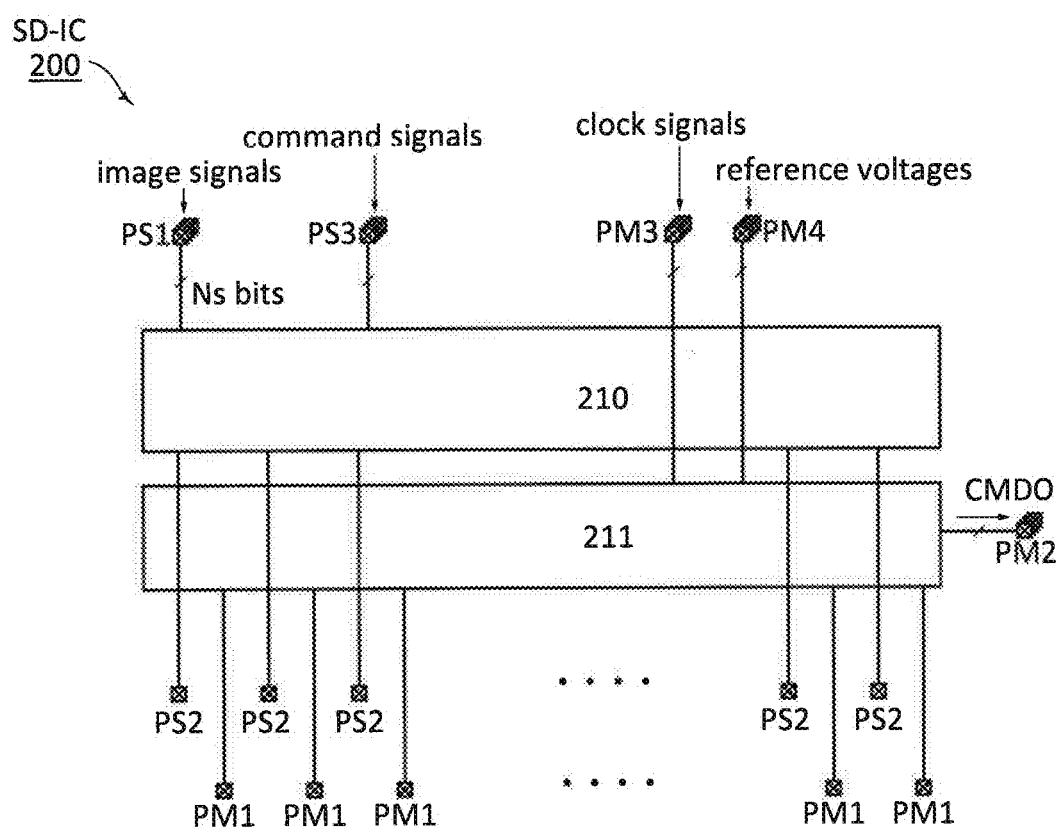
FIG. 18 is a block diagram illustrating a structure example of a source driver IC (SD-IC)

FIG. 18 is a block diagram illustrating the structure example of the source driver IC. A source driver IC (SD-IC) 200 includes a source driver unit (SD unit) 210 (referred to as an SD unit 210 in the following description), a current sensing unit (hereinafter referred to as a "CM unit 211"), and a plurality of pins PS1, PS2, PS3, PM1, PM2, PM3, and PM4.

The SD unit 210 has a function of processing image signals transmitted from the display controller 171 ($N_S$-bit digital signals, where $N_S$ is an integer of 1 or more) and generating a grayscale signal. The image signals are input from the pins PS1. The pins PS2 are output pins for the grayscale signal and are electrically connected to the switch circuit 138. In the case where the switch circuit 138 is not provided in the display unit 110, each of the pins PS2 is electrically connected to the wiring SL. The pins PS3 are signal input pins, and various signals such as command signals are input to the pins PS3.

The CM unit 211 has a function of processing analog signals (currents) input from the pins PM1 and generating digital signals. The pins PM1 are electrically connected to the switch circuit 137. A signal CMDO is an output signal of the CM unit 211 and is output from the pins PM2. The pins PM3 are signal input pins, and various signals such as clock signals are input to the pins PS3. The pins PM4 are input pins for reference voltages.

<SD Unit 210>

Figure 19:
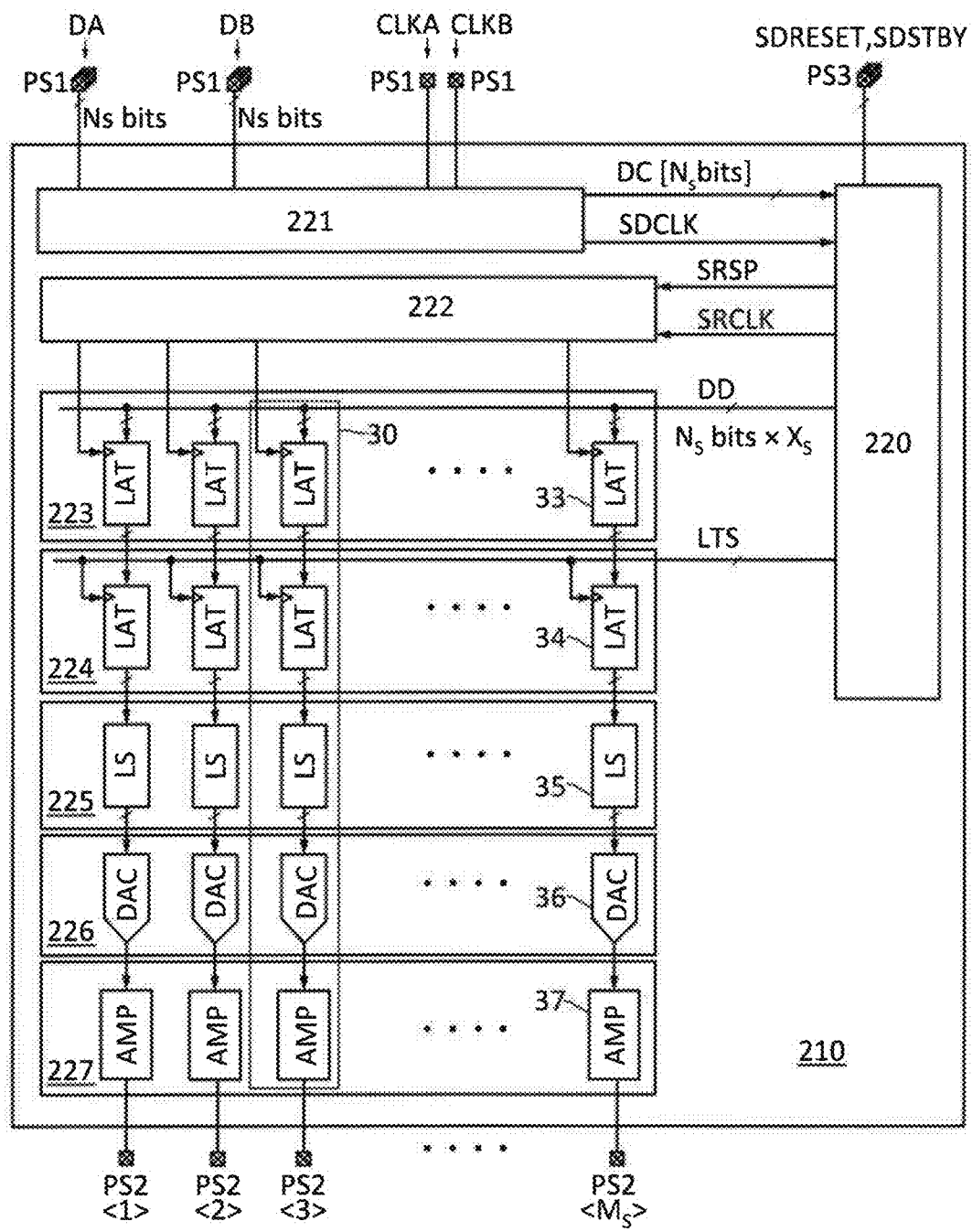
FIG. 19 is a block diagram illustrating a structure example of a source driver unit.

FIG. 19 is a block diagram illustrating a structure example of the SD unit 210. The SD unit 210 includes a logic circuit 220, a receiver 221, a shift register (SR) 222, latch units 223 and 224, a level shifter unit 225, a digital-analog (D/A) conversion unit 226, and an amplifier unit 227.

A plurality of pins PS1, $M_S$ ($M_S$ is an integer of 1 or more) pins PS2, and a plurality of pins PS3 are electrically connected to the SD unit 210.

The receiver 221 has a function of receiving image signals. The transmission method for image signals and clock signals here is differential signaling. The receiver 221 has a function of converting an input differential signal into a single-ended signal. For example, as the receiver 221, a low voltage differential signaling (LVDS) receiver can be used.

The pins PS1 are input pins of differential signals, and image signals DA and DB and signals CLKA and CKB are input to the pins PS1. A signal pair formed of an $N_S$-bit ($N_S$ is an integer of 1 or more) image signal DA and an $N_S$-bit image signal DB is a differential image signal. The image signals DA and DB are transmitted from the display controller 171. A signal pair formed of a signal CLKA and a signal CLKB is a differential clock signal. In the receiver 221, the image signals DA and DB are converted to a single-ended $N_S$-bit image signal DC, and the signals CLKA and CLKB are converted to a single-ended signal SDCLK. The image signal DC and the signal SDCLK are each input to the logic circuit 220.

The logic circuit 220 has a function of controlling the circuits inside the SD unit 210 in accordance with the signal SDCLK, the command signals input from the outside, and the like. Specifically, the logic circuit 220 generates signals SRSP, SRCLK, and LTS, for example. The signals SRSP and SRCLK are control signals for the shift register 222. The signal LTS is a control signal for the latch circuit 224.

The pins PS3 are pins for inputting command signals. A signal SDRESET is a reset signal, and a signal SDSTBY is a standby signal. In the case where the transmission method for the command signals is differential signaling, the command signals are input to the logic circuit 220 through the receiver 221.

The logic circuit 220 has a function of converting serial image signals DC to parallel image signals DD (serial-to-parallel conversion function). Here, the logic circuit 220 divides an image signal DC into $X_S$ ($X_S$ is an integer of 1 or more) parts to generate $X_S$ image signals DD ($N_S$ bits). The image signals DD are output to the latch unit 223. The value of the image signals DD expresses a grayscale value written to subpixels.

The latch unit 223 includes $M_S$ latch circuits (LAT) 33, and the latch unit 224 includes $M_S$ latch circuits 34. The latch circuits 33 and 34 can store $N_S$-bit data. The level shifter unit 225 includes $M_S$ level shifters (LS) 35. The D/A conversion unit 226 includes $M_S$ D/A conversion circuits (DAC) 36. The DACs 36 each have a function of converting an $N_S$-bit digital signal to an analog signal. The amplifier unit 227 includes $M_S$ amplifier circuits (AMP) 37.

The shift register 222 includes a plurality of stages of flip-flops. When a signal SRSP (start pulse signal) is input to the flip-flop in the first stage, a sampling signal is output from the flip-flop in each stage at a predetermined timing. The timing for outputting a sampling signal from the flip-flop in each stage is controlled by the signal SRCLK (clock signal).

The latch unit 223 stores the image signal DD in the latch circuit 33 in a column that the sampling signal designates. In the latch unit 224, data in the latch circuits 34 in all the columns are rewritten to data of the corresponding latch circuits 33 at the same time by the signal LTS (latch signal).

Figure 30:
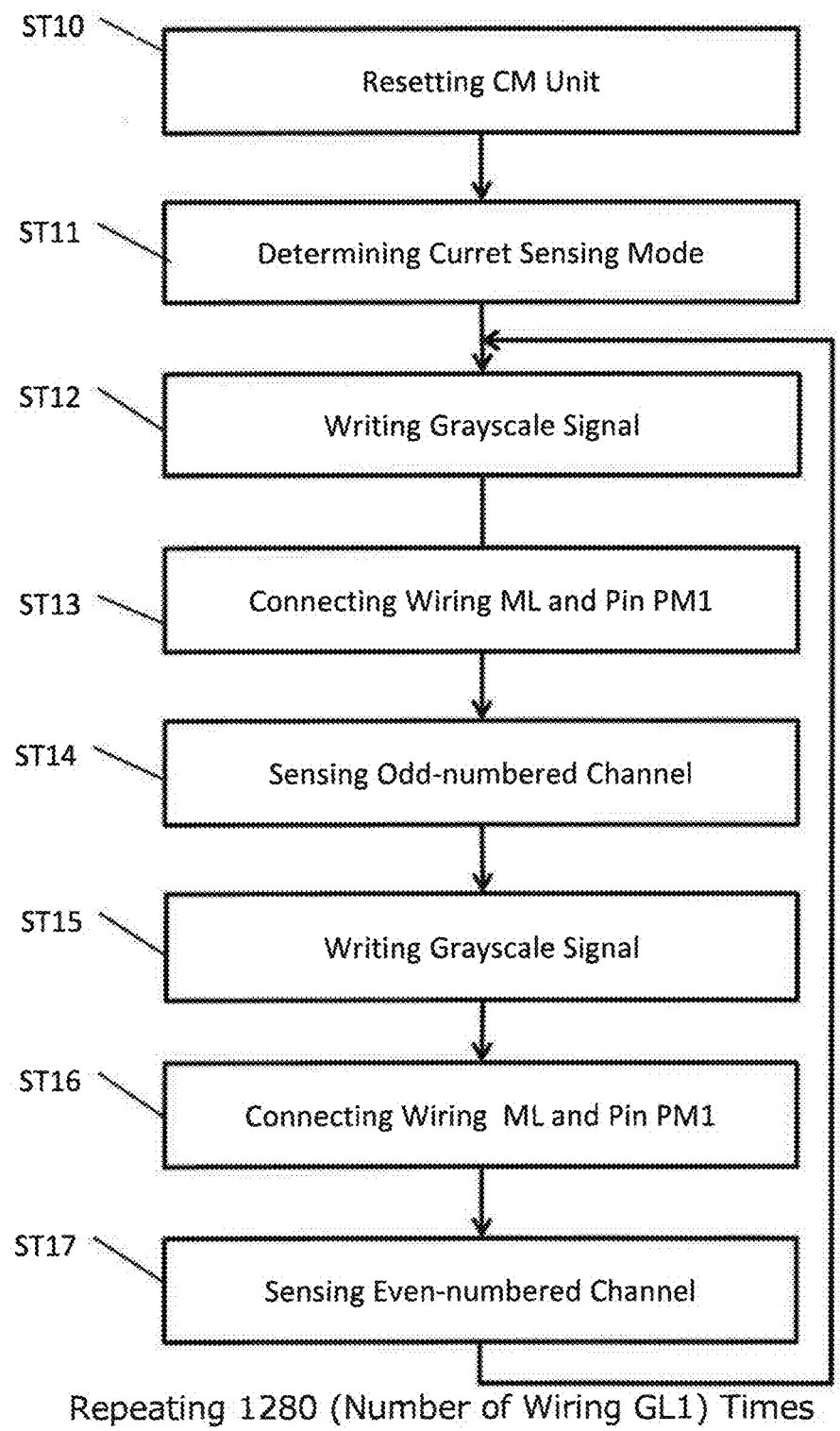
FIG. 30 is a flow chart showing a current sensing operation example of a display unit.

The level shifters 35 process the image signals output from the latch circuits 34 and generate boosted complementary signals. The DACs 36 convert the signals (digital signals) output from the level shifters 35 to analog signals. The amplifier circuits 37 amplify the signals (analog signals) output from the DACs 36 and output the amplified signals to the pins PS2. The output signals of the pins PS2 are grayscale signals input to the wirings SL. A circuit 30 illustrated in FIG. 30 is an elementary circuit that converts an $N_S$-bit image signal DD to a grayscale signal.

<CM Unit 211>

Figure 20:
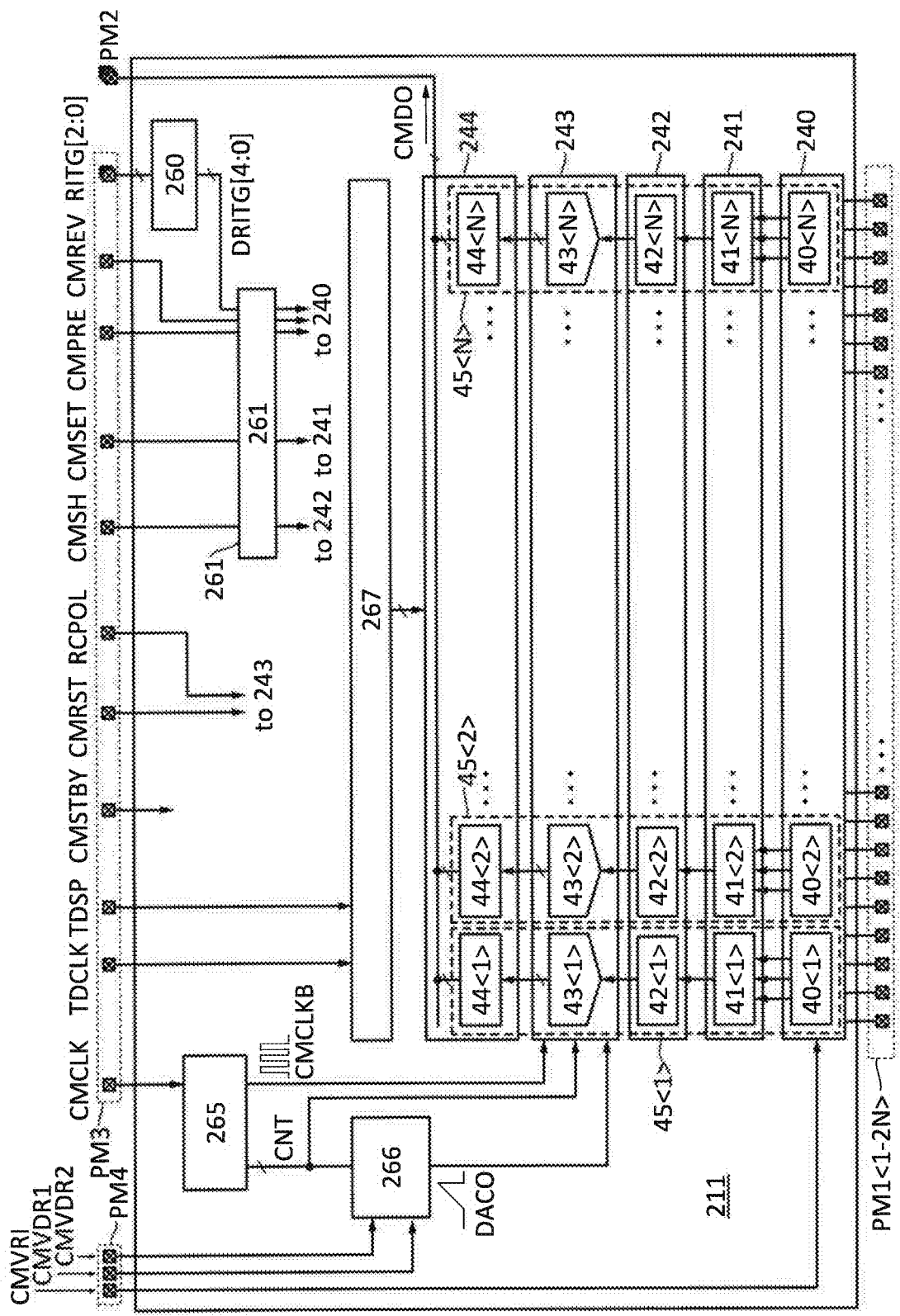
FIG. 20 is a block diagram illustrating a structure example of a current sensing unit (CM unit)

FIG. 20 is a block diagram illustrating a structure example of the CM unit 211. The CM unit 211 includes an input unit 240, an integrating unit 241, a sample-and-hold (S/H) unit 242, an A/D conversion unit 243, an output unit 244, a logic circuit 260, a level shifter unit 261, a counter 265, a DAC 266, and a shift register 267.

Various signals are input from the pins PM3 to the CM unit 211. For example, a signal CMSTBY is a standby signal, by which whether the CM unit 211 is brought to a standby mode or an active mode is determined. The three pins PM4 are input pins for reference voltages. A voltage CMVRI, a voltage CMVDR1, and a voltage CMVDR2 are input to the three pins PM4.

Here, the number of input channels in the CM unit 211 is 2N (N is an integer of more than 0). 2N pins PM1 are connected to the CM unit 211. The input unit 240 includes N switch circuits 40. The integrating unit 241 includes N integrating circuits 41. The S/H unit 242 includes N sample-and-hold (S/H) circuits 42. The A/D conversion unit 243 includes N A/D conversion circuits (ADC) 43. The output unit 244 includes N output circuits 44.

In the CM unit 211, a circuit 45 is an elementary circuit of the current sensing unit. The circuit 45 includes the switch circuit 40, the integrating circuit 41, the S/H circuit 42, the ADC 43, and the output circuit 44. The CM unit 211 includes N circuits 45<1>-45<N> corresponding to the 2N input channels.

<Elementary Circuit (Circuit 45)>

Figure 21:
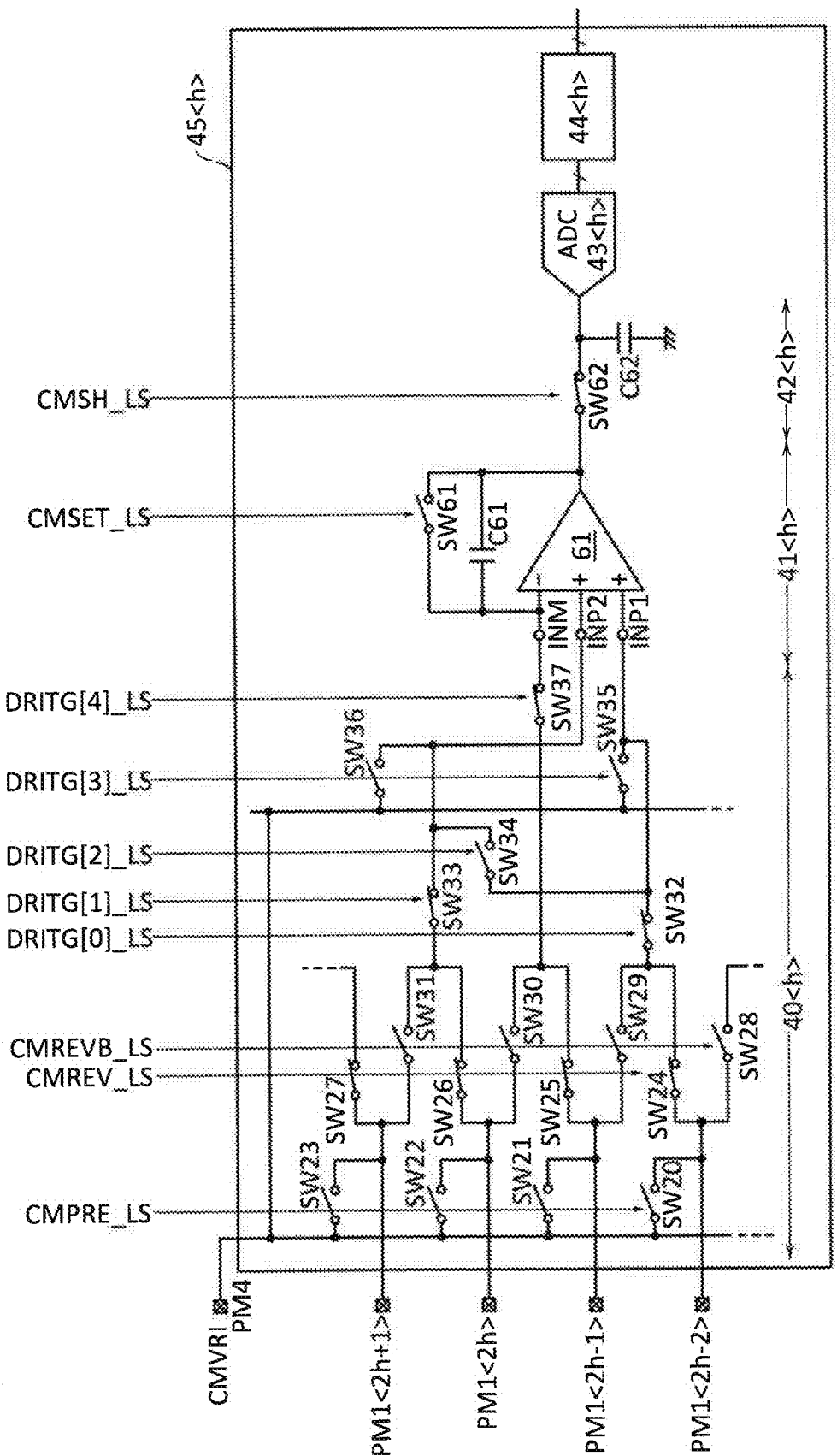
FIG. 21 is a circuit diagram illustrating a structure example of a circuit in a CM unit.
Figure 23:
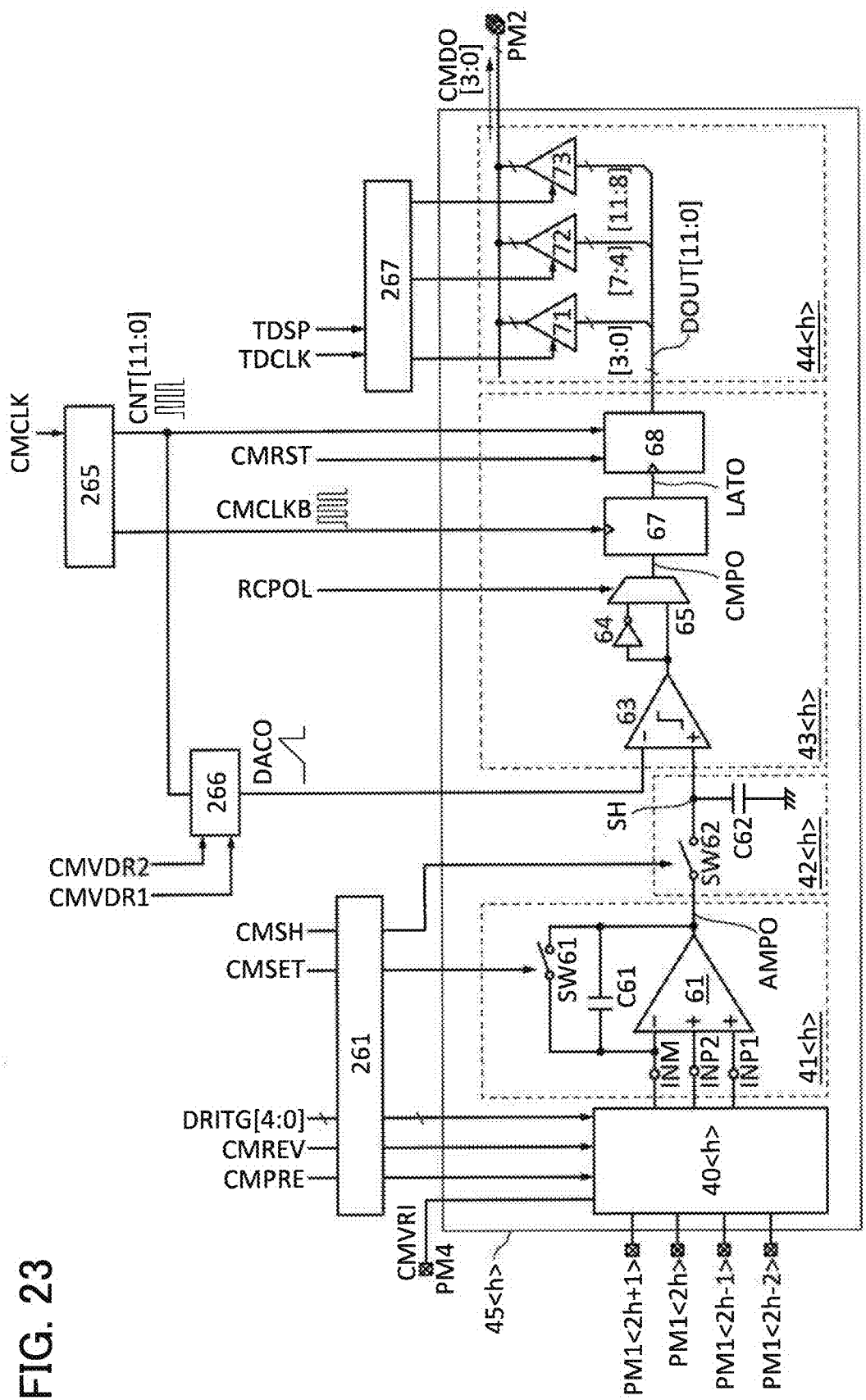
FIG. 23 is a circuit diagram illustrating a structure example of a circuit in a CM unit.

FIG. 21 and FIG. 23 illustrate a structure example of the circuit 45<h>, where h is an integer of more than or equal to 1 and less than or equal to N. The circuit 45<h> includes the switch circuit 40<h>, the integrating circuit 41<h>, the S/H circuit 42<h>, the ADC 43<h>, and the output circuit 44<h>.

The circuit 45<h> has a function of sensing a current that flows through the pin PM1<2h−1> (the odd-numbered pin PM1) and a current that flows through the pin PM1<2h+1> (the odd-numbered pin PM1).

When h=1, a pin corresponding to the pin PM1<2h−1> is not electrically connected to the circuit 45<h>. When h=N, a pin corresponding to the pin PM1<2h+1> is not electrically connected to the circuit 45<h>.

With reference to FIG. 21 and FIG. 22, a circuit structure example of the switch circuit 40<h>, the integrating circuit 41<h>, and the S/H circuit 42<h> is described. A structure example of the ADC 43<h> and the output circuit 44<h> is described with reference to FIG. 23.

(Integrating Circuit 41 and S/H Circuit 42)

The integrating circuit 41<h> includes an amplifier circuit 61, a capacitor C61, and a switch SW61. The amplifier circuit 151 (FIG. 14A) is used as the amplifier circuit 61, and includes the terminals INM, INP1, and INP2. The S/H circuit 42<h> includes a switch SW62 and a capacitor C62.

Note that the amplifier circuit 61 in the integrating circuit 41<h> may be referred to as an "amplifier circuit 61<h>". The same applies to the other circuit elements.

The switches SW61 and SW62 are formed of a CMOS circuit. The switches SW61 and SW62 are controlled with signals output from an LS unit 261. The LS unit 261 level-shifts a signal CMSET and a signal CMSH and generates a signal CMSET_LS, a signal CMSH_LS, and a signal CMSETB_LS and a signal CMSHB_LS. The signal CMSETB_LS and the signal CMSHB_LS are inverted signals of the signal CMSET_LS and the signal CMSH_LS.

By the signals CMSET_LS and CMSETB_LS, the electrical continuity of the switch SW61 is controlled. By the signals CMSH_LS and CMSHB_LS, the electrical continuity of the switch SW62 is controlled. Note that only the signal CMSET_LS which turns on the switch SW61 when the signal is "H" is shown in FIG. 21. The same applies to the other switch control signals.

(Switch Circuit 40)

The switch circuit 40<h> includes switches SW20 to SW37. The switches SW20 to SW37 are formed of a CMOS circuit. The circuit structure of the switch circuit 40 determines the current sensing mode of the circuit 45<h>. The circuit structure of the switch circuit 40 is controlled by signals output from the LS unit 261.

The LS unit 261 level-shifts signals CMPRE, CMREV, and DRITG[0] to DRITG[4], and generates signals CMPRE_LS, CMREV_LS, and DRITG[0]_LS to DRITG[4]_LS and signals CMPREB_LS, CMREVB_LS, and DRITGB[0]_LS to DRITGB[4]_LS. The signals CMPREB_LS, CMREVB_LS, and DRITGB[0]_LS to DRITGB[4]_LS are inverted signals of the signals CMPRE_LS, CMREV_LS, and DRITG[0]_LS to DRITG[4]_LS.

The electrical continuity of the switches SW20 to SW23 is controlled by the signals CMPRE_LS and CMPREB_LS. The signal CMPRE is a signal for controlling a precharge operation of the pins PM1. When the signal CMPRE is "1" (high level), the pins PM1 are precharged with the voltage CMVRI that is input from the pin PM4

The electrical continuity of the switches SW24 to SW31 is controlled by the signals CMREV_LS and CMREVB_LS. The electrical continuity of the switch SW32 is controlled by the signals DRITG[0]_LS and DRITGB[0]_LS. The electrical continuity of the switch SW33 is controlled by the signals DRITG[1]_LS and DRITGB[1]_LS. The electrical continuity of the switch SW34 is controlled by the signals DRITG[2]_LS and DRITGB[2]_LS. The electrical continuity of the switches SW35 and SW36 is controlled by the signals DRITG[3]_LS and DRITGB[3]_LS. The electrical continuity of the switch SW37 is controlled by the signals DRITG[4]_LS and DRITGB[4]_LS.

(Logic Circuit 260)

The signals DRITG[0] to DRITG[4] are signals generated by the logic circuit 260. The logic circuit 260 generates the signals DRITG[0] to DRITG[4] by arithmetically processing the signals RITG[0] to RITG[2]. FIG. 22 is a truth table of the logic circuit 260. FIG. 22 shows logical values of the signals RITG[0] to RITG[2] and the signal CMREV and the corresponding functions of the circuit 45<h>.

The column "INM" represents the pin PM1 connected to the terminal INM. For example, "2h" in the column "INM" shows that the terminal INM and the pin PM1<2h> are electrically connected to each other. The same applies to the columns "INP1" and "INP2". CMVRI in the columns "INP1" and "INP2" shows that the voltage CMVRI is input to the terminals INP1 and INP2. The row "type" represents the sensing mode of the CM unit 211, that is, the signal input mode of the integrating circuit 41<h>. Note that HiZ mode is a mode for bringing the terminal INM into a high impedance state, regardless of the signal input mode of the integrating circuit 41<h>.

As shown in FIG. 22, the functions of the signals RITG[0] to RITG[2] are functions which determine the sensing mode of the CM unit 211, that is, the signal input mode of the integrating circuit 41<h>. The function of the signal CMREV is a function of selecting a channel for sensing. The sensing target is an odd-numbered channel when the signal CMREV is "H", and an even-numbered channel when the signal CMREV is "L".

(ADC 43)

As illustrated in FIG. 23, the ADC 43<h> includes a comparator 63, an inverter circuit 64, a selector 65, a flip-flop (FF) 67, and a flip-flop (FF) 68. The ADC 43<h> illustrated in FIG. 23 is a 12-bit A/D conversion circuit, and the flip-flop 68 is a 12-bit flip-flop.

Signals DACO, RCPOL, CMCLKB, CMRST, and CNT [11:0] are input to the ADC 43<h>. The signals CNT and CMCLKB are generated by the counter 265, and the signal DACO is generated by the DAC 266. In this example, the counter 265 is a 12-bit counter, and the DAC 266 is a 12-bit D/A conversion circuit.

A signal CMCLK is a clock signal. The counter 265 counts the number of rises (or falls) of the signal CMCLK. The signal CNT[11:0] is a signal representing the count value. The signal CMCLKB is an inversion signal of the signal CMCLK.

The DAC 266 D/A converts the signal CNT[11:0] and generates the signal DACO. The signal DACO is a ramp wave signal. The voltage CMVDR1 and the voltage CMVDR2 are reference voltages of the DAC 266. The signal DACO is input to a terminal (−) of the comparator 63. A voltage held by the S/H circuit 42 (a voltage at a node SH) is input to a terminal (+) of the comparator 63. Depending on the circuit structure or the like of the comparator 63, the signal DACO may be input to the terminal (+) and the voltage at the node SH may be input to the terminal (−).

The signal RCPOL is a signal for selecting the mode for inputting a current to the circuit 45<h>. Depending on the signal RCPOL, the input mode can be set to either a source type in which a current flows from the terminal INM to the outside or a sink type in which a current flows from the outside to the terminal INM. Specifically, the signal RCPOL is a control signal for the selector 65. For example, when the logic value of the signal RCPOL is "0", the signal output from the comparator 63 is input to the flip-flop 67 as the signal CMPO; when the logic value of the signal RCPOL is "1", the signal output from the inverter circuit 64 is input to the flip-flop 67 as the signal CMPO.

The signal CMCLKB is input to the flip-flop 67 as a clock signal. Data in the flip-flop 67 is updated with the rise of the signal CMCLKB. The flip-flop 68 functions as a register which temporarily stores data of the signal CNT[11:0]. A signal output from the flip-flop 67 is input to the flip-flop 68 as a clock signal. When the output signal of the flip-flop 67 makes a low-to-high transition, data of the signal CNT[11:0] is rewritten to the flip-flop 68. The flip-flop 68 outputs a signal DOUT[11:0] to the output circuit 44<h>. The signal DOUT[11:0] corresponds to the signal CNT[11:0] the flip-flop 68 holds.

(Output Circuit 44)

In the example of FIG. 23, the output circuit 44 has a function of dividing the 12-bit signal DOUT[11:0] into three 4-bit digital signals. The output circuit 44<h> includes three tri-state (TRI) buffer circuits 71 to 73. A signal DOUT[3:0] is input to the TRI buffer circuit 71, a signal DOUT[7:4] is input to the TRI buffer circuit 72, and a signal DOUT[11:8] is input to the TRI buffer circuit 73.

The shift register 267 has a function of generating enable signals for the TRI buffer circuits 71 to 73. Signals TDCLK and TDSP are a clock signal and a start pulse signal, respectively. One of the 3N TRI buffer circuits included in the output unit 244 is selected by signals output from the shift register 267. The output of the non-selected TRI buffer circuit is brought into a high impedance state. The output terminal of the selected TRI buffer circuit is electrically connected to the pin PM2. The output signal of the selected TRI buffer circuit is output from the pin PM2 as the signal CMDO[3:0].

<Operation Example of CM Unit 211>

An example of an operation method of the CM unit 211 is described with reference to FIG. 21 to FIG. 28. The operation method of the CM unit 211 is described here, taking a case where the sensing mode is a 3-input differential sensing mode and an odd-numbered channel is the sensing target as an example. Note that the operation method of the CM unit 211 described here can apply to the case where an even-numbered channel is the sensing target. Furthermore, the same can apply to the other sensing modes.

Figure 24:
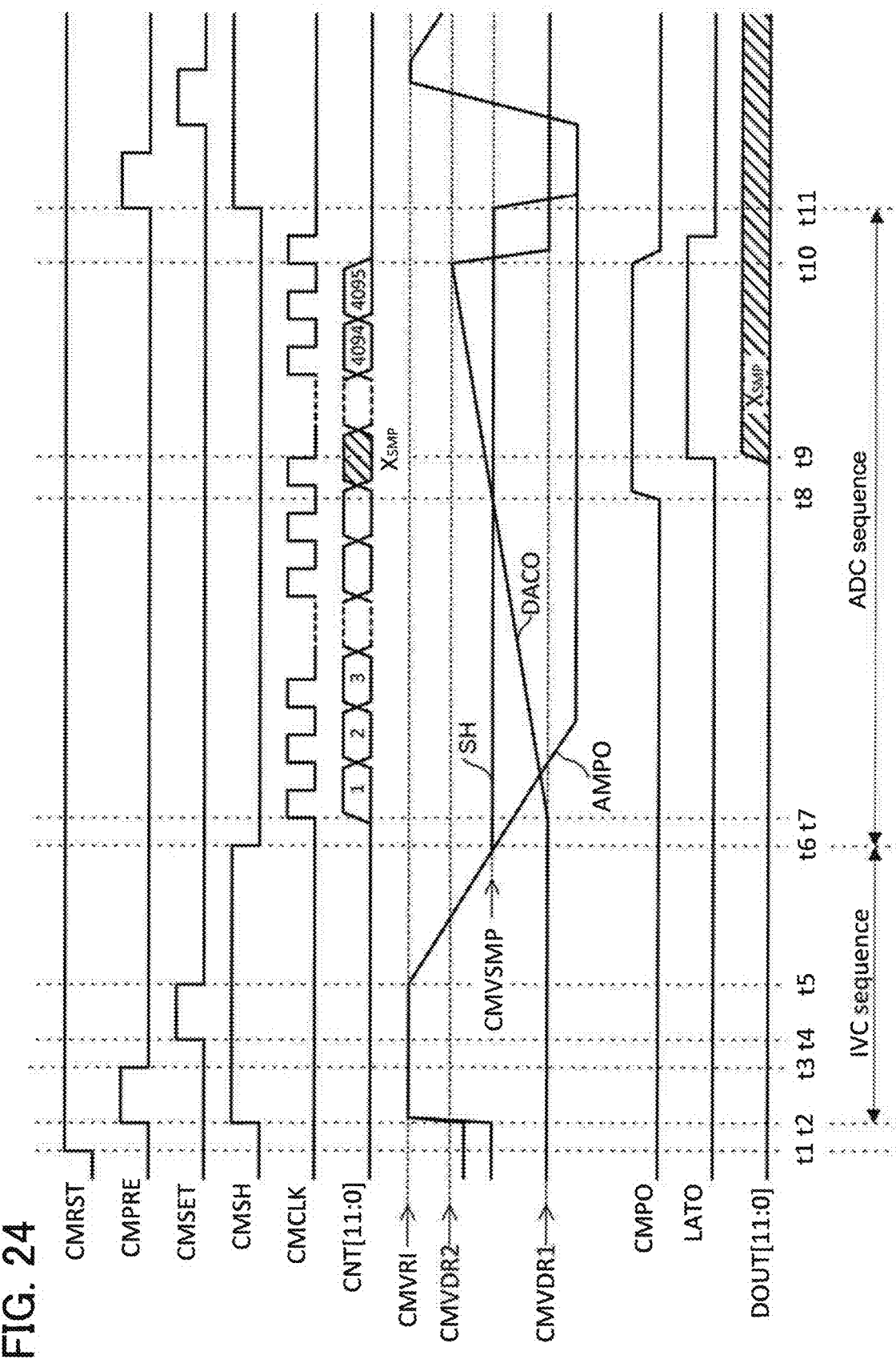
FIG. 24 is a flow chart showing an operation example of a CM unit.

FIG. 24 is a timing chart of the circuit 45<h>, where t1 and the like represent the time. FIG. 25 to FIG. 28 are schematic block diagrams illustrating an example of an operation method of the CM unit 211. In FIG. 25 to FIG. 28, a structure of the CM unit 211 is simplified. Furthermore, a connection structure between the pixel array 120 and the CM unit 211 is also simplified. Here, the pins PM1<1> to PM1<2N> are directly electrically connected to the wirings ML_1 to ML_2N.

To all the subpixels 121 in the pixel array 120, a grayscale signal for current sensing is written. A grayscale signal at a potential level at which a current IM is generated is written to the sensing subpixels 121, and a grayscale signal at a potential level at which the current IM is not generated is written to the other subpixels 121. Here, it is assumed that a grayscale signal for white display is written to the subpixels 121 of the sensing target, and a grayscale signal for black display is written to the other subpixels 121.

When the signal CMRST becomes "H", the CM unit 211 becomes active and executes a current sensing sequence. The current sensing sequence of the CM unit 211 is roughly divided into an IVC sequence, an ADC sequence, and a data (the signal CMDO) reading sequence. In the IVC sequence, current-voltage (I/V) conversion in which a current flowing through the terminal INM is converted into a voltage is performed. In the ADC sequence, the voltage (analog data) obtained in the IVC sequence is converted into digital data. In a period from t2 to t6 when the signal CMSH is "H", the IVC sequence is performed. In a period from t6 to t11 when the signal CMSH is "L", the ADC sequence is performed.

(Precharge)

Figure 25:
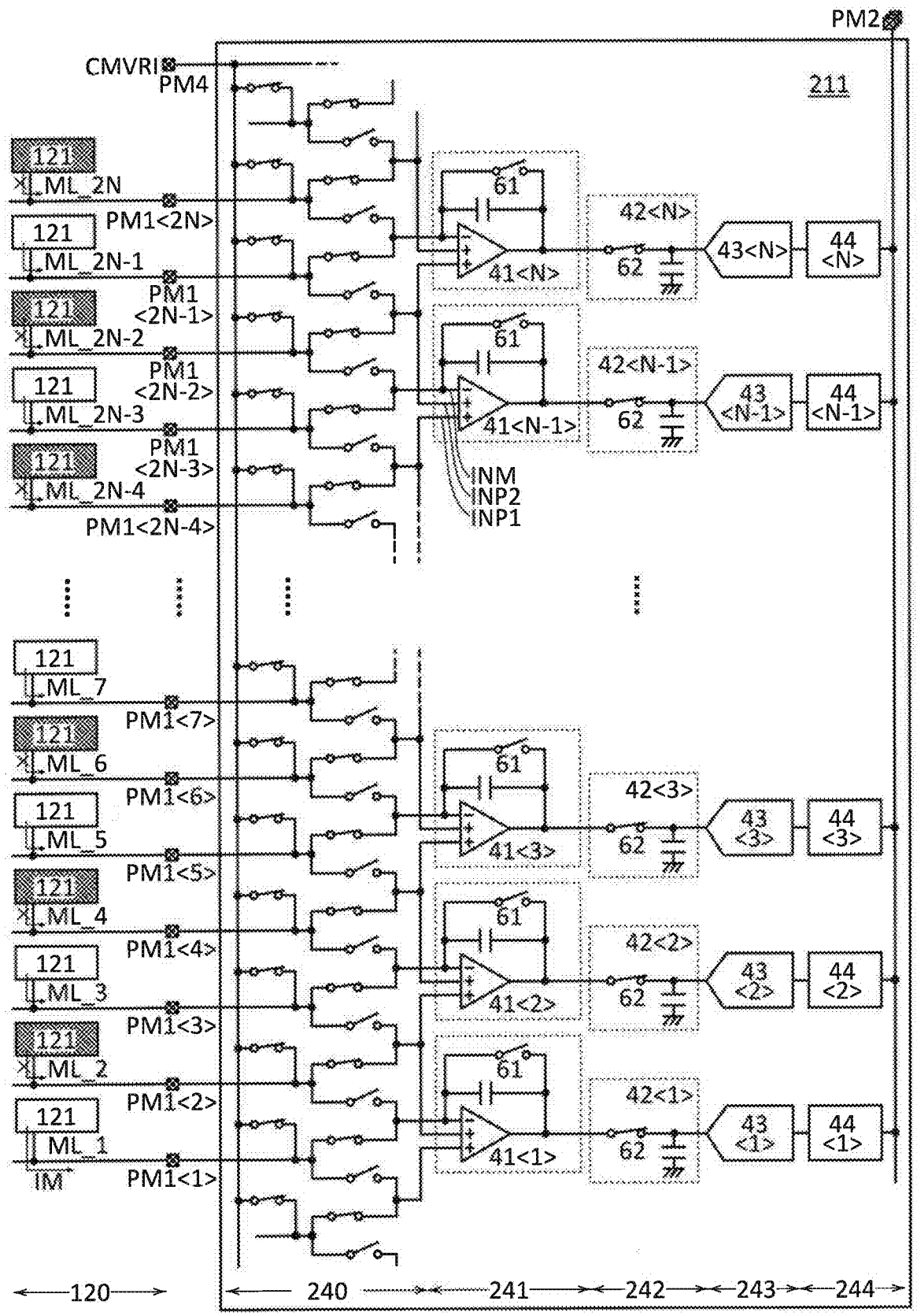
FIG. 25 is a circuit diagram illustrating an operation example of a CM unit.

In a period from t1 to t2, the sensing mode of the CM unit 211 is determined by the signal RITG[2:0]. The sensing channel is selected by the signal CMREV. FIG. 25 illustrates a circuit structure of the CM unit 211 in the period from t1 to t2. Since the sensing mode is a 3-input differential sensing mode and the odd-numbered channel is the sensing target, the terminals INM, INP1, and INP2 are electrically connected to the pins PM1<2h−1>, PM1<2h−2>, and PM1<2h>, respectively, in the circuit 45<h>.

Furthermore, the pins PM1<2h−2> to PM1<2h+1> and the terminals INM, INP1, and INP2 of the integrating circuit 41<h> are each electrically connected to the pin PM4, and they are precharged with the voltage CMVRI. At t2, the signal CMSH becomes "H", so that the node SH in the S/H circuit 42<h> is electrically connected to the output terminal of the integrating circuit 41<h> by the switch SW62<h>. Therefore, the capacitor C62<h> is charged with the signal AMPO.

(Offset Cancellation)

Figure 26:
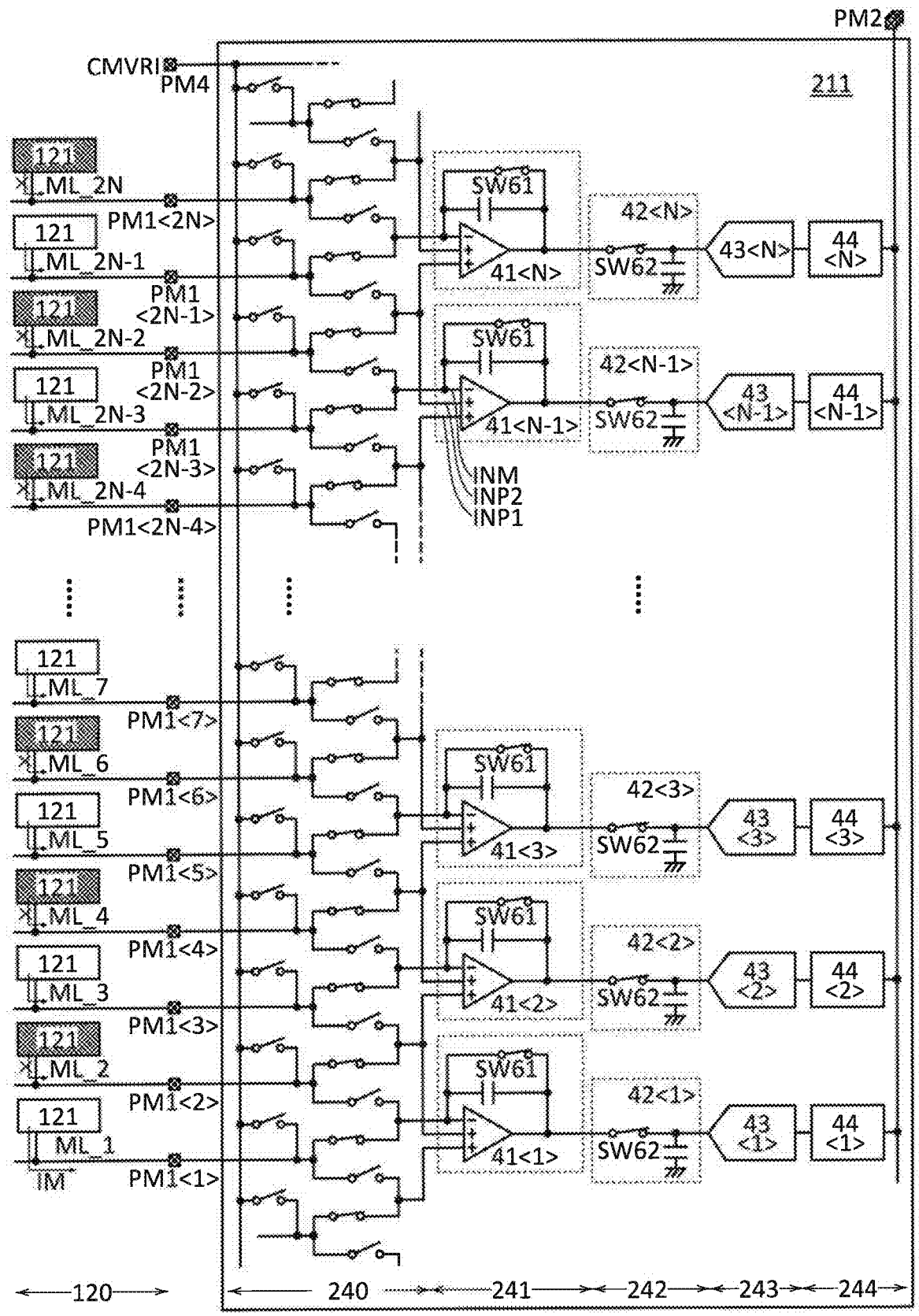
FIG. 26 is a circuit diagram illustrating an operation example of a CM unit.

In a period from t4 to t5, offset cancellation in which the offset voltage of the amplifier circuit 61<h> (the integrating circuit 41<h>) is corrected is performed. FIG. 26 is a circuit structure of the CM unit 211 in the period from t4 to t5. The output terminal of the integrating circuit 41<h> is electrically connected to the terminal INM by the switch SW61<h> and is precharged with the voltage CMVRI.

(I/V Conversion)

Figure 27:
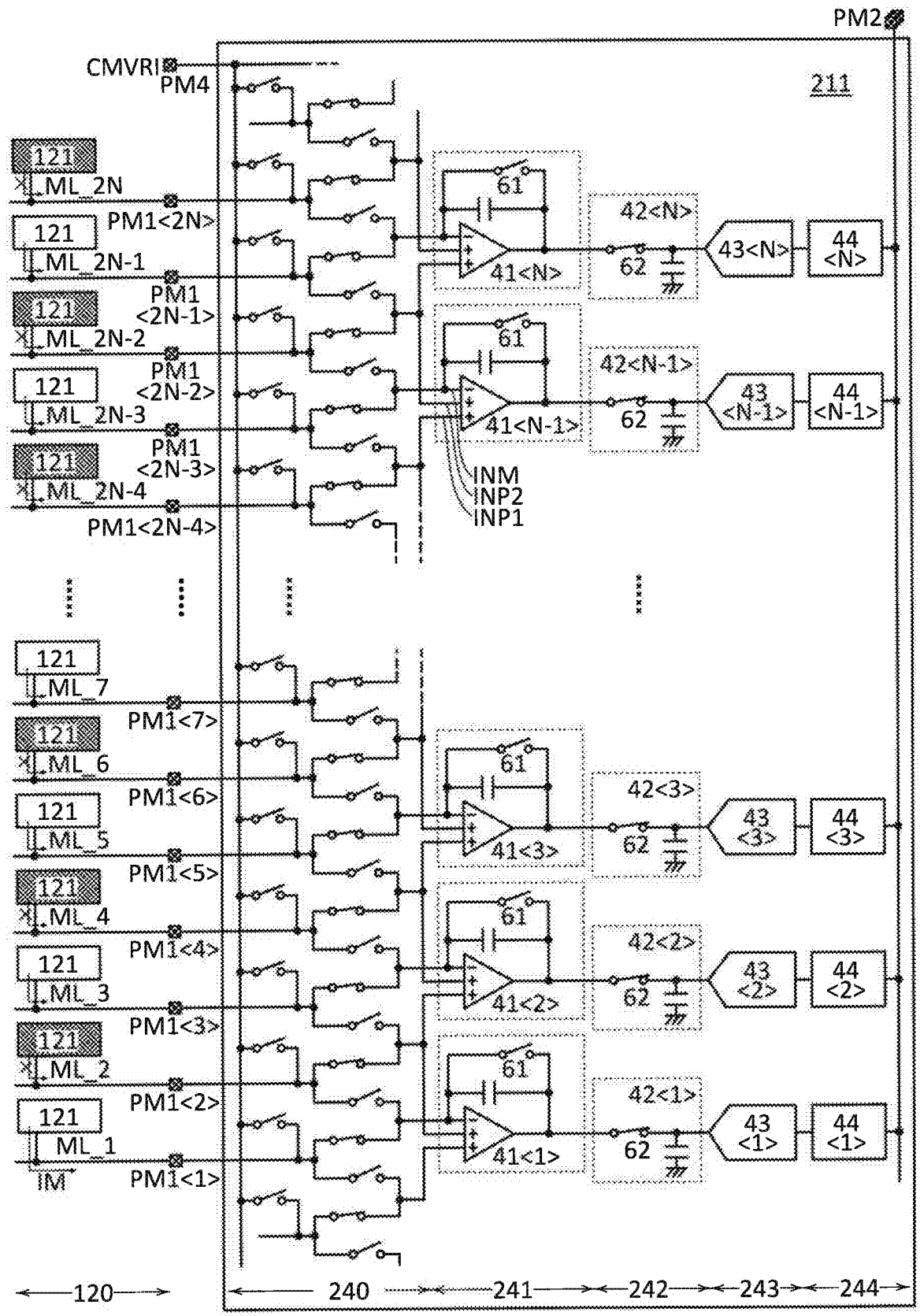
FIG. 27 is a circuit diagram illustrating an operation example of a CM unit.

In a period from t5 to t6, the circuit 45<h> converts the current IM flowing through the terminal INM to a voltage. FIG. 27 is a circuit structure of the CM unit 211 in the period from t5 to t6. At t5, the signal CMSET becomes "L", and the integrating circuit 41<h> starts an integrating operation using an average voltage of the voltage of the terminal INP1 and the voltage of the terminal INP2 as a reference voltage. Furthermore, when the signal CMSET becomes "L", the terminal INM is discharged by the current flowing through the pin PM1<2h−1>.

At t6 when the signal CMSH becomes "L", the S/H circuit 42<h> holds the voltage CMVSMP of the output terminal of the integrating circuit 41<h>. The voltage CMVSMP corresponds to the amount of current flowing through the terminal INM in the period from t5 to t6.

(A/D Conversion)

Figure 28:
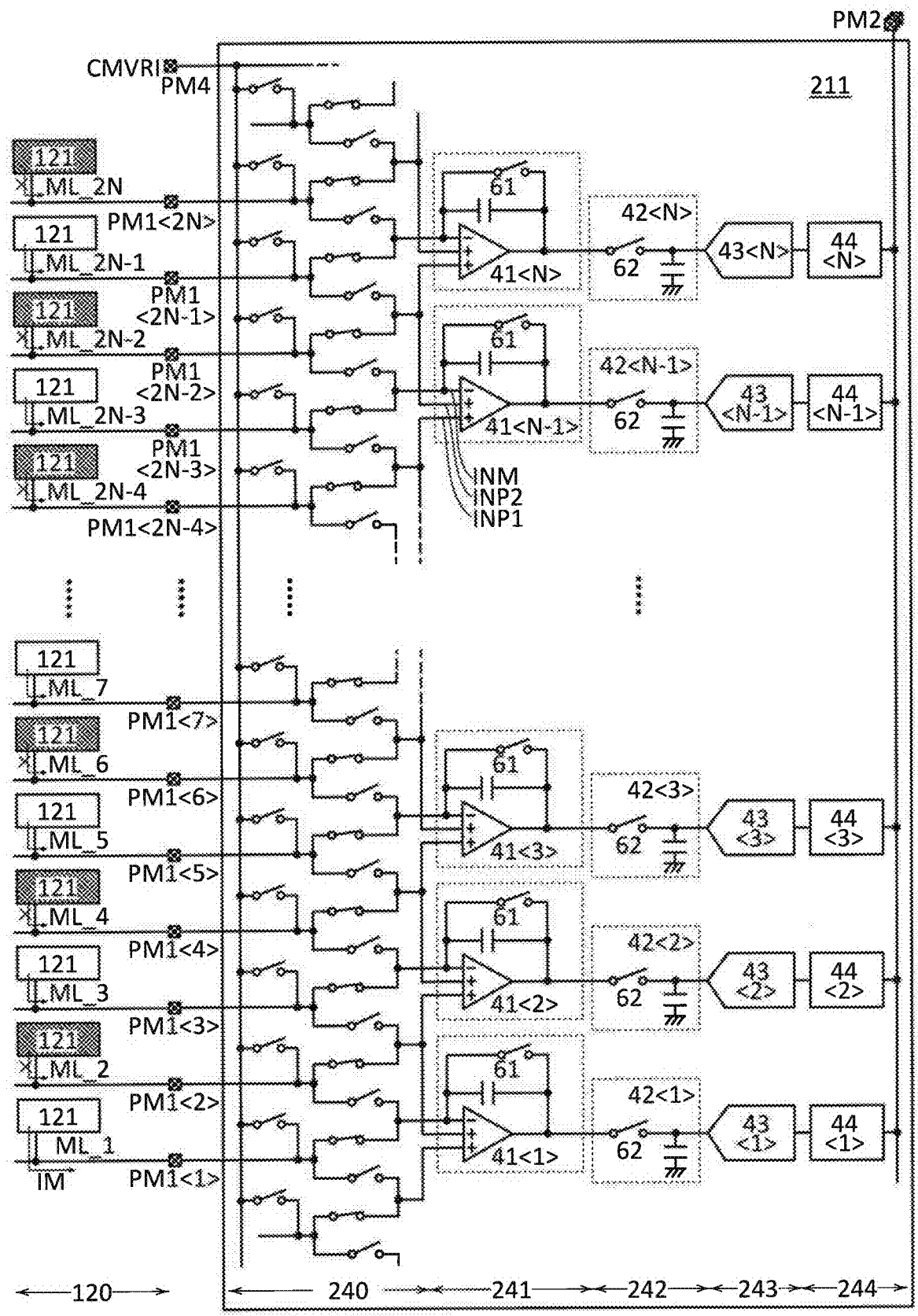
FIG. 28 is a circuit diagram illustrating an operation example of a CM unit.

FIG. 28 illustrates a circuit structure of the CM unit 211 in a period from t7 to t11. In the period t7 to t11, the signal CMCLK is input to the CM unit 211. The counter 265 outputs the signals CNT[11:0] and CLKB. The DAC 266 outputs the signal DACO. The voltage of the signal DACO corresponds to the data (count value) of the signal CNT[11:0]. The comparator 63<h> compares the voltage CMVSMP of the node SH and the voltage of the signal DACO. At t8 when the voltage of the signal DACO exceeds the voltage CMVSMP, the output of the comparator 63<h> makes a high-to-low transition. In the example of FIG. 28, because the output signal of the inverter 64 is input to the flip-flop 67 as the signal CMPO, the signal CMPO makes a low-to-high transition at t8.

On the fall of the signal CMCLK (the rise of the signal CMCLKB), data of the flip-flop 67<h> is updated by the signal CMPO. At t9 when the signal CMCLK falls, data of the flip-flop 67<h> becomes "H". A signal LATO changes from "L" to "H", and the flip-flop 68<h> stores data (count value XSMp) of the signal CNT[11:0] as of t9. The count value XSMp represents the amount of current flowing through the terminal INM in the period from t5 to t6. The flip-flop 68<h> outputs the signal DOUT[11:0] of the data "$X_{SMP}$" to the output circuit 44<h>.

(Data Reading)

Reading of the signal CMDO starts by the input of the signal TDSP to the shift register 267. In accordance with the output of the shift register 267, the output circuit 44<h> time-divides the signal DOUT[11:0] into 4-bit data signals and outputs the signals to the pins PM2. The output signals of the pins PM2 are the signals CMDO.

Driving transistors in the subpixels 121 each have an extremely low drain current, which is as low as one nanoampere to several hundred nanoamperes. The circuit 45 is a circuit for sensing such a minute current. In the 3-input differential sensing mode, the integrating circuit 41 can obtain an analog signal with a high SNR, so that the circuit 45 is capable of high-accuracy current sensing. Accordingly, by using the signal CMDO (the output of the CM unit 211), the grayscale data written to the subpixels 121 can be more appropriately corrected. Thus, a display device including the SD-IC 200 as a source driver circuit can have excellent display quality.

By executing a plurality of cycles of the above-described current sensing sequence, the current IM can be obtained per subpixel or a plurality of subpixels of the pixel array. Taking a display unit illustrated in FIG. 29 as an example, a method of sensing a current per a plurality of subpixels is described below.

Figure 29:
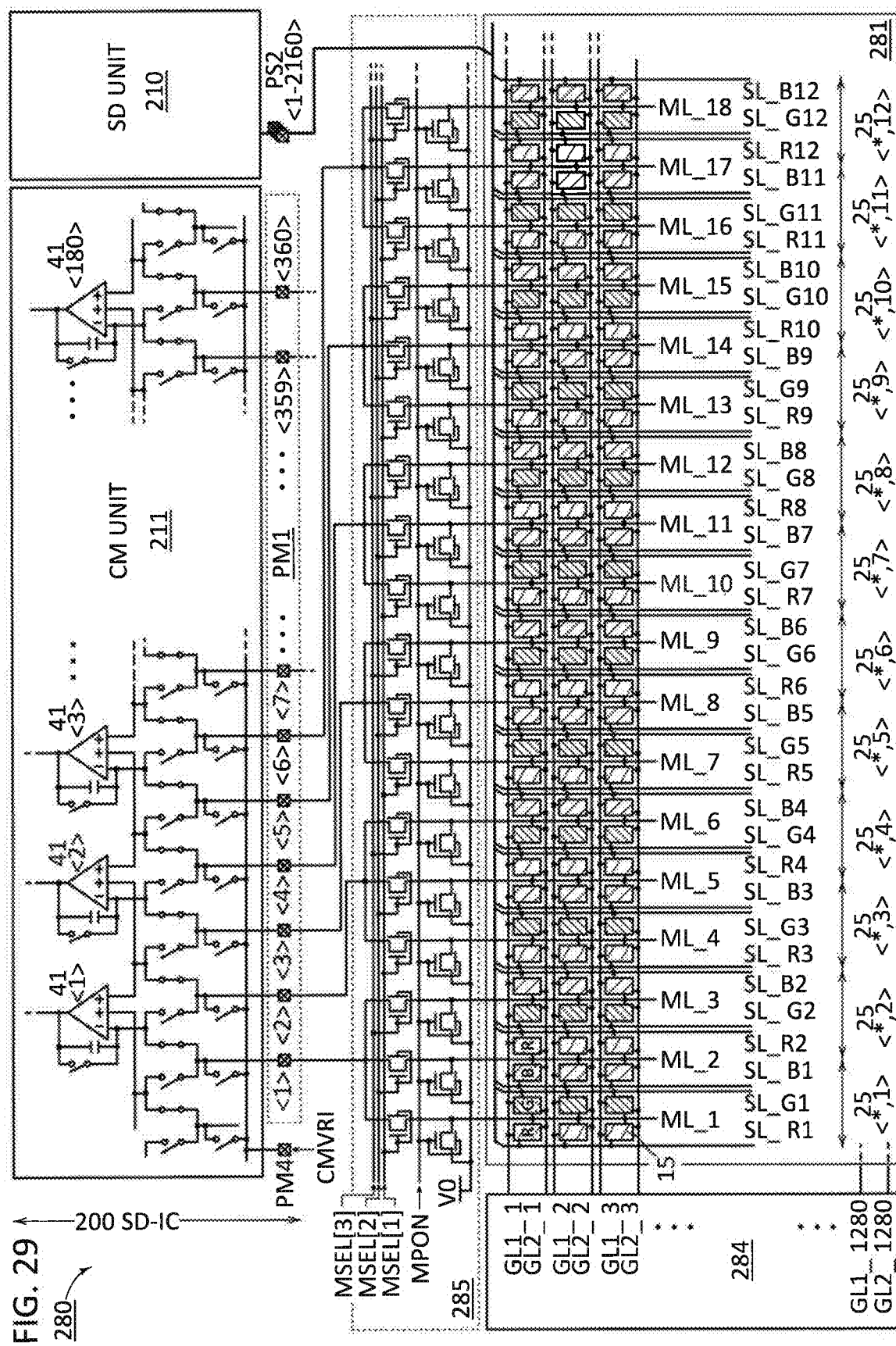
FIG. 29 is a circuit diagram illustrating a structure example of a display unit.

FIG. 29 is a block diagram illustrating a structure example of a display unit. A display unit 280 illustrated in FIG. 29 includes a pixel array 281, a gate driver circuit 284, a switch circuit 285, and the SD-IC 200. The resolution of the display unit 280 is 1280 (V)×3 (RGB)×760.

The pixel array 281 has the same circuit structure as the pixel array 125 illustrated in FIGS. 6A and 6B. The number of wirings GL1 and the number of wirings GL2 are each 1280. The number of wirings ML is 1080. The number of wirings SL_R, the number of wirings SL_G, and the number of wirings SL_B are each 760. Note that the pixel 25<*, 1> represents the pixels 25<1, 1> to 25<1280, 1> arranged in the first column. The switch circuit 285 has the same circuit structure as the switch circuit 143 illustrated in FIGS. 10A and 10B. The wirings SL_R<1-760>, SL_G<1-760>, and SL_B<1-760> are electrically connected to the pins PS2 not through any switch circuit.

In the example illustrated in FIG. 29, six wirings SL correspond to one input channel of the CM unit 211.

FIG. 30 is a flow chart showing one example of a current sensing operation of the display unit 280. In the current sensing operation, the SD unit 210 and the CM unit 211 are in the active state. First, the signal CMRST set to "H" is input to the CM unit 211 to reset the CM unit 211 (Step ST10).

Then, the current sensing mode of the CM unit 211 is determined by the signal RTIG[2:0] (Step ST11). In FIG. 29, an example of employing a 3-input differential sensing mode is illustrated.

Grayscale signals are written to the pixels 25<j, 1> to 25<j, 2160> in the j-th row by the gate driver circuit 284 and the SD unit 210 (Step ST12). In the step ST12, the signals MSEL[1] to MSEL[3] are "L", and the signal MPON is "H". A voltage V0 is input to the wirings ML_1 to ML_1080. The wirings GL1_j and GL2_j are selected by the gate driver circuit 284. A grayscale signal with a grayscale value $G_{CM}$ is written to the pixels <j, 4h–3> and <j, 4h–2>, and a grayscale signal with a grayscale value 0 is written to the pixels <j, 4h–1> and <j, 4h> (h is an integer of more than or equal to 1 and less than or equal to 180). The grayscale signal with the grayscale value $G_{CM}$ is a grayscale signal with which a current can flow between the subpixel 15 and the wiring ML when the wiring GL2_j is in a selected state.

The step ST12 is terminated when the wiring GL1_j is brought into a non-selected state. The selected state of the wiring GL2_j is maintained until the IVC sequence of the step ST17 is terminated.

Next, the switch circuit 285 is operated to electrically connect the wiring ML and the pin PM1 to each other (Step ST13). After the signal MPON becomes "L", the signals MSEL[1] to MSEL[3] are set to "H". The wirings ML_6h–5 to ML_6h–4 are each electrically connected to the pin PM1<2h–1>. The wirings ML_6h–2 to ML_6h are each electrically connected to the pin PM1<2h>.

Next, in the CM unit 211, a current flowing through the pin PM1<2h–1> of the odd-numbered channel is sensed (Step ST14). In this example, the current flowing through the pin PM1<2h–1> is the sum of currents that flow through the wirings ML_6h–5 to ML_6h–4.

The above-described IVC sequence, ADC sequence, and data reading sequence are executed. In the step ST14, the pin PM1<2h–1> of the odd-numbered channel is electrically connected to the terminal INM of the integrating circuit 41<h> by the signal CMREV.

For example, the IVC sequence can be started when the signals MSEL[1] to MSEL[3] are brought to "H". The signals MSEL[1] to MSEL[3] are brought to "L" when the IVC sequence is terminated, and after a predetermined period, the signal MPON is set to "H".

Steps ST15 to ST17 are performed in a manner similar to that of the steps ST12 to ST14. In the step ST15, the wiring GL1_j is set in a selected state, so that a grayscale signal with the grayscale value 0 is written to the pixels <j, 4h–3> and <j, 4h–2>, and a grayscale signal with the grayscale value $G_{CM}$ is written to the pixels <j, 4h–1> and <j, 4h>. In the step ST17, the pin PM1<2h> of the even-numbered channel is electrically connected to the terminal INM of the integrating circuit 41<h> by the signal CMREV.

By performing one cycle of the steps ST11 to ST17, a current flowing through the pixels 25<j, 1> to 25<j, 2160> in the j-th row can be sensed. By executing 1280 cycles of the steps ST11 to ST17, a current value can be obtained on two pixel basis from 1280×720 pixels 25 in the pixel array 281.

Furthermore, by setting any one of the signals MSEL[1] to MSEL[3] to "H" in the steps ST13 and ST16 and writing a grayscale signal with the grayscale value $G_{CM}$ to the wirings SL in the sensing column and writing a grayscale signal with the grayscale value 0 to the wirings SL in the other columns in the steps ST12 and ST15, a current can be sensed from every subpixel.

<<Touch Panel Device>>

Figure 31:
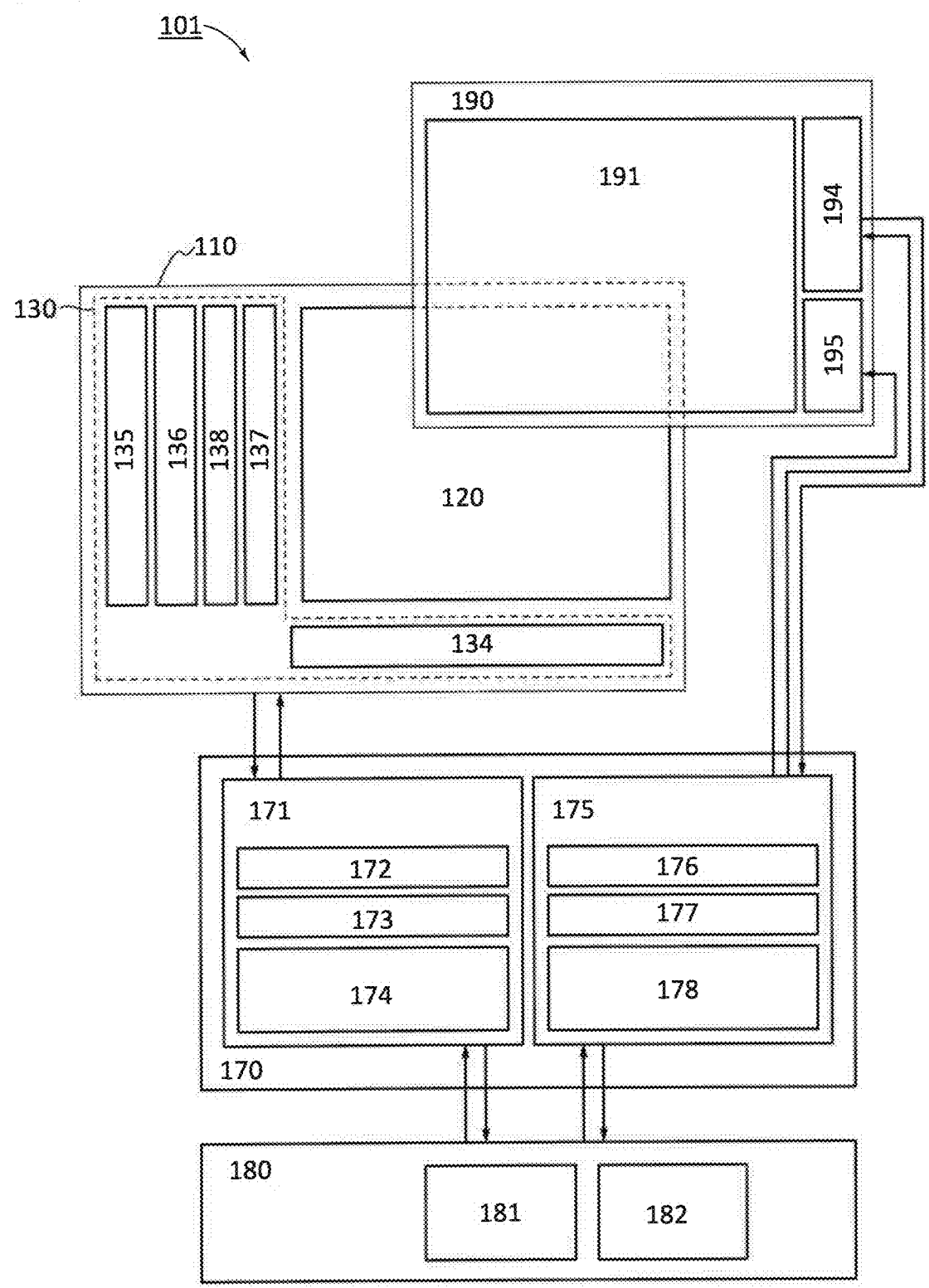
FIG. 31 is a block diagram illustrating a structure example of a touch panel device.

When a touch sensor unit is incorporated in the display device 100, a touch panel device can be formed. FIG. 31 illustrates a structure example of a touch panel device. A touch panel device 101 illustrated in FIG. 31 includes a display unit 110, a controller unit 170, the processor 180, and a touch sensor unit 190.

The touch sensor unit 190 includes a sensor array 191, a sensing circuit 194, and a driving line driver circuit 195 (referred to as the "DRL driver circuit 195" below). The sensing circuit 194 and the DRL driver circuit 195 can each be formed of a dedicated IC.

The controller unit 170 includes the display controller 171 and a touch sensor (TS) controller 175. The TS controller 175 is a controller for the touch sensor unit 190 and includes a memory 176, a timing controller 177, and a signal processing circuit 178. The timing controller 177 has a function of generating a variety of signals for setting the operation timing of the sensing circuit 194 and the DRL driver circuit 195. For example, the timing controller 177 generates a signal for controlling the sensing circuit 194 (e.g., a clock signal, a reset signal), a signal for controlling the DRL driver circuit 195 (e.g., a start pulse signal, a clock signal). The signal processing circuit 178 has a function of processing a signal output from the sensing circuit 194 and generating a signal containing touch data (data on whether a touch operation is performed), a signal containing touch position data, and the like.

<Touch Sensor Unit>

Figure 32:
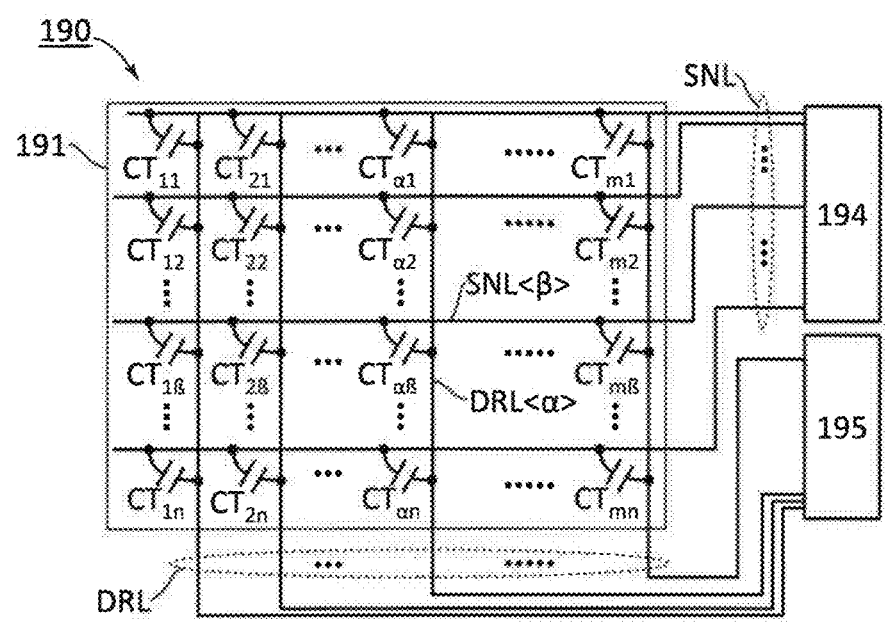
FIG. 32 is a circuit diagram illustrating a structure example of a touch sensor unit.

FIG. 32 illustrates a structure example of the touch sensor unit 190. Illustrated here is an example where the touch sensor unit 190 is a mutual capacitive touch sensor unit. The sensor array 191 includes m wirings DRL and n wirings SNL. Note that m is an integer of more than 0, and n is an integer of more than 2. The wirings DRL are driving lines, and the wirings SNL are sense lines. Here, the α-th wiring DRL is referred to as the wiring DRL<α>, and the β-th wiring SNL is referred to as the wiring SNL<β>. A capacitance $CT_{\alpha\beta}$ is a capacitance formed between the wiring DRL<α> and the wiring SNL<β>.

The m wirings DRL are electrically connected to the DRL driver circuit 195. The DRL driver circuit 195 has a function of driving each wiring DRL. The n wirings SNL are electrically connected to the sensing circuit 194. The sensing circuit 194 has a function of sensing signals of the wirings SNL. The signal of the wiring SNL<β> at the time when the wiring DRL<α> is driven by the DRL driver circuit 195 has data on the amount of change in the capacitance $CT_{\alpha\beta}$. By analyzing signals of n–2 wirings SNL, data on whether a touch operation is performed, touch position, and the like can be obtained. By using the integrating circuit 150 as the sensing circuit 194, touch sensing can be performed with high accuracy.

Figure 33:
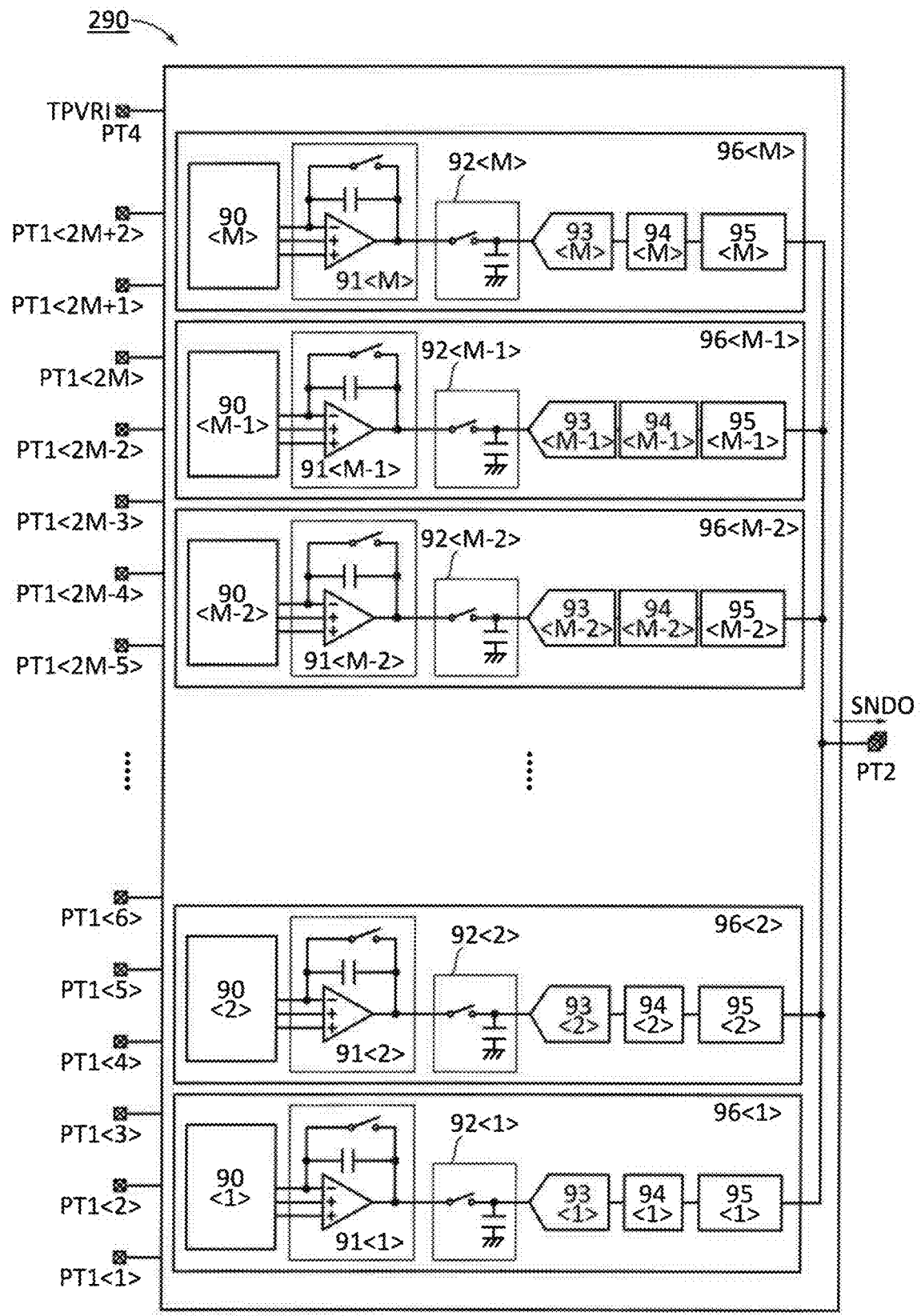
FIG. 33 is a circuit diagram illustrating a structure example of a sense IC.

FIG. 33 illustrates a structure example of a sense IC. The sense IC is an IC for a sensing circuit. The number of input channels of a sense IC 290 (referred to as the SN-IC 290 below) illustrated in FIG. 33 is 2M+2 (M is an integer of more than 0). The SN-IC 290 includes 2M+2 pins PT1, a plurality of pins PT2, a pin PT4, and M circuits 96.

The 2M+2 pins PT1 are pins for connecting with the wirings SNL. The circuit 96<g> (g is an integer of more than or equal to 1 and less than or equal to M) is an elementary circuit for sensing the amount of change in the capacitance $CT_{\alpha\beta}$.

The circuit 96<g> includes a switch circuit 90<g>, an integrating circuit 91<g>, an S/H circuit 92<g>, an ADC 93<g>, a LAT 94<g>, and an output circuit 95<g>. The circuit 96<g> has a function of sensing a signal input from the pin PT1<2g> (the pin P1 of an even-numbered channel) and a signal input from the pin PT1<2g+1> (the pin of an odd-numbered channel). The pin PT4 is a pin for inputting a reference voltage TPVRI of the integrating circuit 91<g>.

The integrating circuit 150 is applied to the integrating circuit 91<g>. The S/H circuit 92<g> samples an analog signal output from the integrating circuit 91<g>. The ADC 93<g> converts the analog signal sampled by the S/H circuit 92<g> to digital data. The LAT 94<g> stores the digital data generated by the ADC 93<g>. The output circuit 95<g> reads out the digital data stored in the LAT 94<g> to the pins PT2. A signal SNDO is a digital signal containing data on the capacitance sensed by the circuit 96<g>.

Figure 34:
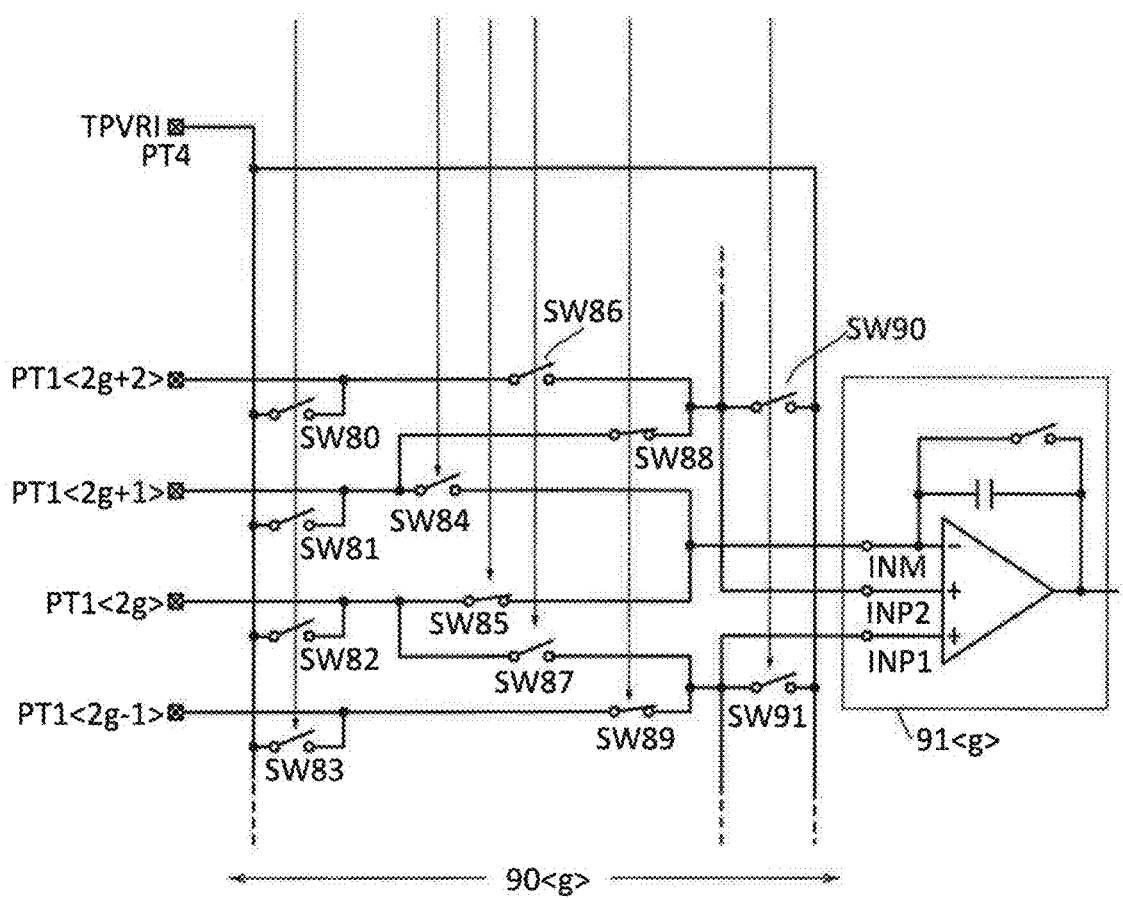
FIG. 34 is a circuit diagram illustrating a structure example of a switch circuit of a sense IC.

FIG. 34 illustrates a structure example of the switch circuit 90<g>. The switch circuit 90<g> includes switches SW80 to SW91. The switches SW80 to SW91 are each formed of a CMOS circuit. The sensing mode of the SN-IC 290 can be selected from a 3-input differential sensing mode and a single-ended mode. FIG. 34 illustrates a state in which a 3-input differential sensing mode is employed and the pins PT1 of the even-numbered channels are sensing targets.

By using the integrating circuit 91<g>, the SNR of the SN-IC 290 is improved, which enables high-accuracy touch sensing. Thus, according to this embodiment, the touch panel device 101 can have high sensitivity.

Embodiment 2

In this embodiment, a display device, a touch panel device, and the like including the source driver IC of Embodiment 1 are described.
<<Display Device>>

FIG. 35A is an exploded perspective view schematically illustrating a structure example of a display device. A display device 700 illustrated in FIG. 35A includes an upper cover 711, a lower cover 712, a battery 713, a printed board 714, a frame 715, and a display unit 720. In some cases, the battery 713 or the like is not provided.

The printed circuit board 714 is provided with a processor, a power supply circuit, a memory, a controller, and the like. As a power supply that supplies power to the power supply circuit, an external commercial power supply or the battery 713 can be used. The frame 715 has a function of protecting the display unit 720 and a function of an electromagnetic shield for blocking electromagnetic waves generated by the operation of the printed board 714. The frame 715 may have a function of a radiator plate.

The display unit 720 includes a display panel 721, an FPC 728, and an SD-IC (source driver IC) 770. The display panel 721 includes an element substrate 722 and a counter substrate 723. The element substrate 722 includes a pixel array, a gate driver circuit, and a terminal portion. The counter substrate 723 includes a color filter and a black matrix, for example. The SD-IC 770 includes the source driver IC of Embodiment 1. One or a plurality of SD-ICs 770 corresponding to the number of source lines in the pixel array is/are used.

The FPC 728 and the SD-IC 770 are electrically connected to the terminal portion provided in the element substrate 722. Although the SD-IC 770 is mounted by a chip on glass (COG) method here, there is no particular limitation on the mounting method, and a chip on flexible (COF) method, a tape automated bonding (TAB) method, or the like may be employed.

When a gate driver circuit is not provided in the element substrate 722, a gate driver IC is connected to the element substrate 722, for example. Instead of the SD-IC 770, a driver IC 771 illustrated in FIG. 35B may be connected to the element substrate 722. The driver IC 771 includes a current sensing unit (CMU) 790, a source driver unit (SDU) 791, and a gate driver unit (GDU) 792.

A base substrate of the element substrate 722 may be any substrate that can support transistors and the like included in the pixel array. For example, a support substrate used for fabricating the transistors in the pixel array (e.g., a glass substrate or a quartz substrate) or a substrate different from the support substrate is used as the base substrate of the element substrate 722.

Examples of the base substrate include a glass substrate, a quartz substrate, a plastic substrate, a metal substrate, a stainless steel substrate, a substrate containing stainless steel foil, a tungsten substrate, a substrate containing tungsten foil, a flexible substrate, a laminate film, paper containing a fibrous material, and a base film. Examples of a glass substrate include a barium borosilicate glass substrate, an aluminoborosilicate glass substrate, and a soda lime glass substrate. Examples of a flexible substrate include flexible synthetic resin substrates made of plastics typified by polyethylene terephthalate (PET), polyethylene naphthalate (PEN), and polyether sulfone (PES), and acrylic. Examples of a laminate film are a film made of polypropylene, polyester, polyvinyl fluoride, polyvinyl chloride, or the like, and an vapor-deposited inorganic film. Examples of a base film are base films formed using a polyester resin, a polyamide resin, a polyimide resin, an aramid resin, an epoxy resin, and paper.

A base substrate of the counter substrate 723 is preferably a substrate having a function of sealing a display element. As the base substrate of the counter substrate 723, a substrate similar to the base substrate of the element substrate 722 can be used. Alternatively, the base substrate of the counter substrate 723 can be an optical film (circularly polarizing film).

By using flexible substrates as the base substrates of the element substrate 722 and the counter substrate 723, the display panel 721 can be flexible.
<<Touch Panel Device>>

Structure examples of a touch panel device are described with reference to FIGS. 36A to 36C and FIGS. 37A to 37C.

Figure 36A:
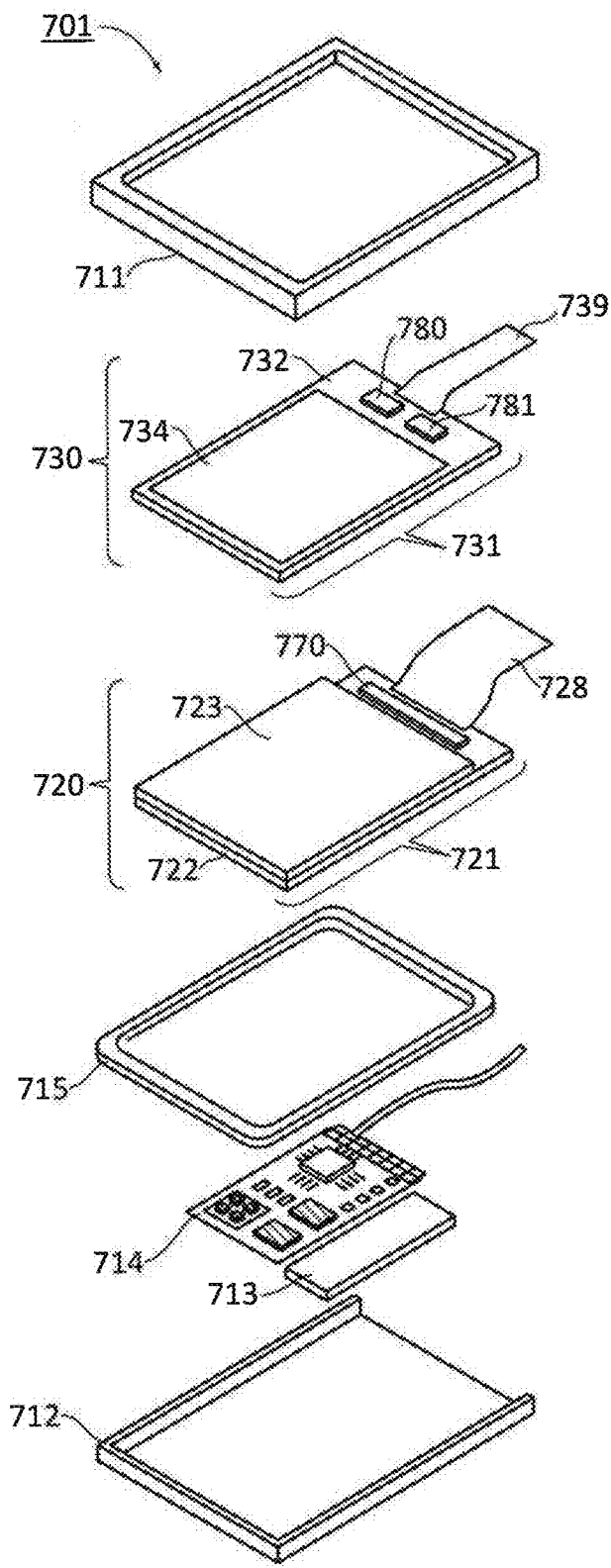
FIG. 36A is a schematic exploded perspective view illustrating a structure example of a touch panel device.
Figure 36B:
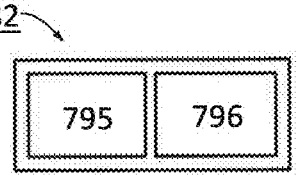
FIGS. 36B and 36C are block diagrams illustrating structure examples of a driver IC.
Figure 36C:
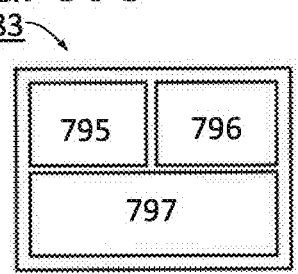

FIG. 36A is an exploded perspective view schematically illustrating a structure example of a touch panel device including an out-cell touch panel unit. A touch panel device 701 illustrated in FIG. 36A is formed by incorporating a touch sensor unit 730 in the display device 700.

The touch sensor unit 730 includes a touch sensor panel 731, an FPC 739, a driving line driver IC (referred to as a "DRD-IC" in the following description) 780, and an SN-IC 781. The DRD-IC 780 is an IC having a function of a driving line driver circuit.

The touch sensor panel 731 includes a substrate 732. The substrate 732 is provided with a sensor array 734, a terminal portion, and the like. The FPC 739, the DRD-IC 780, and the SN-IC 781 are each electrically connected to the terminal portion of the substrate 732.

Instead of the DRD-IC 780 and the SN-IC 781, a driver IC 782 (FIG. 36B) or a driver IC 783 (FIG. 36C) may be used.

The driver IC 782 includes a TS-DRU 795 and a TS-SNU 796. The driver IC 783 includes the TS-DRU 795, the TS-SNU 796, and a TS-CTR 797. The TS-DRU 795 is a circuit unit functioning as a driving line driver circuit. The TS-SNU 796 is a circuit unit functioning as a sensing circuit. The TS-CTR 797 is a circuit unit functioning as a touch sensor controller.

In the example illustrated in FIG. 36A, the display panel 721 is a top-emission display panel. In the case where the display panel 721 is a bottom-emission display unit, the display unit 720 is provided so that the element substrate 722 is located on the upper cover 711 side.

Figure 37A:
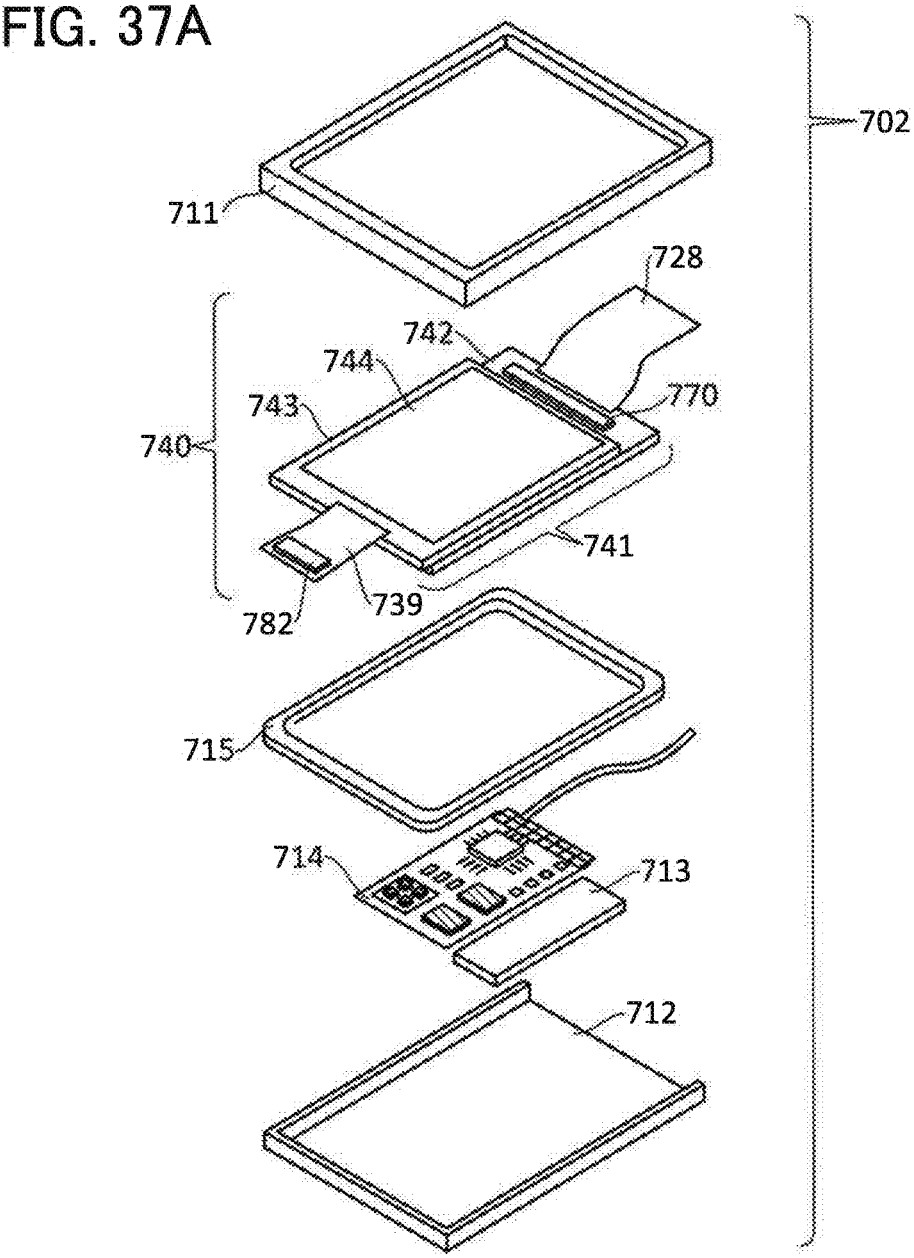
FIG. 37A is a schematic exploded perspective view illustrating a structure example of a touch panel device.

FIG. 37A is an exploded perspective view schematically illustrating a structure example of a touch panel device. A touch panel device 702 illustrated in FIG. 37A includes a touch panel unit 740 instead of the display unit 720 and the touch sensor unit 730. The touch panel unit 740 is a unit that combines the display unit 720 and the touch sensor unit 730.

The touch panel unit 740 is an on-cell touch panel unit and includes a display panel 741, the FPC 728, the FPC 739, the SD-IC 770, and the driver IC 782.

The display panel 741 is a top-emission display panel. The display panel 741 includes an element substrate 742 and a counter substrate 743. The structure of the element substrate 742 is similar to that of the element substrate 722. The SD-IC 770 and a pixel array are electrically connected to the FPC 728. The counter substrate 743 includes a sensor array 744 and a terminal portion connected to the sensor array 744. The sensor array 744 and the terminal portion are placed on an exterior surface of the counter substrate 743. The FPC 739 is connected to the terminal portion, and the driver IC 782 is electrically connected to the FPC 739. Instead of the driver IC 782, the driver IC 783 may be provided, or the DRD-IC 780 and the SN-IC 781 may be provided.

Figure 37B:
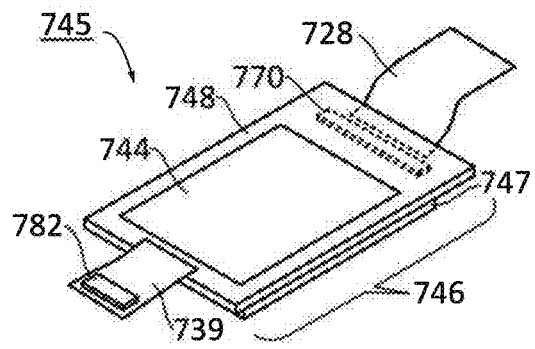
FIGS. 37B and 37C are perspective views illustrating a touch panel unit.
Figure 37C:
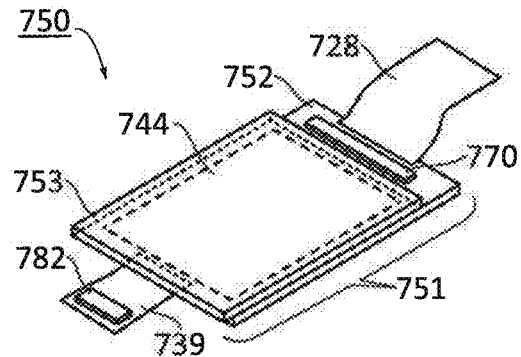

FIGS. 37B and 37C each illustrate another structure example of a touch panel unit. A touch panel unit 745 illustrated in FIG. 37B is an on-cell display panel unit. The touch panel unit 745 includes a display panel 746, the FPCs 728 and 739, the SD-IC 770, and the driver IC 782. The display panel 746 is a bottom-emission display panel and includes an element substrate 747 and a counter substrate 748. The sensor array 744 and a terminal portion electrically connected to the sensor array 744 are provided on an exterior surface of the counter substrate 748. The FPC 739 is electrically connected to the terminal portion.

A touch panel unit 750 illustrated in FIG. 37C is an in-cell display panel unit. The touch panel unit 750 includes a display panel 751, the FPCs 728 and 739, the SD-IC 770, and the driver IC 782. The display panel 751 is a top-emission display panel and includes an element substrate 752 and a counter substrate 753. The element substrate 752 has a structure similar to that of the element substrate 722. The sensor array 744 and a terminal portion electrically connected to the sensor array are provided on an interior surface of the counter substrate 753 (a surface that faces the element substrate 752). The FPC 739 is electrically connected to the terminal portion, and the driver IC 782 is electrically connected to the FPC 739.

Embodiment 3

In this embodiment, electronic devices or the like are described.

Examples of electronic devices including a display portion are a television set (also referred to as television or television receiver), a monitor of a computer or the like, a digital camera, a digital video camera, a digital photo frame, a mobile phone (also referred to as cellular phone or mobile phone device), a portable game machine, a portable information appliance, an audio reproducing device, and a large game machine such as a pinball machine. A flexible electronic device can be incorporated along a curved inside/outside wall surface of a construction such as a house or a building or a curved interior/exterior surface of a car. The above-described display unit or touch panel unit can be used in a display portion of an electronic device. An electronic device including the above-described display unit in its display portion can have high display quality. An electronic device including the above-described touch panel unit in its display portion can have high display quality and can sense the touch with high accuracy. FIGS. 38A to 38F, FIGS. 39A to 39D, and FIG. 40 illustrate structure examples of such electronic devices.

Figure 38A:
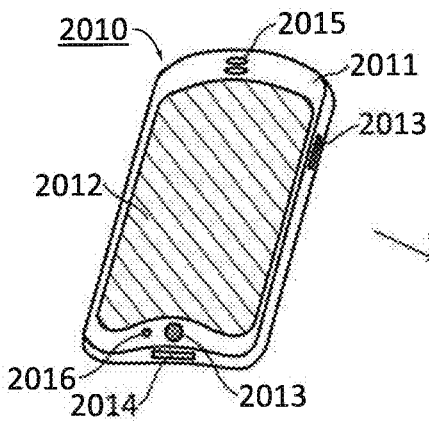
FIGS. 38A to 38F illustrate structure examples of an electronic device.

An information appliance 2010 illustrated in FIG. 38A includes a display portion 2012 incorporated into a housing 2011, an operation button 2013, an external connection port 2014, a speaker 2015, and a microphone 2016. Here, a display region of the display portion 2012 is curved. The information appliance 2010 is a portable information appliance driven with a battery and can be used as a tablet information appliance or a smartphone. The information appliance 2010 has functions such as phone calls, e-mailing, an appointment organizer, Internet communication, and music reproduction.

Information can be input by touching the display portion 2012 with a finger or the like. Various kinds of operation such as making a call, inputting letters, and switching screen images on the display portion 2012 can be performed by touching the display portion 2012 with a finger or the like. The information appliance 2010 can also be operated by inputting sound from the microphone 2016. Moreover, a variety of operations such as power on/off operation and screen switching of the display portion 2012 can be performed by pressing the operation button 2013.

Figure 38B:
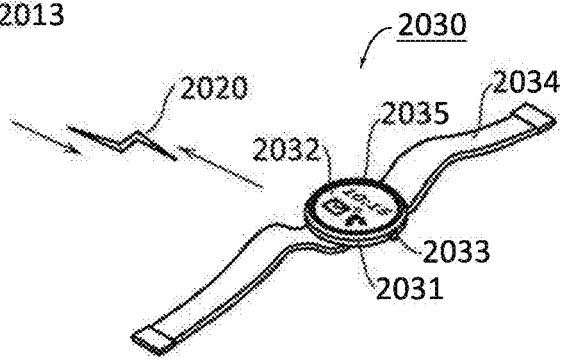

FIG. 38B illustrates an example of a watch-type information appliance. An information appliance 2030 includes a housing 2031, a display portion 2032, a winding crown 2033, a belt 2034, and a sensing unit 2035. The information appliance 2030 can be operated by rotating the winding crown 2033 or by touching the display portion 2032 with a finger or the like.

The sensing unit 2035 has a function of obtaining information on usage environment and biological information, for example. The sensing unit 2035 may be provided with a microphone, an imaging element, an acceleration sensor, a direction sensor, a pressure sensor, a temperature sensor, a humidity sensor, an illumination sensor, a positioning sensor (e.g., a global positioning system (GPS)), or the like.

Wireless communication devices with the same standard may be incorporated into the information appliance 2010 and the information appliance 2030 so that interactive communication is possible through a radio signal 2020. When the information appliance 2010 receives an incoming e-mail or call, for example, information notifying the incoming e-mail or call is displayed on the display portion 2032 of the information appliance 2030.

Figure 38C:
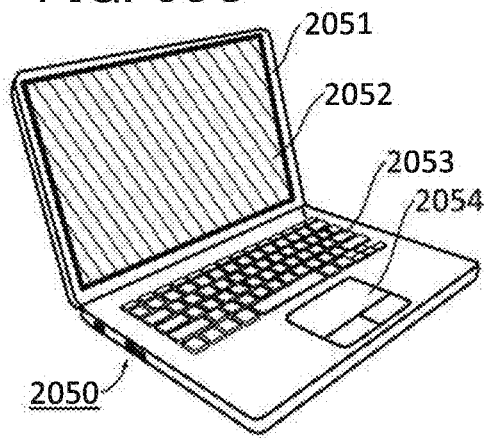

A notebook personal computer (PC) 2050 illustrated in FIG. 38C includes a housing 2051, a display portion 2052, a keyboard 2053, and a pointing device 2054. The notebook PC 2050 can be operated by touch operation on the display portion 2052.

Figure 38D:
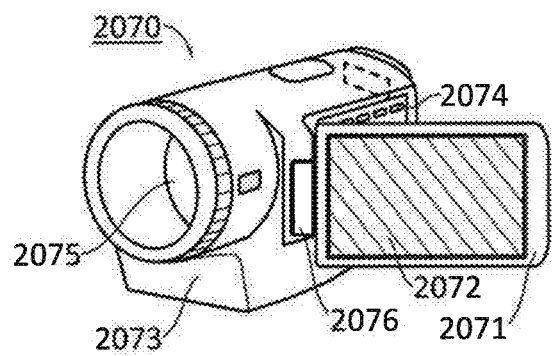

A video camera 2070 illustrated in FIG. 38D includes a housing 2071, a display portion 2072, a housing 2073, an operation key 2074, a lens 2075, and a joint 2076. The display portion 2072 is provided in the housing 2071. The housing 2073 is provided with the operation key 2074 and the lens 2075. The housing 2071 and the housing 2073 are connected to each other with the joint 2076, and the angle between the housing 2071 and the housing 2073 can be changed with the joint 2076. Images on the display portion 2072 may be switched in accordance with the angle between the housing 2071 and the housing 2073 at the joint 2076. A variety of operations such as start and stop of recording, zoom adjustment, and change of shooting range can be executed by touch operation on the display portion 2072.

Figure 38E:
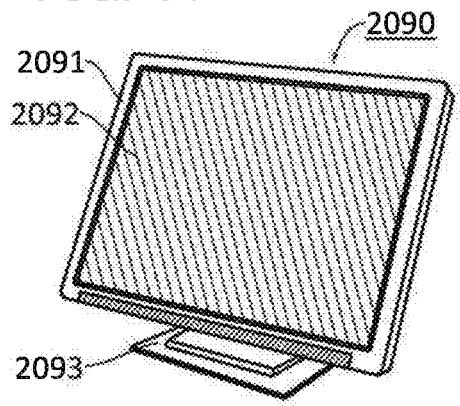

A display device 2090 illustrated in FIG. 38E includes a housing 2091, a display portion 2092, a support base 2093, and the like. When the above-described touch panel unit is provided in the display portion 2092, the display device 2090 can be used as a monitor of a computer, a game machine, or the like and an input device.

Figure 38F:
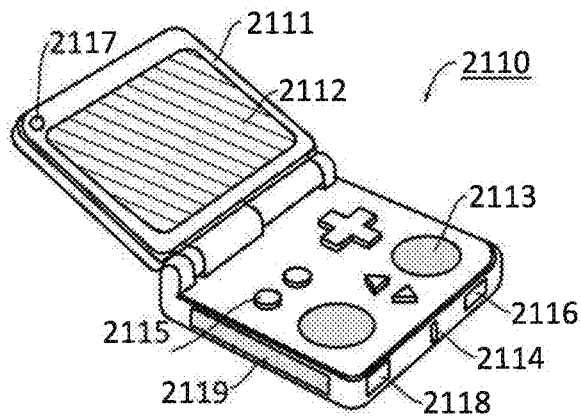

A portable game machine 2110 illustrated in FIG. 38F includes a housing 2111, a display portion 2112, a speaker 2113, an LED lamp 2114, an operation key 2115, a connection terminal 2116, a camera 2117, a microphone 2118, and a recording medium read portion 2119.

Figure 39A:
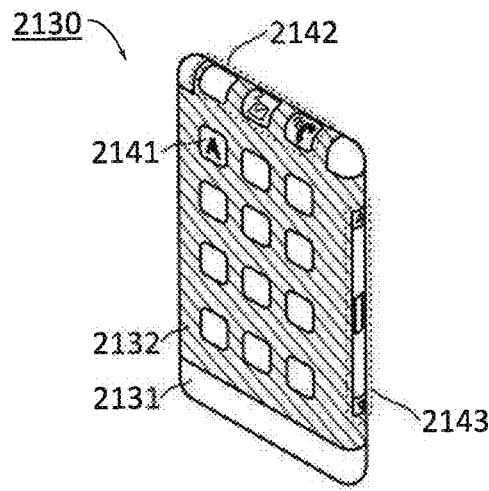
FIGS. 39A to 39D illustrate a structure example of an electronic device.

An information appliance 2130 illustrated in FIG. 39A includes a housing 2131 and a display portion 2132. The information appliance 2130 is a portable information appliance driven with a battery and can be used as a smartphone, a tablet information appliance, or the like. The information appliance 2130 has functions such as phone calls, e-mailing, an appointment organizer, Internet communication, and music reproduction. Since the display portion 2132 is curved, the information appliance 2130 can display information on at least three surfaces. Here, information 2141, information 2142, and information 2143 are displayed on different surfaces of the display portion 2132. For example, a user can see the display (here, the information 2142) on the upper edge portion of the display portion 2132 with the information appliance 2130 put in a breast pocket. Thus, the user can see the information 2142 without taking out the information appliance 2130 from the pocket and decide whether to answer the call.

Examples of the information 2141 to 2143 include notification from a social networking service (SNS), display indicating an incoming e-mail or call, e-mail information (e.g., the title and sender), the date, the time, remaining battery, and the reception strength of an antenna.

Figure 39B:
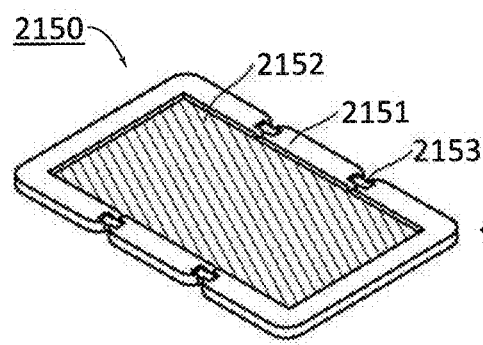
Figure 39C:
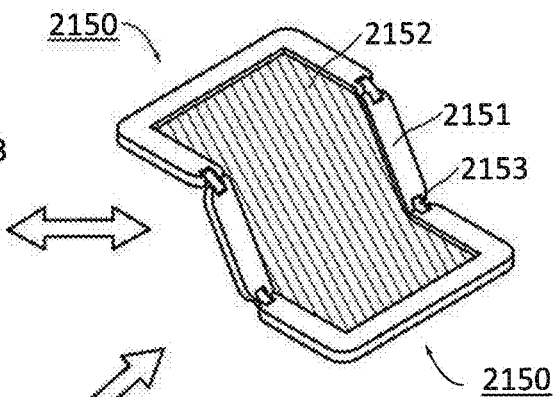
Figure 39D:
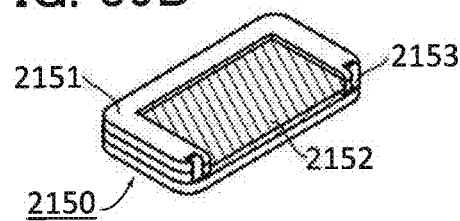

FIG. 39B illustrates a structure example of a foldable information appliance. An information appliance 2150 illustrated in FIG. 39B includes housings 2151, a display portion 2152, and hinges 2153. The information appliance 2150 is also a portable information appliance and has functions similar to those of the information appliance 2130. FIG. 39B illustrates the information appliance 2150 in an unfolded state. FIG. 39D illustrates the information appliance 2150 in a folded state. FIG. 39C illustrates the information appliance 2150 that is being opened or folded. The portability of the information appliance 2150 is increased in a folded state and a large display screen is obtained in an unfolded state, resulting in higher convenience of the information appliance 2150.

The display portion 2152 is supported with three housings 2151 joined by the hinges 2153. By folding the information appliance 2150 at a connection portion between two housings 2151 with the hinges 2153, the information appliance 2150 can be reversibly changed in shape from an unfolded state to a folded state. The display portion 2152 can be bent with a radius of curvature of 1 mm to 150 mm, for example.

The information appliance 2150 may be provided with a sensor capable of sensing that the display portion 2152 is in a folded state (FIG. 39D). Similarly, the sensor may sense that the display portion 2152 is in an unfolded state (FIG. 39B). When the sensor senses that the display portion 2152 is in a folded state, display on a folded portion (or a portion where a user cannot see because of a folded state) may be stopped, or sensing by a touch sensor may be stopped. In such cases, display and touch sensing may be restarted when the sensor senses that the display portion 2152 is unfolded.

Figure 40:
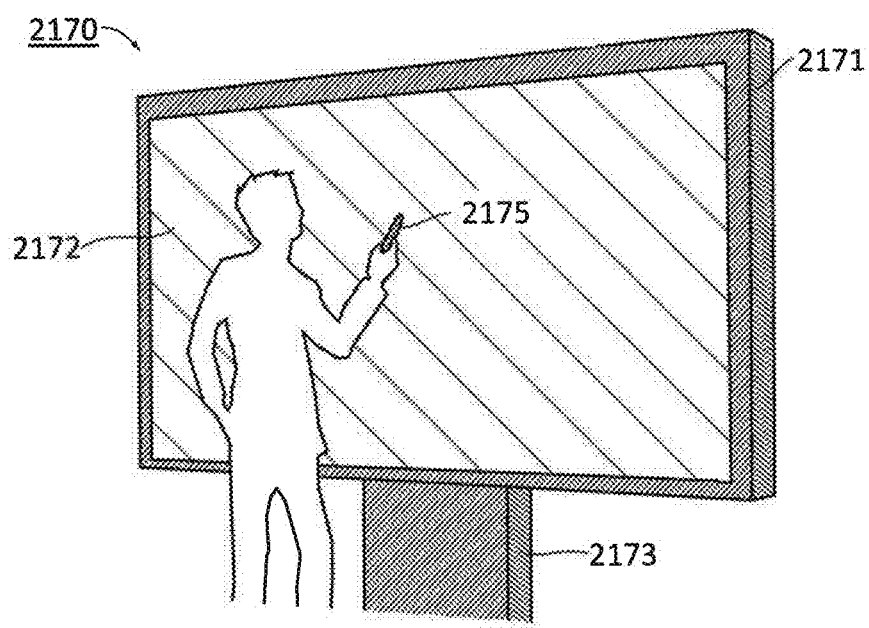
FIG. 40 illustrates a structure example of an electronic device.

An electronic whiteboard 2170 illustrated in FIG. 40 includes a housing 2171, a display portion 2172, and a support portion 2173. A user can draw letters and create drawings, for example, on the electronic whiteboard 2170 with an electronic pen 2175. The electronic whiteboard 2170 may be provided with a communication device such as a wireless communication device, in which case information displayed on the electronic whiteboard 2170 can be transmitted to another electronic device (e.g., a PC or a tablet terminal).

Embodiment 4

In this embodiment, structure examples of a display panel are described with reference to FIG. 41 and FIGS. 42A and 42B.

Figure 41:
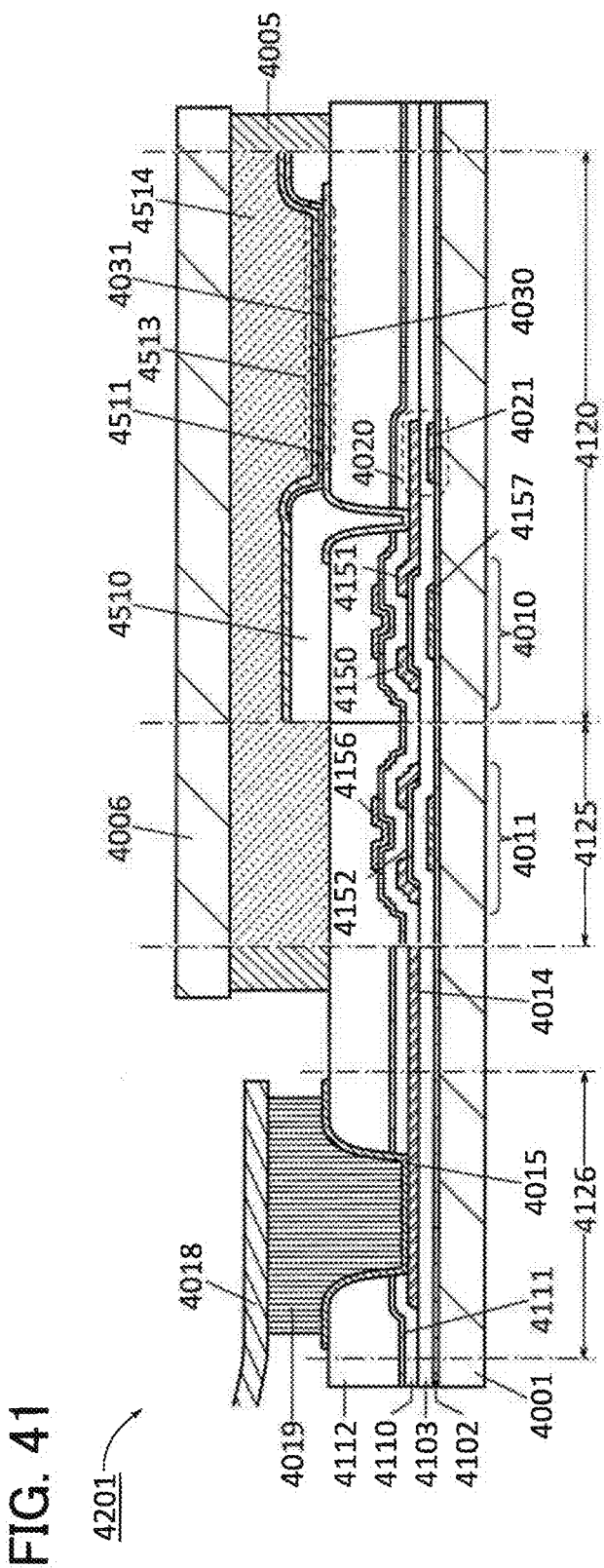
FIG. 41 is a cross-sectional view illustrating a structure example of a display panel.

In a display panel 4201 illustrated in FIG. 41, a substrate 4001 is a base substrate of an element substrate, and a substrate 4006 is a base substrate of a counter substrate.

The substrate 4001 is provided with a pixel array 4120, a gate driver circuit 4125, and a terminal portion 4126. In FIG. 41, a transistor 4010, a capacitor 4020, and an EL element 4513 included in the pixel array 4120 and a transistor 4011 included in the gate driver circuit 4125 are illustrated as an example. Over the substrate 4001, insulating layers 4102, 4103, 4110, 4111, and 4112 are provided.

The transistors 4010 and 4011 are provided over the insulating layer 4102. The transistors 4010 and 4011 each include conductive layers 4150 and 4151, a semiconductor layer 4152, and conductive layers 4156 and 4157. The conductive layer 4157 has a function of a gate electrode, the conductive layers 4150 and 4151 function as a source electrode and a drain electrode, and the conductive layer 4156 functions as a backgate electrode.

The capacitor 4020 includes a region where the conductive layer 4151 and a conductive layer 4021 overlap with each other with the insulating layer 4103 sandwiched therebetween.

The terminal portion 4126 is provided with conductive layers 4014 and 4015. The conductive layer 4015 is electrically connected to a terminal included in an FPC 4018 through an anisotropic conductive layer 4019. The conductive layer 4015 is electrically connected to the conductive layer 4014. The conductive layer 4014 functions as a terminal, and the conductive layer 4015 functions as a lead wiring.

The semiconductor layer 4152 includes a channel formation region. As a semiconductor material of the semiconductor layer 4152, crystalline silicon, polycrystalline silicon, amorphous silicon, an oxide semiconductor, an organic semiconductor, or the like can be used. If necessary, an impurity may be added into the semiconductor layer 4152 in order to increase the conductivity of the semiconductor layer 4152 or control the threshold voltage of the transistor.

In the case where the semiconductor layer 4152 is an oxide semiconductor layer, for example, a metal oxide containing at least one of indium (In) and zinc (Zn) is preferably used. Typical examples of such a metal oxide include an In oxide, a Zn oxide, an In—Zn oxide, and an In-M-Zn oxide (the element M is Al, Ti, Ga, Y, Zr, La, Ce, Nd, or Hf).

A conductive layer 4030 is provided over the insulating layer 4112. A partition wall 4510 is provided over the conductive layer 4030 and the insulating layer 4112. A light-emitting layer 4511 and a conductive layer 4031 are stacked over the partition wall 4510. The partition wall 4510 is formed using an organic insulating material or an inorganic insulating material. It is particularly preferable that the partition wall be formed using a photosensitive resin material to have an opening over the conductive layer 4030 so that a side surface of the opening is formed as an inclined surface with continuous curvature.

The EL element 4513 is formed of stacked layers of the conductive layer 4030, the light-emitting layer 4511, and the conductive layer 4031. One of the conductive layers 4030 and 4031 functions as an anode of the EL element 4513, and the other functions as a cathode. The conductive layer 4030 functions as a pixel electrode and is electrically connected to the conductive layer 4151 of the transistor 4010. The light-emitting layer 4511 may be a single layer or stacked layers.

A protective layer may be formed over the conductive layer 4031 and the partition wall 4510 in order to prevent entry of oxygen, hydrogen, moisture, carbon dioxide, or the like into the EL element 4513. As the protective layer, silicon nitride, silicon nitride oxide, aluminum oxide, aluminum nitride, aluminum oxynitride, aluminum nitride oxide, diamond like carbon (DLC), or the like can be used.

The substrate 4006 is fixed to the substrate 4001 with a sealant 4005. A space sealed by the sealant 4005 between the substrate 4001 and the substrate 4006 is filled with a filler 4514. As the filler 4514, an ultraviolet curable resin or a thermosetting resin can be used as well as an inert gas such as nitrogen or argon; for example, polyvinyl chloride (PVC), an acrylic resin, polyimide, an epoxy resin, a silicone resin, polyvinyl butyral (PVB), ethylene vinyl acetate (EVA), or the like can be used. A drying agent may be contained in the filler 4514. A glass material such as a glass frit, or a resin that is curable at room temperature such as a two-component-mixture-type resin, a light curable resin, a thermosetting resin, and the like can be used as the sealant 4005. A drying agent may be contained in the sealant 4005.

A color filter layer, a black matrix layer, a polarizing plate, a circularly polarizing plate (including an elliptically polarizing plate), a retardation plate (a quarter-wave plate or a half-wave plate), or the like may be provided as appropriate. These components may be provided on the substrate 4006 side if the display panel 4201 is of a top-emission type, and provided on the substrate 4001 side if the display panel 4201 is of a bottom-emission type.

Other structure examples of the display panel are illustrated in FIGS. 42A and 42B. A display panel 4202 illustrated in FIG. 42A and a display panel 4203 illustrated in FIG. 42B are different from the display panel 4201 in transistor structure. The transistors 4010 and 4011 in the display panel 4202 are of a top-gate type. The transistors 4010 and 4011 in the display panel 4203 are of a top-gate type with a back gate electrode.

Example 1

A display unit including the SD-IC 200 of Embodiment 1 was formed, and the operation of the CM unit 211 inside the SD-IC 200 was examined.

<<Structure of Display Unit>>

The display unit is referred to as a "display unit 400". Table 1 shows specifications of the display unit 400.

TABLE 1

| Specifications of display unit 400 | |
|---|---|
| Screen size | 13.3-inch diagonal |
|  | 293.76 mm (H) × 165.24 mm (V) |
| Number of effective pixels | 7680 × RGB (H) × 4320 (V): 8K4K |
| Subpixel size | 12.75 μm (H) × 38.25 μm (V) |
| Resolution | 664 ppi |

TABLE 1-continued

| Specifications of display unit 400 | |
|---|---|
| Display element | White light-emitting organic EL element |
| Coloring method | RGB color filter |
| Pixel arrangement | RGB stripe |
| Frame frequency | 120 Hz |
| Video signal format | Analog line sequential |
| Gate driver circuit | Gate on array (GOA) structure |
| Source driver circuit | 12 driver ICs (COG) |

Figure 43A:
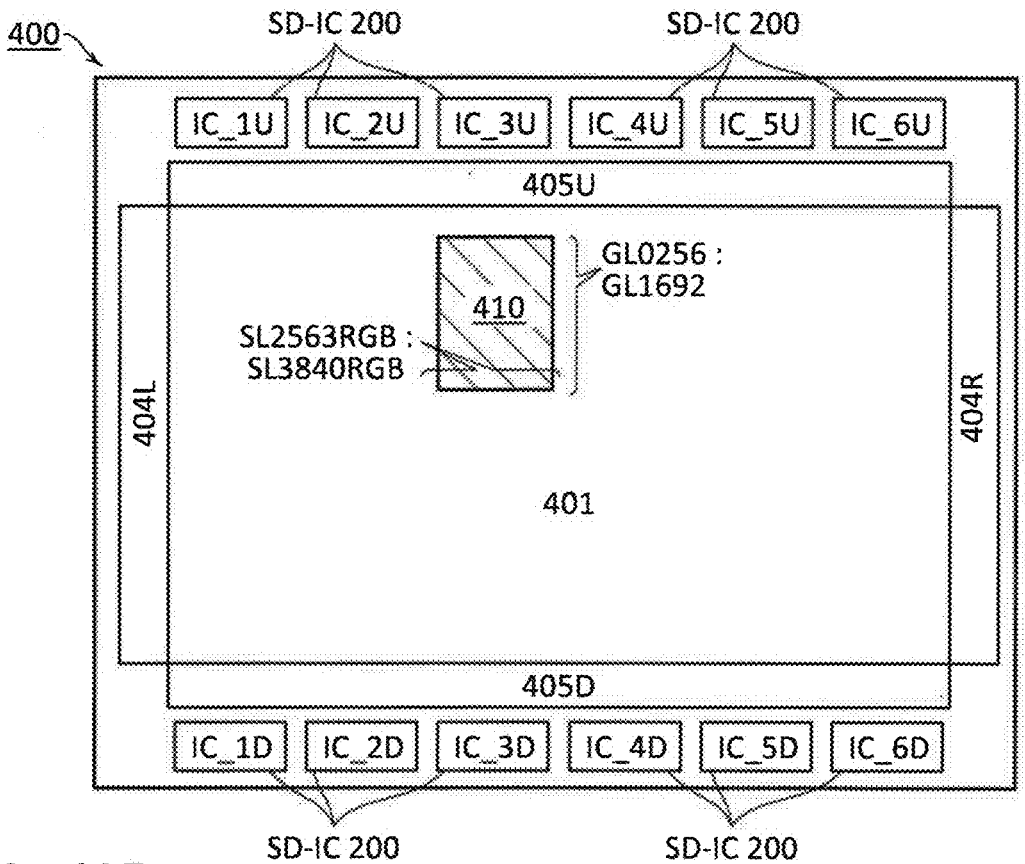
FIG. 43A is a block diagram illustrating a structure of a display unit.

FIG. 43A is a block diagram illustrating a structure of the display unit 400. This display unit includes a pixel array 401, gate driver circuits (GD) 404L and 404R, switch circuits 405U and 405D, and 12 SD-ICs 200. In the case where the 12 SD-ICs 200 are distinguished from one another, they are referred to as IC_1U to IC_6U and IC_1D to IC_6D.

<Subpixel, Pixel, Pixel Array>

Figure 43B:
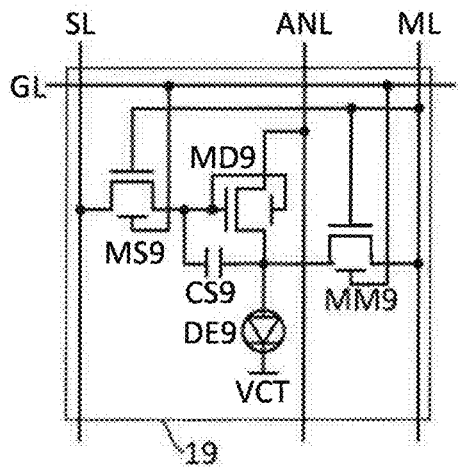
FIG. 43B is a circuit diagram of a pixel.

The pixel array 401 includes subpixels 19 and wirings GL, SL, ML, and ANL. FIG. 43B is a circuit diagram of the subpixel 19. The subpixel 19 is electrically connected to the wirings GL, SL, ML, and ANL. The subpixel 19 includes three transistors MS9, MD9, and MM9, a capacitor CS9, and an EL element DE9 like the subpixel 15. The transistors MS9, MD9, and MM9 are OS transistors having a backgate. The backgates of the transistors MS9 and MM9 are electrically connected to the wiring GL. Gates of the transistors MS9 and MM9 are electrically connected to the wiring ML.

Figure 43C:
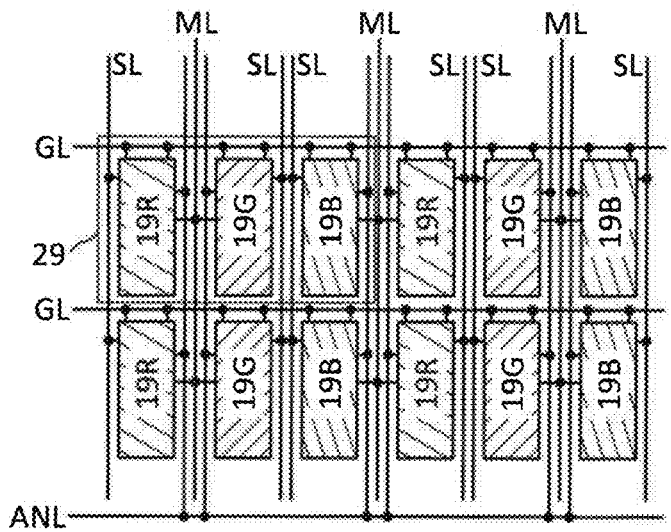
FIG. 43C illustrates a structure of a pixel array.

FIG. 43C illustrates a structure of the pixel array 401. The arrangement of the subpixels 19 in the pixel array 401 is similar to that in the pixel array 281 (FIG. 29). The three (RGB) subpixels 19R, 19G, and 19B constitute a pixel 29, and the subpixels 19 in two adjacent columns share one wiring ML. The numbers of wirings GL, SL, and ML are 4320, 23040, and 11520, respectively.

In this example, in the case where the wirings GL, SL, and ML are distinguished from one another, the wirings are expressed in the following way. The "wiring GL0001" represents the first wiring GL. The "wiring SL00002G" represents the second wiring SL for inputting a grayscale signal for a green color. The other components are also expressed in the same way.

<Switch Circuits 405U and 405D>

Figure 44A:
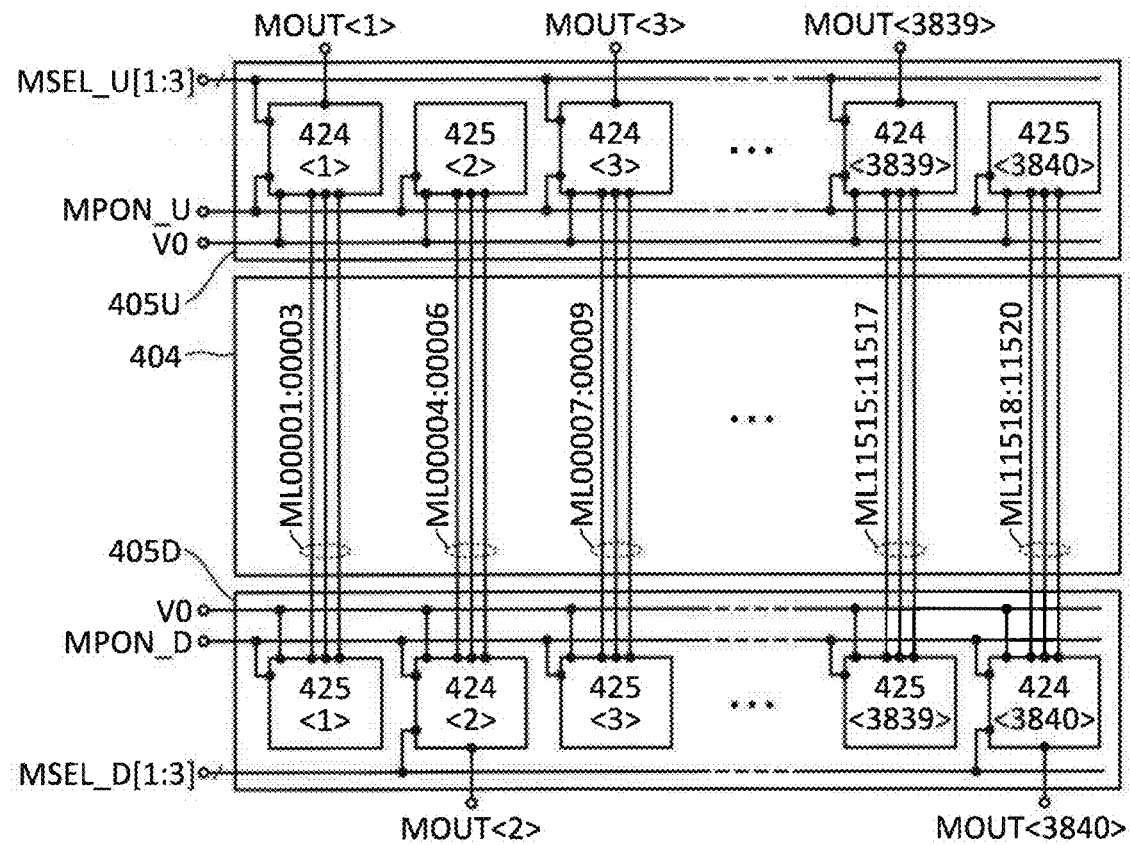
FIG. 44A is a block diagram of switch circuits.
Figure 44B:
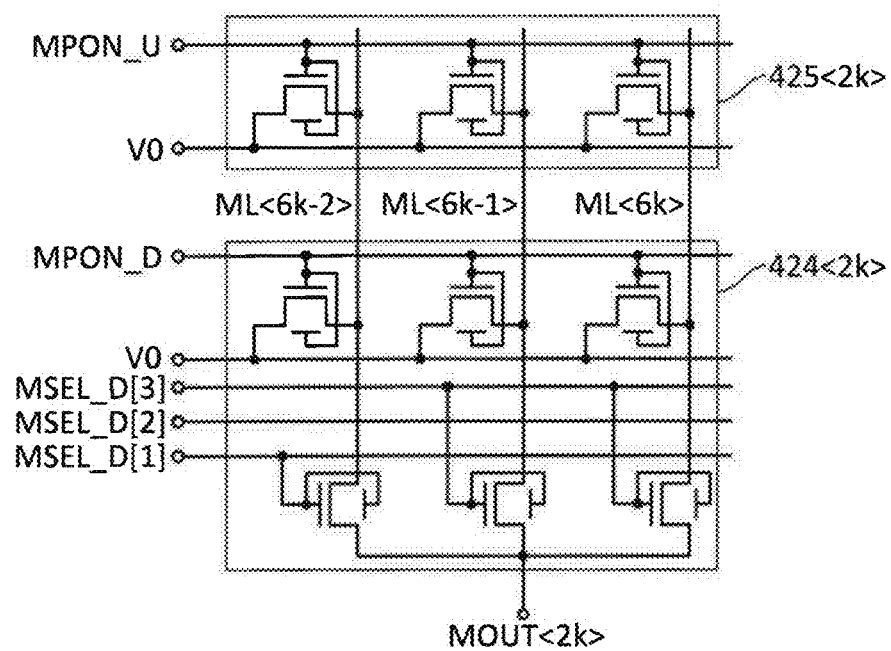
FIG. 44B illustrates circuits in the switch circuits.

The switch circuits 405U and 405D are described with reference to FIGS. 44A and 44B. The switch circuits 405U and 405D have a function similar to the function the switch circuit 285 (FIG. 29) has. The switch circuits 405U and 405D are interfaces between the pixel array 401 and the CM units 211 of the SD-ICs 200.

A voltage V0 and signals MPON_U and MSEL_U[1] to MSEL_U[3] are input to the switch circuit 405U. The voltage V0 and signals MPON_D and MSEL_D[1] to MSEL_D[3] are input to the switch circuit 405D. By the switch circuits 405U and 405D, the voltage V0 can be input from both ends of the wirings ML.

The switch circuit 405U includes 1920 terminals MOUT<2$k$−1> ($k$ is an integer of 1 to 1920), and the switch circuit 405D includes 1920 terminals MOUT<2$k$>. The switch circuits 405U and 405D each include 1920 circuits 424 and 1920 circuits 425. FIG. 44B is a circuit diagram illustrating the circuit 424<2$k$> and the circuit 425<2$k$>. Transistors included in the circuit 424<2$k$> and the circuit 425<2$k$> are OS transistors. By the switch circuits 405U and 405D, the voltage V0 can be input from both ends of the wirings ML.

<SD-IC 200>
Table 2 shows specifications of the SD-IC 200.

TABLE 2

| Specifications of SD-IC 200 | |
| --- | --- |
| SD unit 210 | |
| Number of output pins (PM2) | 2160 |
| Input image signal | 12 bits |
| 1 horizontal period | 1.92 μs |
| CM unit 211 | |
| Number of input channels (input pins PM1) | 360 |
| Resolution | 12 bits |

As described above, the pins PM2 of the SD unit 210 are output pins for grayscale signals, and the pins PM1 are connection pins to the terminals MOUT. In the CM unit 211, 180 circuits 45 (see FIG. 21) are provided. The ADCs 43 included in the circuits 45 are 12-bit ADCs.

Note that the pins PM2 which are not electrically connected to the wirings SL are in an electrically floating state, and the pins PM1 which are not electrically connected to the terminals MOUT are in an electrically floating state.

Figure 45:
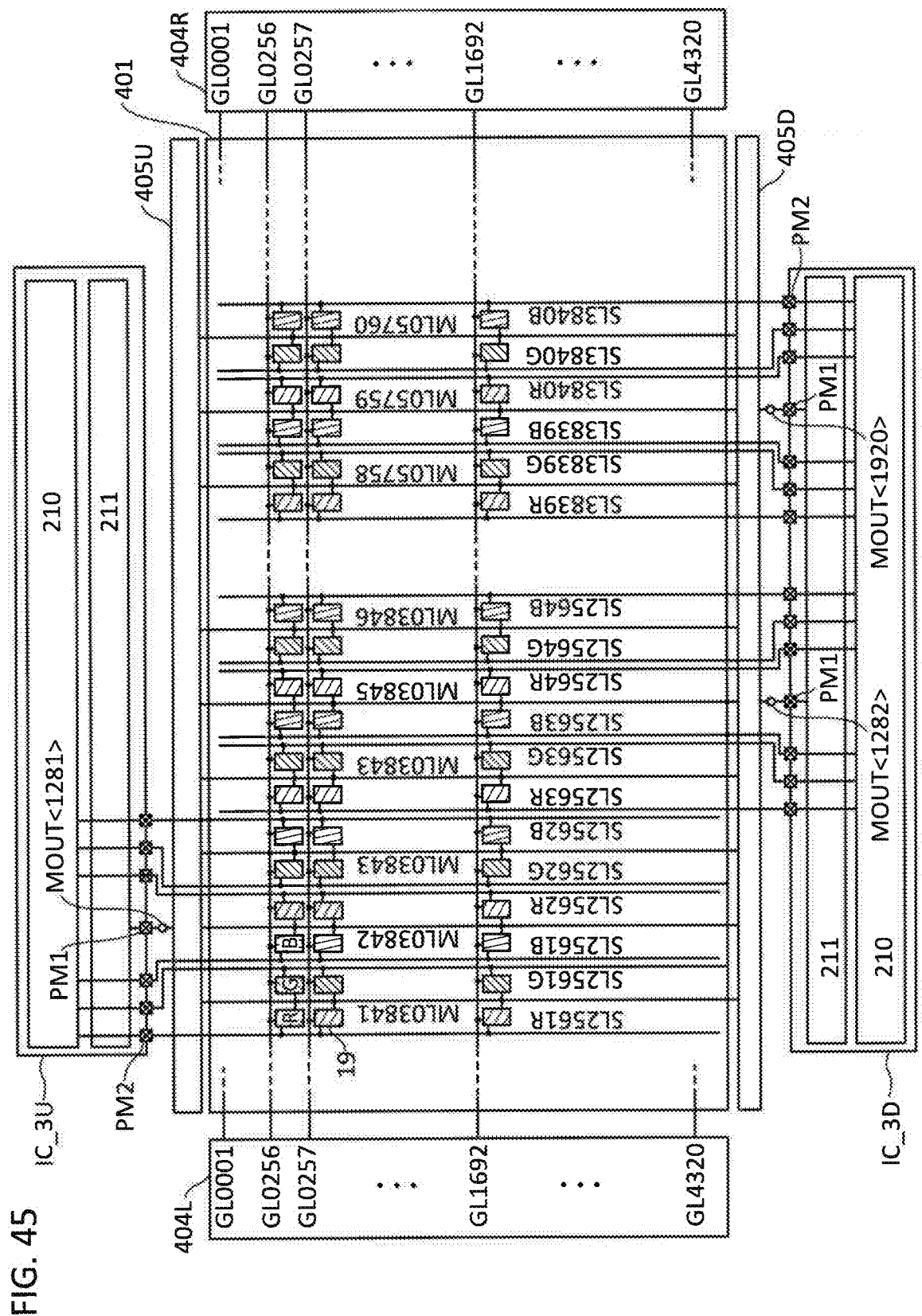
FIG. 45 illustrates connections between a pixel array, gate driver circuits, and source driver ICs.

With reference to FIG. 45, the connection structure between the pixel array 401, the gate driver circuits 404L and 404R, and the SD-ICs 200 is described.

The wirings GL0001 to GL4320 are electrically connected to both the gate driver circuit 404L and the gate driver circuit 404R. The gate driver circuits 404L and 404R have the same circuit structure and include OS transistors. By the gate driver circuit 404L and the gate driver circuit 404R, selection signals are input from both ends of the wirings GL at the same time.

The connection destination (the SD-IC 200) of the wirings SL and ML changes every two columns of pixels (every six columns of subpixels). FIG. 45 typically illustrates a connection structure between the pixel array 401, the IC_3U, and the IC_3D.

The connection destination (the SD-IC 200) of the wirings ML03841 to ML05760 changes every three wirings between the IC_3U and the IC_3D. The connection destination (the SD-IC 200) of the wirings SL2561R to SL3840R changes every two wirings between the IC_3U and the IC_3D. The same applies to the wirings SL2561G to SL3840G and the wirings SL2561B to 3840B.

<<Current Sensing Method>>

The CM unit 211 of the IC_3D was operated in a single-ended mode, a differential sensing mode, and a 3-input differential sensing mode (see the truth table in FIG. 22). In each sensing mode, a grayscale signal was input to the pixel array 401 under the same conditions and the same wiring ML was sensed.

A region 410 in FIG. 43A is a sensing target. The region 410 includes the wirings GL0256 to GL1692, and the wirings SL and ML electrically connected to the IC_3U or the IC_3D.

Among the RGB subpixels 19, the subpixel 19R was selected as a sensing target. A 5 V grayscale signal was input to the subpixel 19R that was electrically connected to the wiring ML, which was the sensing target, and a grayscale signal for black display was input to the other subpixels 19R, 19G, and 19B.

The voltage of the wiring ANL was 11 V, a voltage VCT was 6.5 V, and the voltage V0 was 0.5 V. In addition, −4 V was input to the wirings GL in a non-selected state, and 15 V was input to the wirings GL in a selected state. Note that four of the wirings GL in the region 410 were selected at a time in a current sensing operation.

<<Sensing Results>>

FIGS. 46A to 46C show analysis results of current values that the CM unit 211 of the IC_3D obtained (referred to as the "ADC values" below). FIGS. 46A to 46C each show a relation between the position of the subpixel 19R and the ADC value by means of a grayscale image.

In the grayscale image of the single-ended mode in FIG. 46A, noise appears in the wiring GL direction. In contrast, in the grayscale image of the differential sensing mode in FIG. 46B and the grayscale image of the 3-input differential sensing mode in FIG. 46C, such noise does not appear. This indicates that the differential operation of the integrating circuits 41 of the CM unit 211 led to an effective removal of common noise from the wirings ML.

To examine the noise component of the ADC values, the ADC values in each sensing mode were Fourier transformed. FIG. 46D shows the results. In the graph of FIG. 46D, the horizontal axis represents spatial frequency, showing the number of times the ADC values changed in 360 wirings GL. The vertical axis represents the signal intensity. The ADC values of the analysis target are the values on the dotted line X (see FIG. 46A) and corresponds to the value of a current flowing through the terminal MOUT<1582>, which is the current value of the subpixels 19R electrically connected to the wirings SL3163R and SL3164R.

To emphasize the noise component of the ADC values, the ADC values from which the offset component was eliminated were subjected to Fourier transform. The offset component is the average value of 360 ADC values on the dotted line X.

In FIG. 46D, the data of the single-ended sensing mode has a large noise component at a spatial frequency ranging from 30 to 50 [cycles/360 GLs]. The data of the differential sensing mode and the data of the 3-input differential sensing mode do not have such a large noise component. FIG. 46D shows that a noise component was effectively removed from the signals of the wirings ML in the differential sensing mode and the 3-input differential sensing mode.

No significant difference in data between the differential sensing mode and the 3-input differential sensing mode was observed in FIGS. 46B to 46D because the measurement was conducted in an environment with attention given not to generate noise in the pixel array 401, in order to check the operation of the CM unit 211.

It was confirmed in this example that the operation of a CM unit in a differential sensing mode or a 3-input differential sensing mode enables high-SNR sensing.

This application is based on Japanese Patent Application serial no. 2015-256964 filed with Japan Patent Office on Dec. 28, 2015, the entire contents of which are hereby incorporated by reference.

What is claimed is:

1. A semiconductor device comprising:
   a switch circuit comprising a first switch, a second switch, a third switch, a fourth switch, a fifth switch, a sixth switch, a seventh switch, and a power supply line; and
   an amplifier circuit comprising an output terminal, an inverting input terminal, a first non-inverting input terminal, and a second non-inverting input terminal,
   wherein a first electrode of the first switch is electrically connected to each of a first electrode of the fourth switch, a first electrode of the fifth switch, and the first non-inverting input terminal, wherein a first electrode of the second switch is electrically connected to each of a first electrode of the sixth switch and the inverting input terminal, wherein a first electrode of the third switch is electrically connected to each of a second electrode of the fourth switch, a first electrode of the seventh switch, and the second non-inverting input terminal, and wherein the power supply line is electrically connected to each of a second electrode of the fifth switch, a second electrode of the sixth switch, and a second electrode of the seventh switch.

2. The semiconductor device according to claim 1,
wherein a second electrode of the first switch, a second electrode of the second switch, and a second electrode of the third switch are electrically connected to a source driver circuit of a display device.

3. The semiconductor device according to claim 2,
wherein the display device includes an electroluminescent element.

4. The semiconductor device according to claim 1,
wherein each of the first switch, the second switch, the third switch, the fourth switch, the fifth switch, the sixth switch, and the seventh switch is a transistor.

5. The semiconductor device according to claim 1, further comprising an eighth switch:
wherein a first electrode and a second electrode of the eighth switch are electrically connected to the inverting input terminal and the output terminal, respectively.

6. A semiconductor device comprising:
a switch circuit comprising a first switch, a second switch, a third switch, a fourth switch, a fifth switch, a sixth switch, a seventh switch, and a power supply line;
an amplifier circuit comprising an output terminal, an inverting input terminal, a first non-inverting input terminal, and a second non-inverting input terminal; and a capacitor comprising a first wiring electrically connecting to the inverting input terminal and a second wiring electrically connecting to the output terminal, wherein a first electrode of the first switch is electrically connected to each of a first electrode of the fourth switch, a first electrode of the fifth switch, and the first non-inverting input terminal, wherein a first electrode of the second switch is electrically connected to a first electrode of the sixth switch and the inverting input terminal, wherein a first electrode of the third switch is electrically connected to each of a second electrode of the fourth switch, a first electrode of the seventh switch, and the second non-inverting input terminal, and wherein the power supply line is electrically connected to each of a second electrode of the fifth switch, a second electrode of the sixth switch, and a second electrode of the seventh switch.

7. The semiconductor device according to claim 6,
wherein a second electrode of the first switch, a second electrode of the second switch, and a second electrode of the third switch are electrically connected to a source driver circuit of a display device.

8. The semiconductor device according to claim 7,
wherein the display device includes an electroluminescent element.

9. The semiconductor device according to claim 6,
wherein each of the first switch, the second switch, the third switch, the fourth switch, the fifth switch, the sixth switch, and the seventh switch is a transistor.

10. The semiconductor device according to claim 6, further comprising an eighth switch:
wherein a first electrode and a second electrode of the eighth switch are electrically connected to the inverting input terminal and the output terminal, respectively.

* * * * *